(12) United States Patent
Holtzapple et al.

(10) Patent No.: US 7,251,944 B2
(45) Date of Patent: Aug. 7, 2007

(54) VAPOR-COMPRESSION EVAPORATION SYSTEM AND METHOD

(75) Inventors: Mark T. Holtzapple, College Station, TX (US); Gary P. Noyes, Houston, TX (US)

(73) Assignees: The Texas A&M University System, College Station, TX (US); Highland Interests, Inc., Bryan, TX (US)

( * ) Notice: Subject to any disclaimer, the term of this patent is extended or adjusted under 35 U.S.C. 154(b) by 192 days.

(21) Appl. No.: 11/057,085

(22) Filed: Feb. 10, 2005

(65) Prior Publication Data

US 2005/0183440 A1 Aug. 25, 2005

Related U.S. Application Data

(60) Provisional application No. 60/543,210, filed on Feb. 10, 2004.

(51) Int. Cl.
*F25D 17/06* (2006.01)
(52) U.S. Cl. .............................. 62/93; 62/333
(58) Field of Classification Search ................. 62/333, 62/123, 268, 270, 304, 475, 93, 323.1, 502; 202/155, 174, 182; 417/202
See application file for complete search history.

(56) References Cited

U.S. PATENT DOCUMENTS

| | | | |
|---|---|---|---|
| 1,415,406 A | 5/1922 | Scanes | |
| 1,421,844 A | 7/1922 | Schmidt | |
| 2,846,197 A | 8/1958 | Berg et al. | |
| 2,979,442 A | 4/1961 | Badger | |
| 3,223,144 A | * | 12/1965 | Dedert ...................... 159/13.2 |

(Continued)

FOREIGN PATENT DOCUMENTS

DE  30 27 225  2/1982

(Continued)

OTHER PUBLICATIONS

Notification of Transmittal of the International Search Report and Written Opinion of the International Searching Authority for International Application No. PCT/US2004/030660 filed Sep. 20, 2004. (15 pages), Jan. 14, 2005.

(Continued)

*Primary Examiner*—Mohammad M. Ali
(74) *Attorney, Agent, or Firm*—Baker Botts L.L.P.

(57) ABSTRACT

According to one embodiment of the invention, a vapor-compression evaporation system includes a plurality of vessels in series each containing a feed having a nonvolatile component. A first set of the plurality of vessels includes vapor-compression evaporators and a second set of the plurality of vessels includes multi-effect evaporators. A mechanical compressor is coupled to the last vessel in the series of vapor-compression evaporators and is operable to receive a vapor therefrom. A turbine is coupled to, and operable to drive, the mechanical compressor. A pump is operable to deliver a cooling liquid to the mechanical compressor, and a tank is coupled to the mechanical compressor and is operable to separate liquid and vapor received from the mechanical compressor. A plurality of heat exchangers is coupled inside respective ones of the vessels, wherein the heat exchanger in the first vessel in the first set is operable to receive the vapor from the tank, and at least some of the vapor condenses therein. The heat of condensation provides the heat of evaporation to the first vessel in the first set, and at least some of the vapor inside the first vessel in the first set is delivered to the heat exchanger in the next vessel in the first set, whereby the condensing, evaporating, and delivering steps continue until the last vessel in the second set is reached.

38 Claims, 44 Drawing Sheets

U.S. PATENT DOCUMENTS

| | | | |
|---|---|---|---|
| 3,532,152 A * | 10/1970 | Cartinhour | 159/20.1 |
| 3,568,461 A | 3/1971 | Hoffman | |
| 3,597,328 A | 8/1971 | Michels | |
| 3,716,458 A * | 2/1973 | Greenfield et al. | 159/13.2 |
| 3,763,020 A * | 10/1973 | Drew et al. | 203/14 |
| 3,807,479 A * | 4/1974 | Brannland et al. | 159/47.1 |
| 3,892,361 A | 7/1975 | Mocarski | |
| 4,152,898 A * | 5/1979 | Awerbuch | 60/641.5 |
| 4,310,960 A | 1/1982 | Parker | |
| 4,379,734 A * | 4/1983 | Franzen | 159/17.1 |
| 4,523,638 A | 6/1985 | Rosman et al. | |
| 4,696,625 A | 9/1987 | Greenberg | |
| 5,183,106 A | 2/1993 | Stancliffe et al. | |
| 5,220,798 A * | 6/1993 | Nagamura et al. | 62/656 |
| 5,423,952 A * | 6/1995 | Stout | 202/174 |
| 5,837,096 A | 11/1998 | Fagerlind et al. | |
| 5,946,941 A * | 9/1999 | Sinelnikov | 62/613 |
| 6,427,453 B1 * | 8/2002 | Holtzapple et al. | 62/92 |
| 6,684,658 B2 * | 2/2004 | Holtzapple et al. | 62/268 |
| 7,093,455 B2 * | 8/2006 | Holtzapple et al. | 62/268 |

FOREIGN PATENT DOCUMENTS

| | | |
|---|---|---|
| DE | 3244761 | 6/1983 |
| DE | 3924581 | 1/1991 |
| DE | 4019991 | 1/1992 |
| EP | 0193206 | 2/1986 |
| EP | 0280676 | 2/1988 |
| EP | 0411123 | 2/1991 |
| EP | 0 604 718 | 7/1994 |
| EP | 0741241 | 11/1996 |
| FR | 1050094 | 1/1954 |
| FR | 2230403 | 12/1974 |
| FR | 2 496 483 | 12/1980 |
| FR | 2505667 | 5/1981 |
| FR | 2545372 | 11/1984 |
| GB | 2054819 | 2/1981 |
| GB | 2 141 350 | 12/1984 |
| GB | 2195908 A * | 4/1988 |

OTHER PUBLICATIONS

PCT Invitation to Pay Additional Fees for International Application No. PCT/US2004/030615, filed Sep. 20, 2004. (6 pages), Jan. 28, 2005.

Notification of Transmittal of the International Search Report and Written Opinion of the International Searching Authority for International Application No. PCT/US2004/030619 filed Sep. 20, 2004. (16 pages), Feb. 10, 2005.

Declaration of Mark Holtzapple, dated Feb. 27, 2007 (2 pages).

* cited by examiner

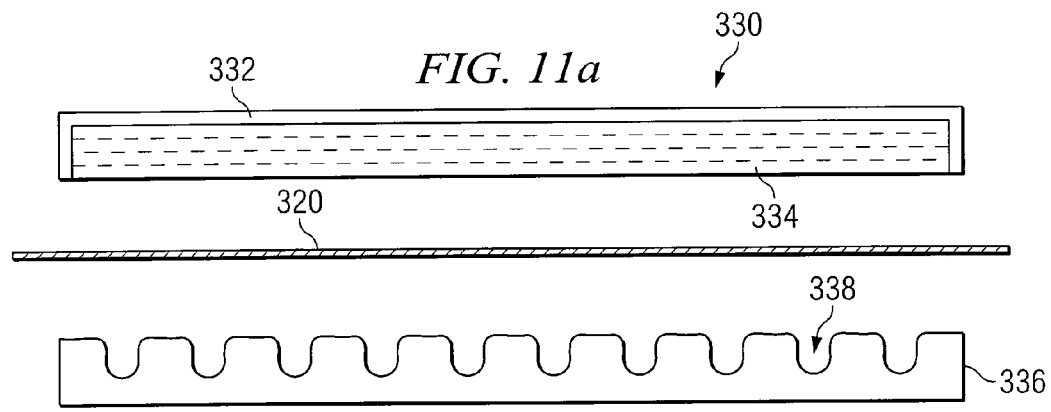
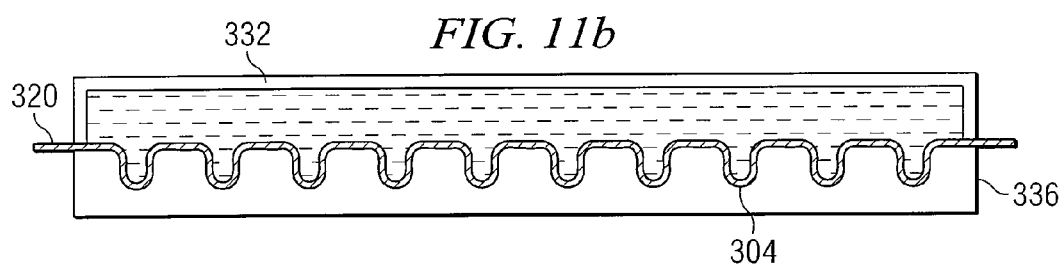
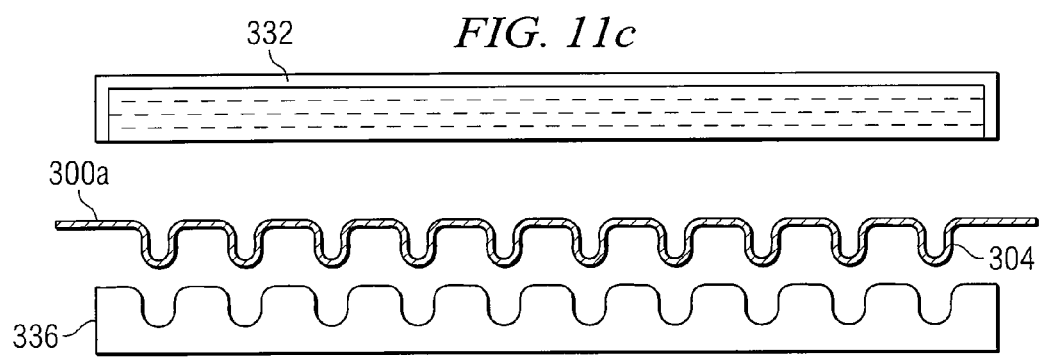

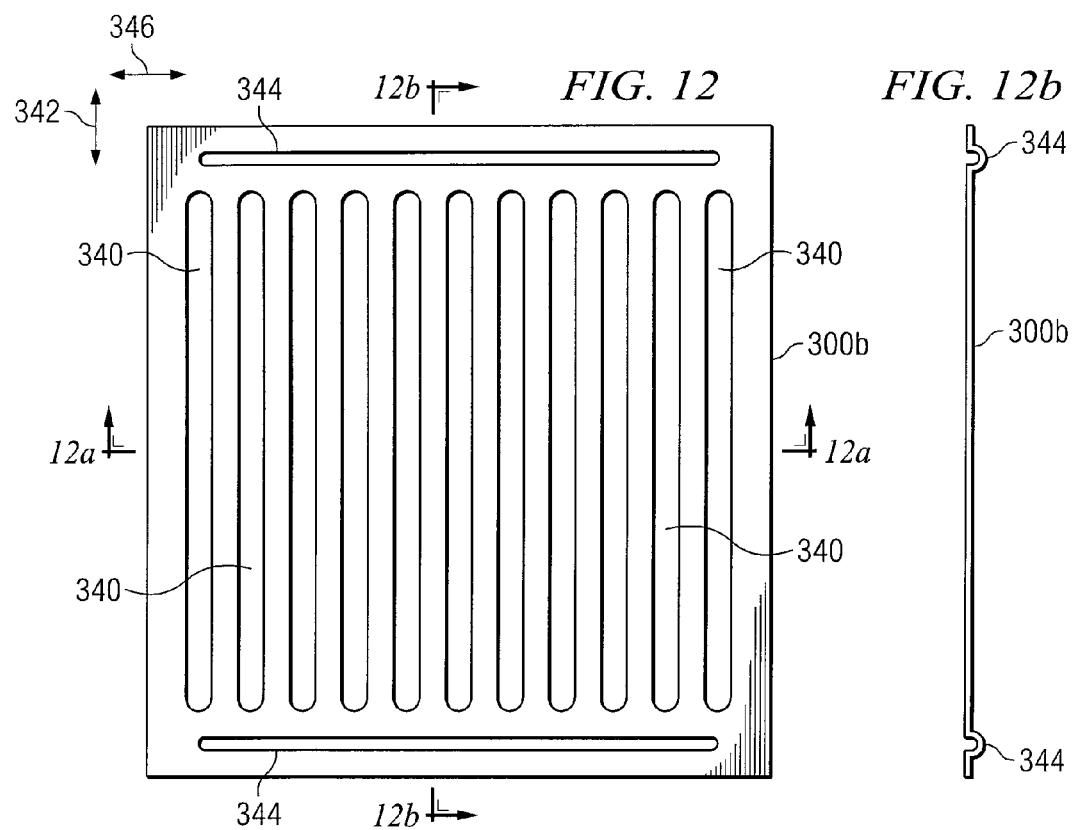
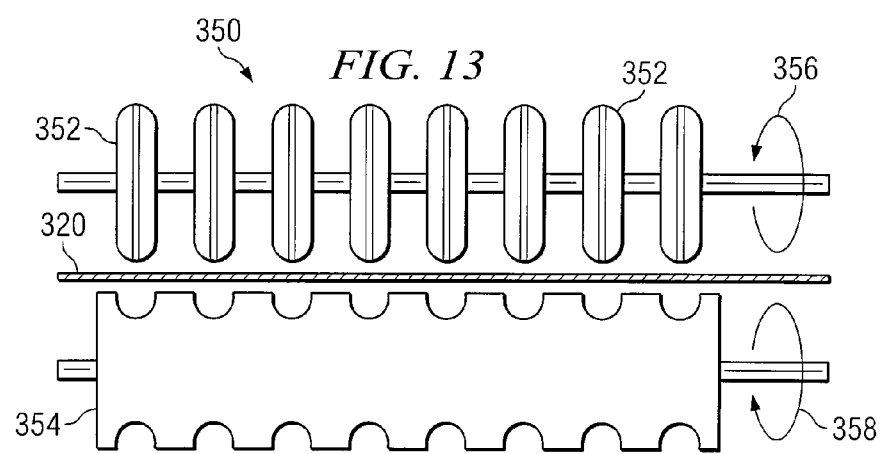

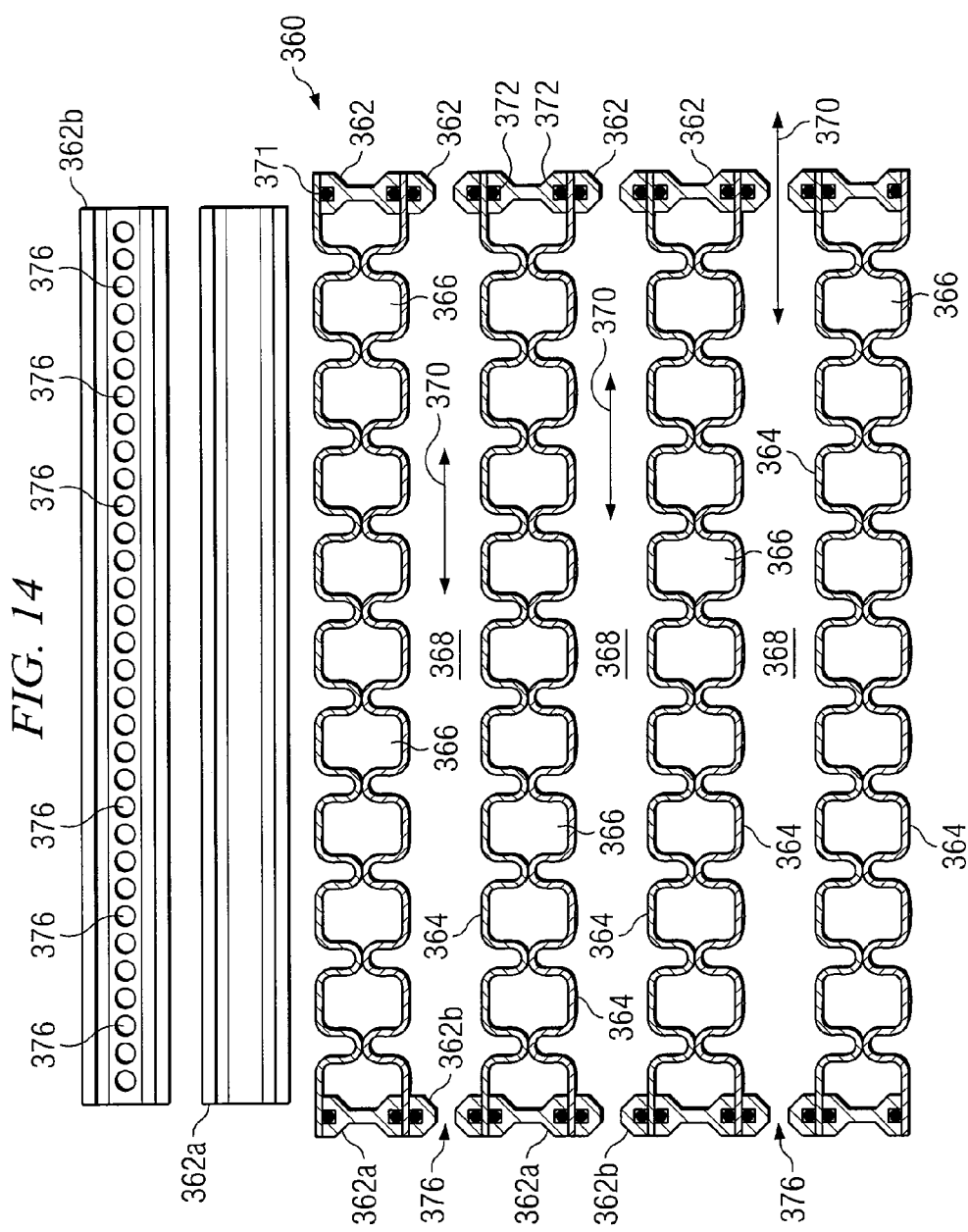

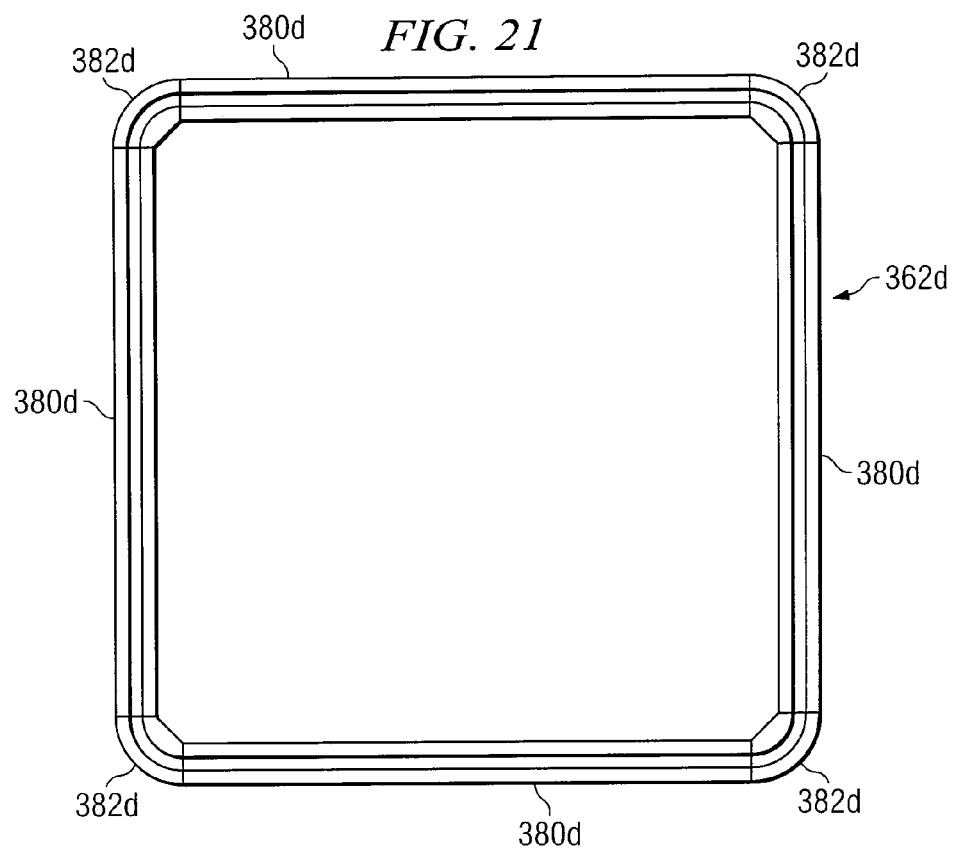
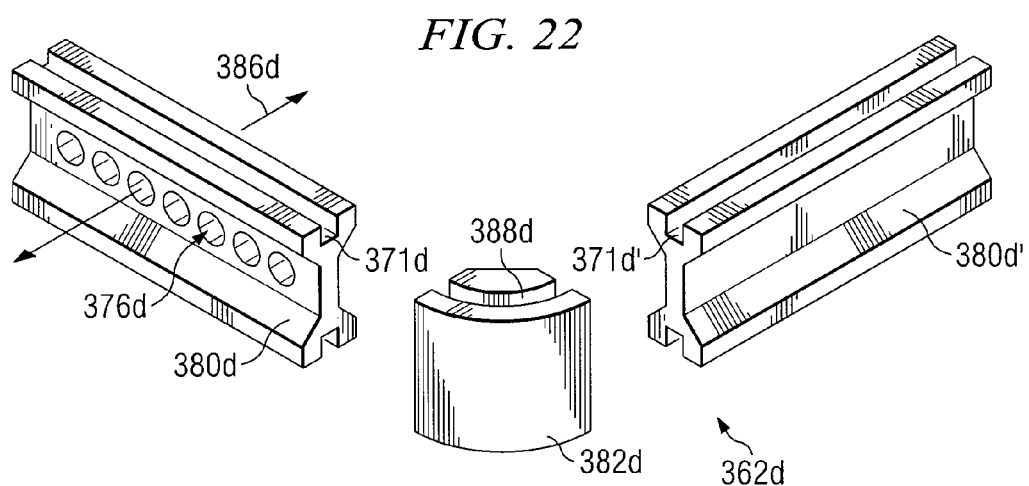

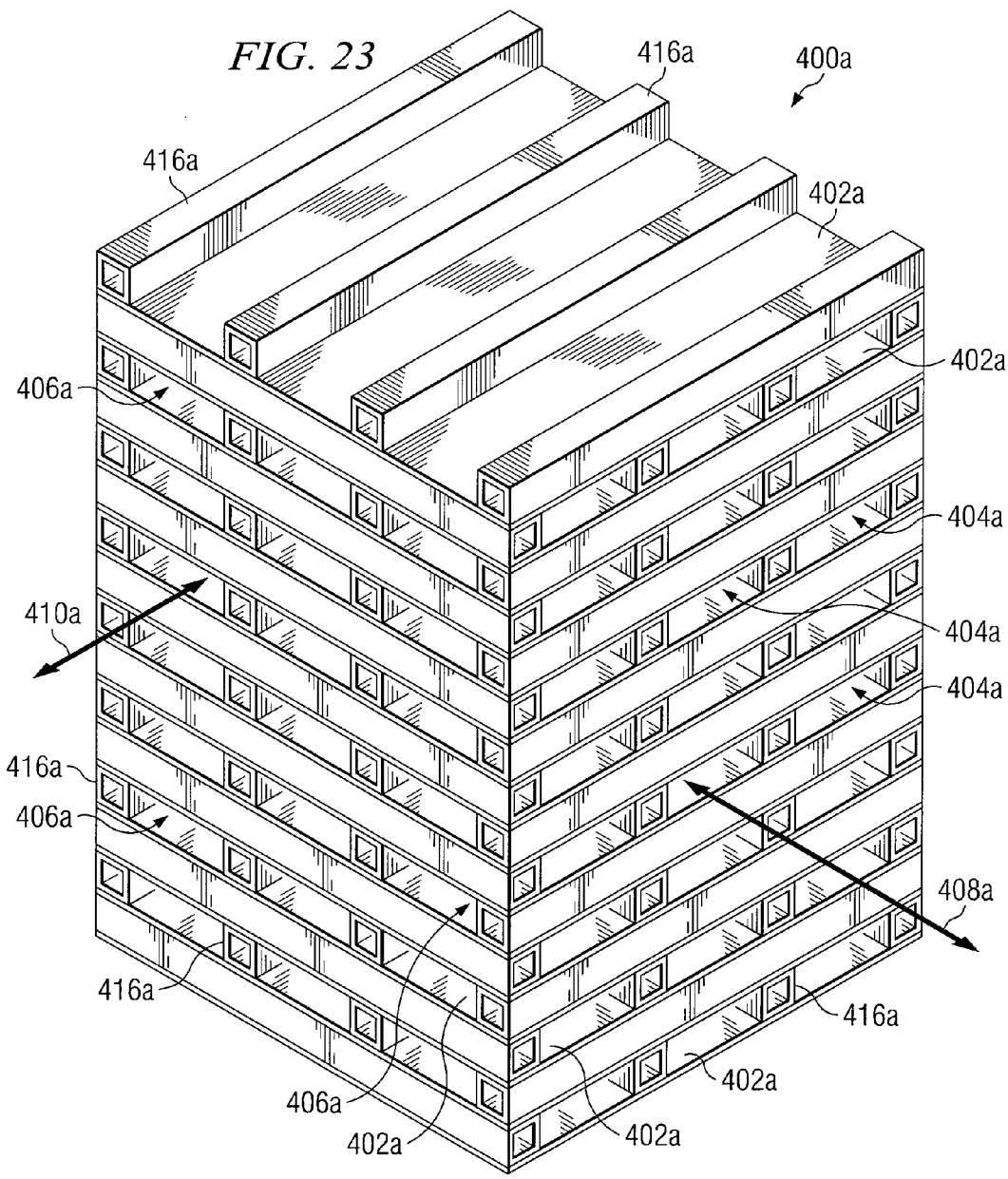

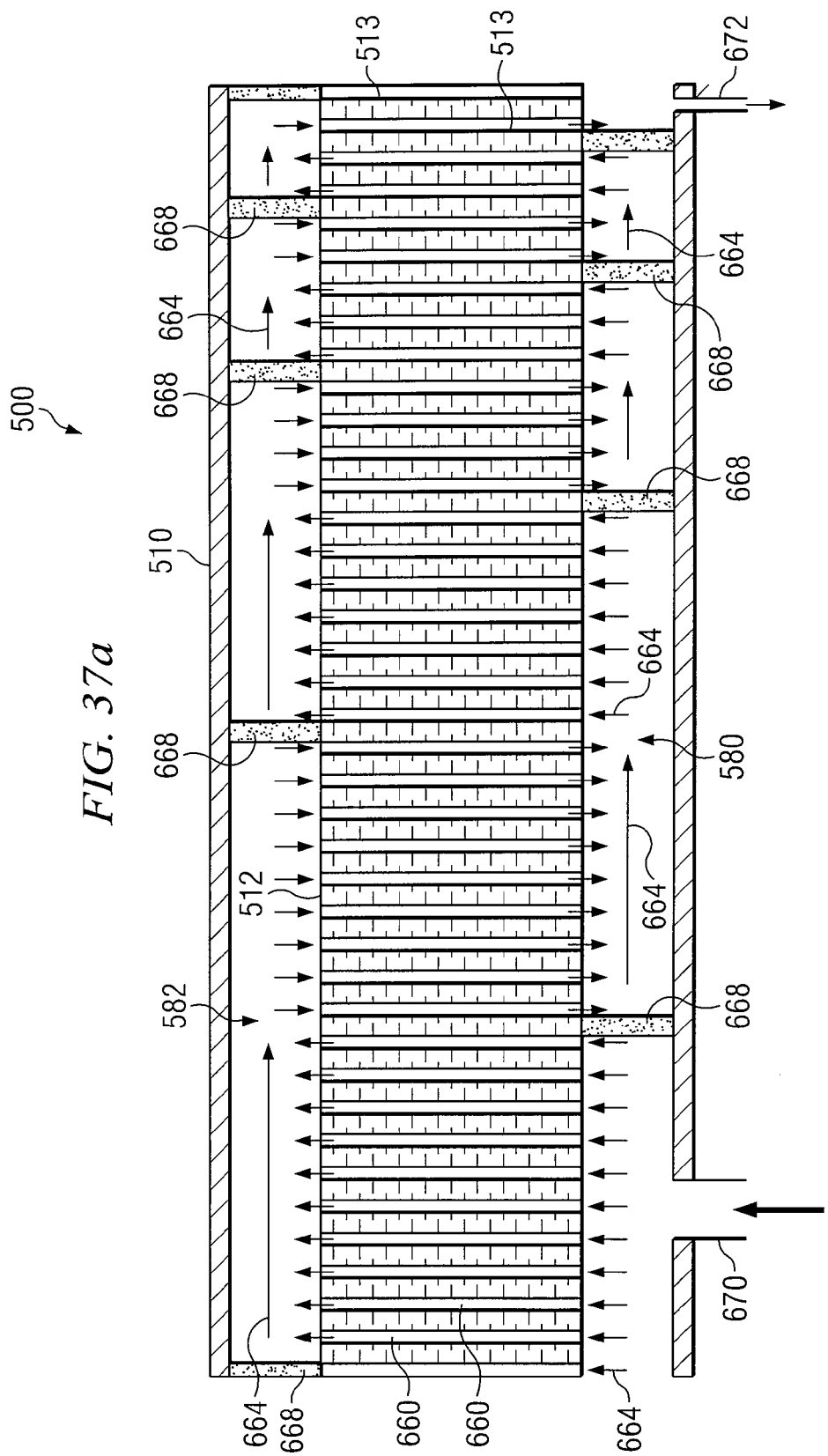

VAPOR-COMPRESSION EVAPORATION SYSTEM AND METHOD

RELATED APPLICATIONS

This application claims the benefit of Ser. No. 60/543,210 titled "Vapor-Compression Evaporator and Heat Exchanger Systems," filed provisionally on Feb. 10, 2004.

TECHNICAL FIELD OF THE INVENTION

The present invention relates generally to the field of evaporators and heat exchangers and, more particularly, to vapor-compression evaporation systems and methods.

BACKGROUND OF THE INVENTION

Typical steam jet ejectors feed high-pressure steam, at relatively high velocity, into the jet ejector. Steam is usually used as the motive fluid because it is readily available; however, an ejector may be designed to work with other gases or vapors as well. For some applications, water and other liquids are sometimes good motive fluids as they condense large quantities of vapor instead of having to compress them. Liquid motive fluids may also compress gases or vapors.

The motive high-pressure steam enters a nozzle and issues into the suction head as a high-velocity, low-pressure jet. The nozzle is an efficient device for converting the enthalpy of high-pressure steam or other fluid into kinetic energy. A suction head connects to the system being evacuated. The high-velocity jet issues from the nozzle and rushes through the suction head.

Gases or vapors from the system being evacuated enter the suction head where they are entrained by the high-velocity motive fluid, which accelerates them to a high velocity and sweeps them into the diffuser. The process in the diffuser is the reverse of that in the nozzle. It transforms a high-velocity, low-pressure jet stream into a high-pressure, low-velocity stream. Thus, in the final stage, the high-velocity stream passes through the diffuser and is exhausted at the pressure of the discharge line.

SUMMARY OF THE INVENTION

According to one embodiment of the invention, a vapor-compression evaporation system includes a plurality of vessels in series each containing a feed having a nonvolatile component. A first set of the plurality of vessels includes vapor-compression evaporators and a second set of the plurality of vessels includes multi-effect evaporators. A mechanical compressor is coupled to the last vessel in the series of vapor-compression evaporators and is operable to receive a vapor therefrom. A turbine is coupled to, and operable to drive, the mechanical compressor. A pump is operable to deliver a cooling liquid to the mechanical compressor, and a tank is coupled to the mechanical compressor and is operable to separate liquid and vapor received from the mechanical compressor. A plurality of heat exchangers is coupled inside respective ones of the vessels, wherein the heat exchanger in the first vessel in the first set is operable to receive the vapor from the tank, and at least some of the vapor condenses therein. The heat of condensation provides the heat of evaporation to the first vessel in the first set, and at least some of the vapor inside the first vessel in the first set is delivered to the heat exchanger in the next vessel in the first set, whereby the condensing, evaporating, and delivering steps continue until the last vessel in the second set is reached.

Embodiments of the invention provide a number of technical advantages. Embodiments of the invention may include all, some, or none of these advantages. For example, because the vapor flow through the compressors is smaller, the compressors may be smaller than previous compressors. The compression ratio may be adjusted so the compressor operates in its most efficient range. This is particularly important for a straight-lobe compressor, which has better efficiency at lower compression ratios. Because multiple stages may be used in the vapor-compression evaporators, the compressor may be small, and compressor energy efficiency may be improved using liquid water injection.

Heat exchanger coatings may prevent scaling and thereby facilitate an increase in the system pressure and temperature. This has the following benefits: (1) the compressor may be compact; (2) the compressor may operate in a more efficient region; and (3) many stages may be used in a multi-effect evaporator section. Heat exchangers may be easily disassembled to replace worn components, and the tanks and heat exchangers may be integrated into a single unit. The channels that feed the heat exchangers may have a large flow area to reduce pressure drop, which increases system efficiency. A pipe allows the heat exchangers to operate at elevated pressures, and the sheet metal heat transfer surfaces are inexpensive compared to tubular heat transfer surfaces. The sensible and latent heat exchangers may be integrated into a single low-cost system.

BRIEF DESCRIPTION OF THE DRAWINGS

For a more complete understanding of the invention, and for further features and advantages, reference is now made to the following description, taken in conjunction with the accompanying drawings, in which:

FIGS. 9 through 48 illustrate various embodiments of heat exchanger systems according to various embodiments of the present invention.

DETAILED DESCRIPTION

In some embodiments, the technology described herein may be utilized in conjunction with the technology described in U.S. patent application Ser. Nos. 10/944,071, 10/944,374, and 10/944,317, which are herein incorporated by reference.

FIGS. 1 through 8 illustrate various embodiments of a vapor-compression evaporator system according to various embodiments of the present invention.

Figure 1:
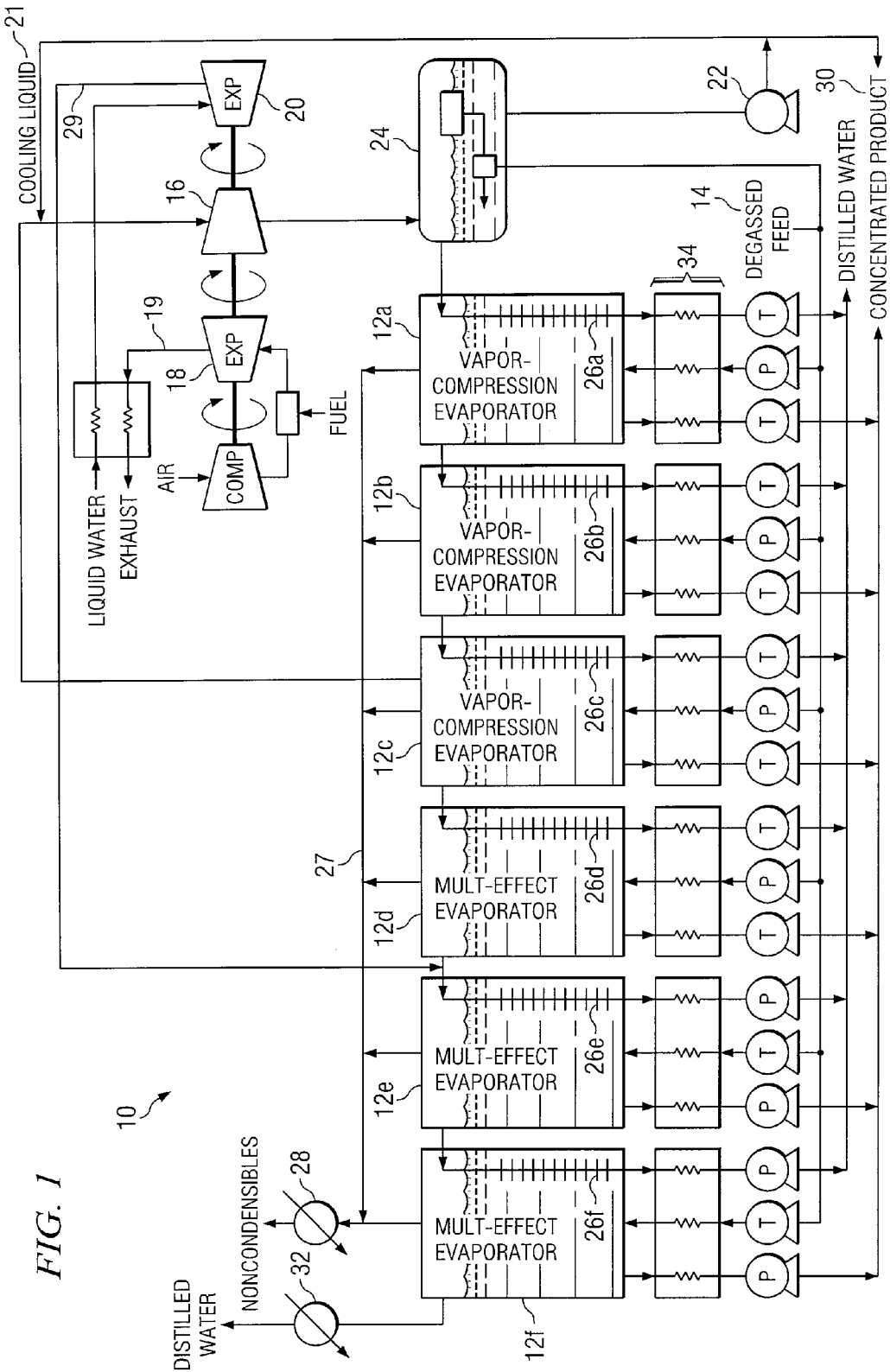
FIGS. 1 through 8 illustrate various embodiments of a vapor-compression evaporator systems according to various embodiments of the present invention.

FIG. 1 illustrates a vapor-compression evaporator system 10 according to one embodiment of the invention. In the illustrated embodiment, system 10 includes a plurality of vessels 12a-f in series to form a multi-effect evaporator system. A multi-effect evaporator system operates at successively lower pressures and temperatures. Generally, steam from a higher pressure evaporator boils water in an adjacent lower pressure evaporator. In the illustrated embodiment, vessels 12a-f are divided into two sets. The rightmost set of vessels 12a-c are called the "vapor-compression evaporators" and the leftmost set of vessels 12d-f are called the "multi-effect evaporators." Energy is supplied to the vapor-compression evaporators using vapor compression, and energy is supplied to the multi-effect evaporators using excess steam generated in the vapor-compression evaporators. A pump may be required to transport fluid from low to high pressure. To recover energy, a suitable turbine may be optionally employed when fluid flows from a high to low pressure.

Each vessel contains a feed 14 having a nonvolatile component, such as salt or sugar. The feed 404 may first be degassed by pulling a vacuum on it (equipment not explicitly shown); however, degassing may occur using a number of suitable technologies. For example, feed 14 may be introduced into a packed column operated at vacuum conditions. To enhance degassing, steam may introduced into the packed column to strip dissolved air. Another degassing method may employ a hydrophobic membrane, such that a vacuum on one side of the membrane removes dissolved gases but liquid cannot pass through.

A mechanical compressor 16 is coupled to the last vessel in the vapor-compression evaporators series (12c) and is operable to receive a vapor therefrom. Any suitable mechanical compressor may be utilized. In the illustrated embodiment, a "combined cycle" engine, which includes a gas turbine 18 (Brayton Cycle) and a steam turbine 20 (Rankine Cycle) is utilized to power mechanical compressor 16. Waste heat from gas turbine 18 (as indicated by reference numeral 19) is used to make steam that powers steam turbine 20.

Mechanical compressor 16 pulls vapors from the low-pressure evaporator (12c) in the vapor-compression evaporator section. Liquid water, as indicated by reference numeral 21, is injected into mechanical compressor 16 via a suitable pump 22 to keep it cool, which improves energy efficiency. The liquid water may be saltwater or freshwater. Saltwater is preferred if mechanical compressor 16 may tolerate salt, otherwise freshwater may be used. If saltwater is used as the injection water, a knock-out tank 24 is coupled to mechanical compressor 16 to prevent salt water from being entrained in the outlet vapors. The vapors produced from the evaporation of the injection water provide energy to vessels 12a-f.

A plurality of heat exchangers 26a-f are coupled inside respective vessels 12a-f. Heat exchanger 12a is operable to receive the vapor from knock-out tank 24. At least some of the vapor condenses therein, whereby the heat of condensation provides the heat of evaporation to vessel 12a. At least some of the vapor inside vessel 12a is delivered to heat exchanger 26b, whereby the condensing, evaporating, and delivering steps continue until the last vessel in the series is reached (in this embodiment, vessel 12f).

Concentrated product 30 may be removed from each of the vessels 12a-f. Energy that is added to system 10 may be removed using a suitable condenser 32. Alternatively, if condenser 32 were eliminated, the energy added to system 10 increases the temperature of concentrated product 30. This is acceptable if the product is not temperature sensitive. Even though feed 14 is degassed, there often may be some gas that enters system 10. To remove noncondensibles from system 10, a small stream (as indicated by reference numeral 27) is pulled from each vessel 12a-f, passed through a suitable condenser 28, and sent to a vacuum pump (not shown). Condenser 28 may knock out water in the bleed stream, which prevents loss of water vapor and reduces the load on the vacuum pump needed for the low-pressure sections of vessels 12a-f. Low-pressure steam (as indicated by reference numeral 29) from the exhaust of steam turbine 20 may be added to the series of vessels 12a-f where the pressures of the exhaust steam and evaporators most closely match, in this embodiment, between vessels 12c and 12d. A plurality of sensible heat exchangers 34 may be coupled to vessels 12a-f for heating feed 14 or for other suitable functions.

Figure 2:
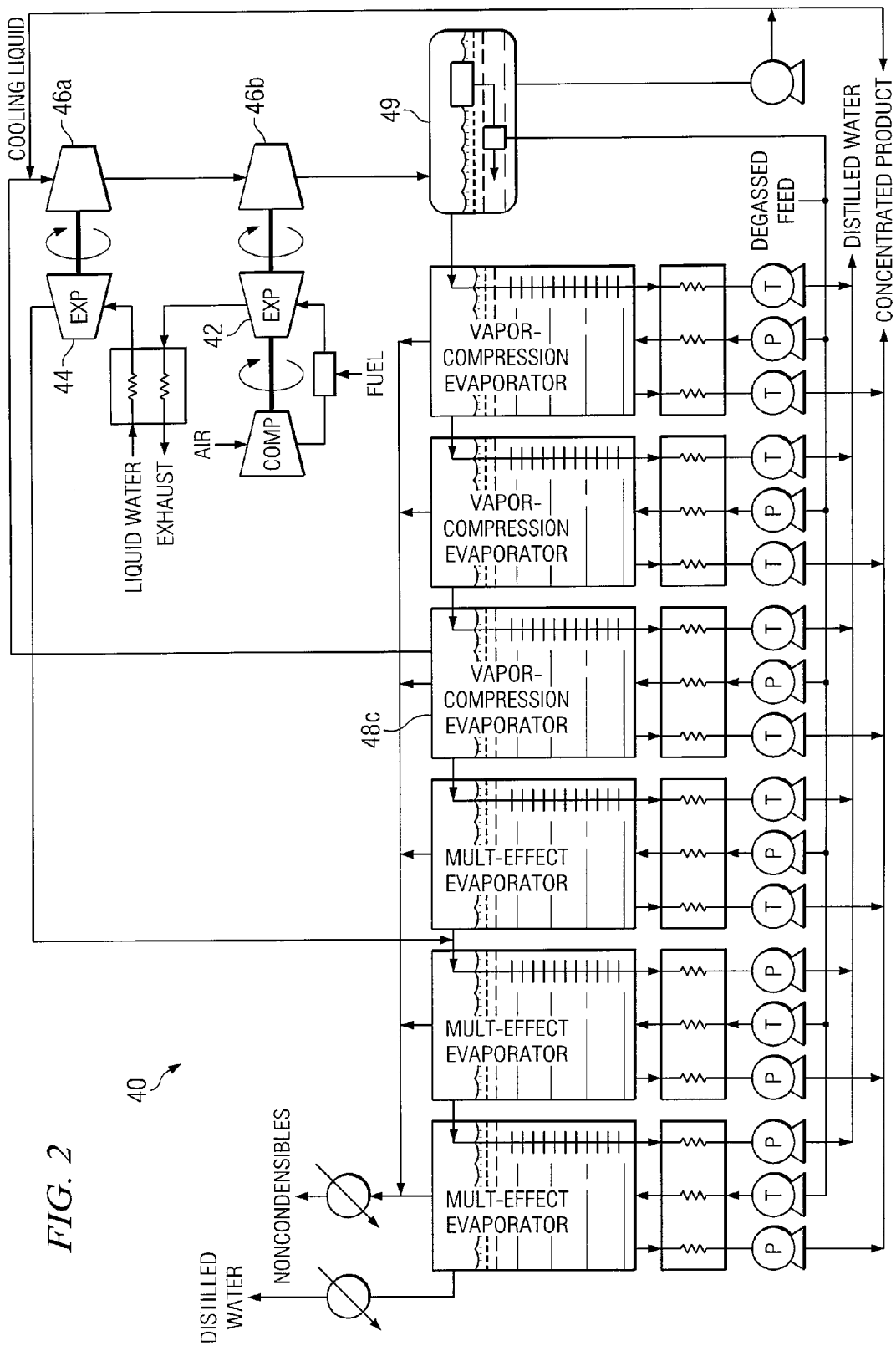

FIG. 2 illustrates a vapor-compression evaporator system 40 according to another embodiment of the invention. System 40 is similar to system 10 above; however, in system 40 a gas turbine 42 and a steam turbine 44 each drive their own mechanical compressor 46a, 46b. Compressors 46a, 46b are arranged in series so that mechanical compressor 46a is coupled to the last vessel in the vapor-compression evaporators series (vessel 48c) and is operable to receive a vapor therefrom, while mechanical compressor 46b receives compressed vapor from mechanical compressor 46a and delivers it a knock-out tank 49.

Figure 3:
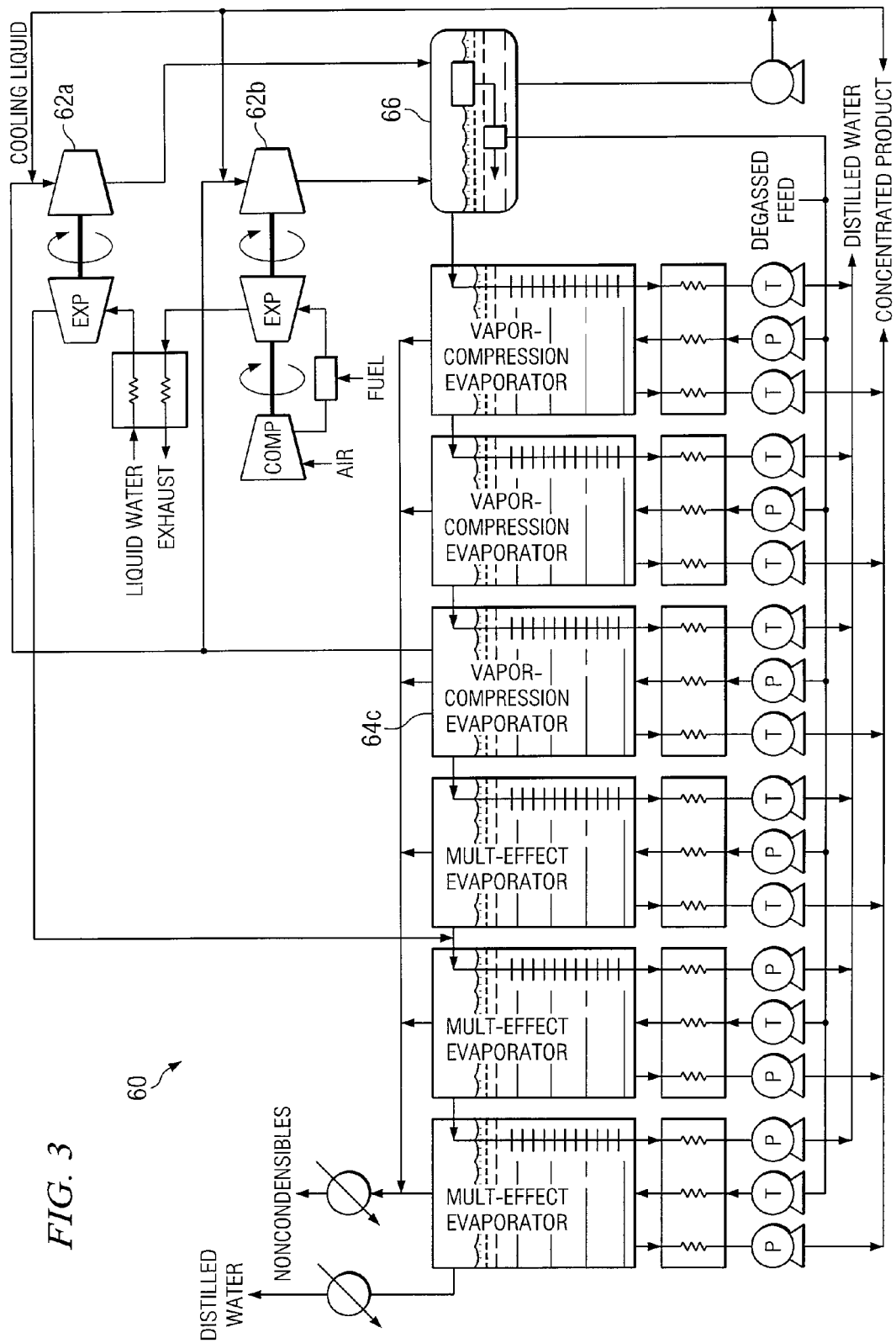

FIG. 3 illustrates a vapor-compression evaporator system 60 according to another embodiment of the invention. System 60 is similar to system 40 above; however, in system 60 the mechanical compressors 62a, 62b are arranged in parallel so that mechanical compressors 62a, 62b each are coupled to the last vessel in the vapor-compression evaporators series (vessel 64c) and operable to receive a vapor therefrom before delivering it a knock-out tank 66.

Figure 4:
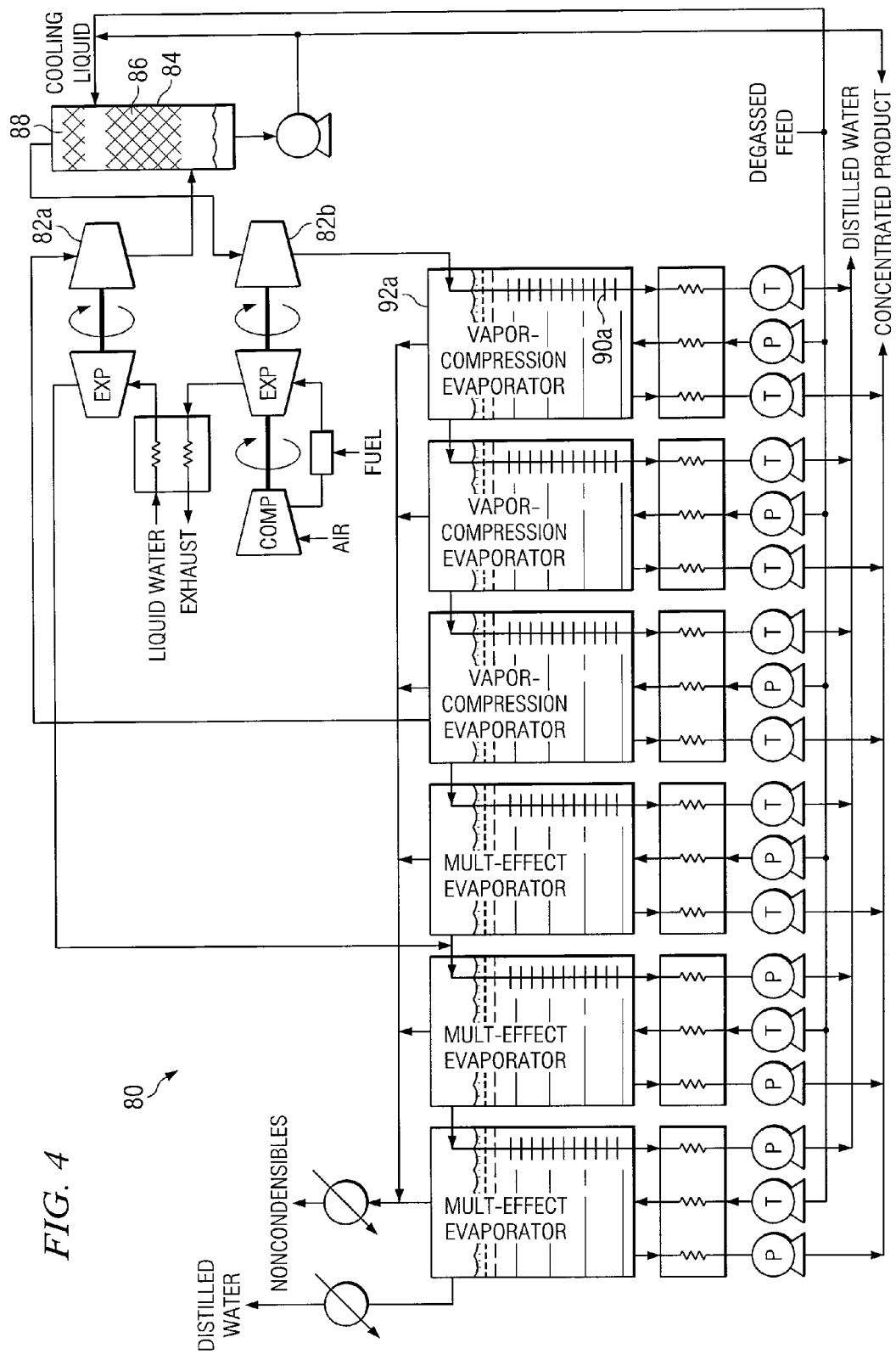

FIG. 4 illustrates a vapor-compression evaporator system 80 according to another embodiment of the invention. System 80 is similar to system 40 above; however, in system 80 liquid water is not injected directly into either mechanical compressor 82a or 82b. Instead, an intercooler 84 is used that employs a packed column 86 that has liquid water, such as saltwater or freshwater, trickling over packed column 86. A demister 88 near the top of intercooler 84 prevents liquid droplets from entering the second compression stage, i.e., mechanical compressor 82b. System 80 also illustrates the elimination of a knock-out tank. In this embodiment, vapor exiting mechanical compressor 82b enters a heat exchanger 90a in a vessel 92a.

Figure 5:
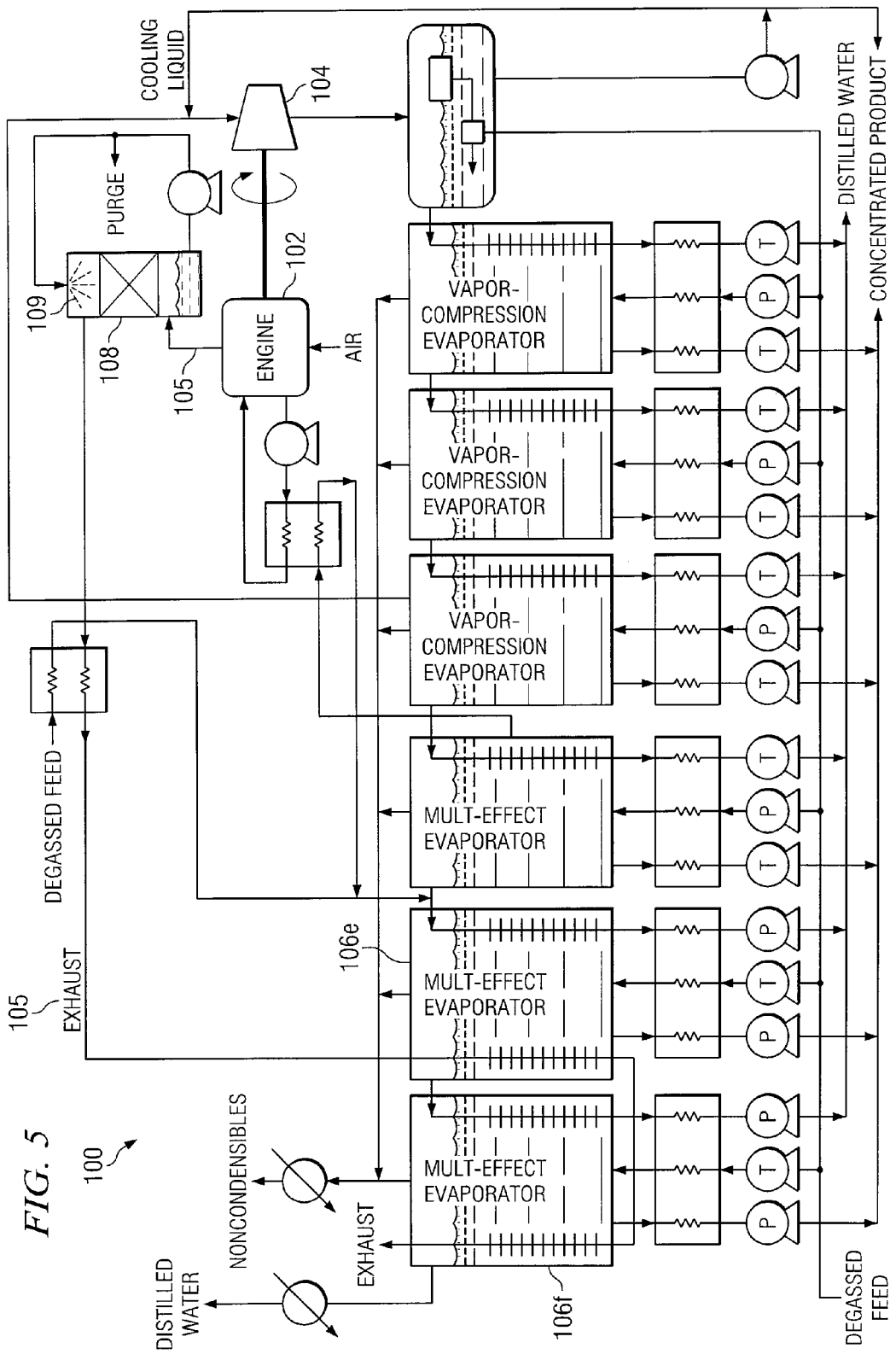

FIG. 5 illustrates a vapor-compression evaporator system 100 according to another embodiment of the invention. System 100 is similar to system 10 above; however, in system 100 an internal combustion engine 102, such as a Diesel engine or Otto cycle engine, is utilized to power a mechanical compressor 104. Waste heat from engine 102 comes from two sources: gaseous exhaust (as indicated by reference numeral 105) and the coolant that circulates through the cylinders. In one embodiment, the circulating coolant provides waste heat at approximately 100° C., which may be added to the multi-effect evaporators. The exhaust gases (105) are at approximately 800° C. and may be used to generate additional steam for the multi-effect evaporators (in this embodiment, vessels 106e, 106f). Because the gas is very hot, it could potentially damage the heat exchangers 108e, 108f. Optionally, exhaust gas 105 may be sent to a packed column 108 with trickling water 109, which lowers the temperature by generating steam. A further advantage of packed column 108 is that it may wash soot from the exhaust 105, which could potentially coat the surfaces of heat exchangers 106e, 106f and reduce heat transfer effectiveness.

Figure 6:
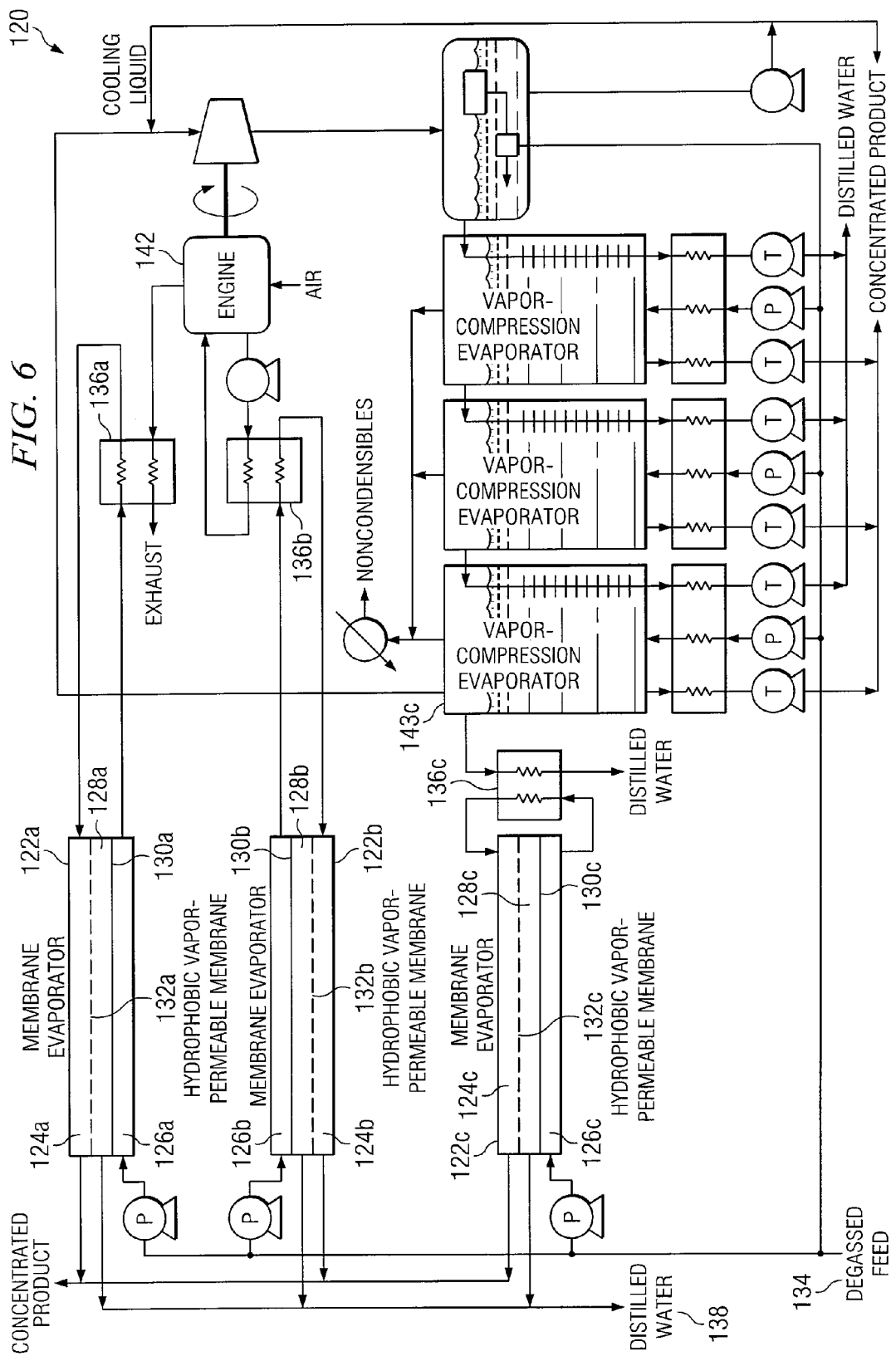

FIG. 6 illustrates a vapor-compression evaporator system 120 according to another embodiment of the invention. System 120 is similar to system 100 above; however, system 120 employs one or more membrane evaporators 122a-c to replace some or all of the multi-effect evaporators. In the illustrated embodiment, membrane evaporators 122a-c each have three chambers. A pair of outer chambers 124a-c, 126a-c separated by an inner chamber 128a-c. Outer chambers 124a-c, 126a-c have saltwater flowing therethrough and inner chamber 128a-c has freshwater flowing therethrough. Outer chambers 126a-c are separated from inner chambers 128a-c by an impermeable membrane 130a-c, and outer chambers 124a-c are separated from inner chambers 128a-c by a hydrophobic vapor-permeable membrane 132a-c.

In operation of one embodiment of system 120, feed water 134 enters outer chambers 126a-c. As feed water 134 flows through outer chambers 126a-c, the temperature of feed water 134 rises due to heat transfer through impermeable membranes 130a-c. Feed water 134 exits outer chambers 126a-c and enters respective heat exchangers 136a-c where the temperature of feed water 134 rises by a few degrees (typically, between 5 and 10° C.). The heat required by heat exchangers 136a-c may come from any suitable source. In the illustrated embodiment, heat exchanger 136c receives heat from the last vessel in the series of vapor-compression evaporators (vessel 143c). Both heat exchanger 136a and 136b receive heat from an engine 142.

Feed water 134 then enters outer chambers 124a-c. Water evaporates from the hot feed water 134 and flows through hydrophobic vapor-permeable membranes 132a-c, thereby condensing in inner chambers 128a-c. The water may then be collected as product water, as indicated by reference numeral 138.

Figure 7:
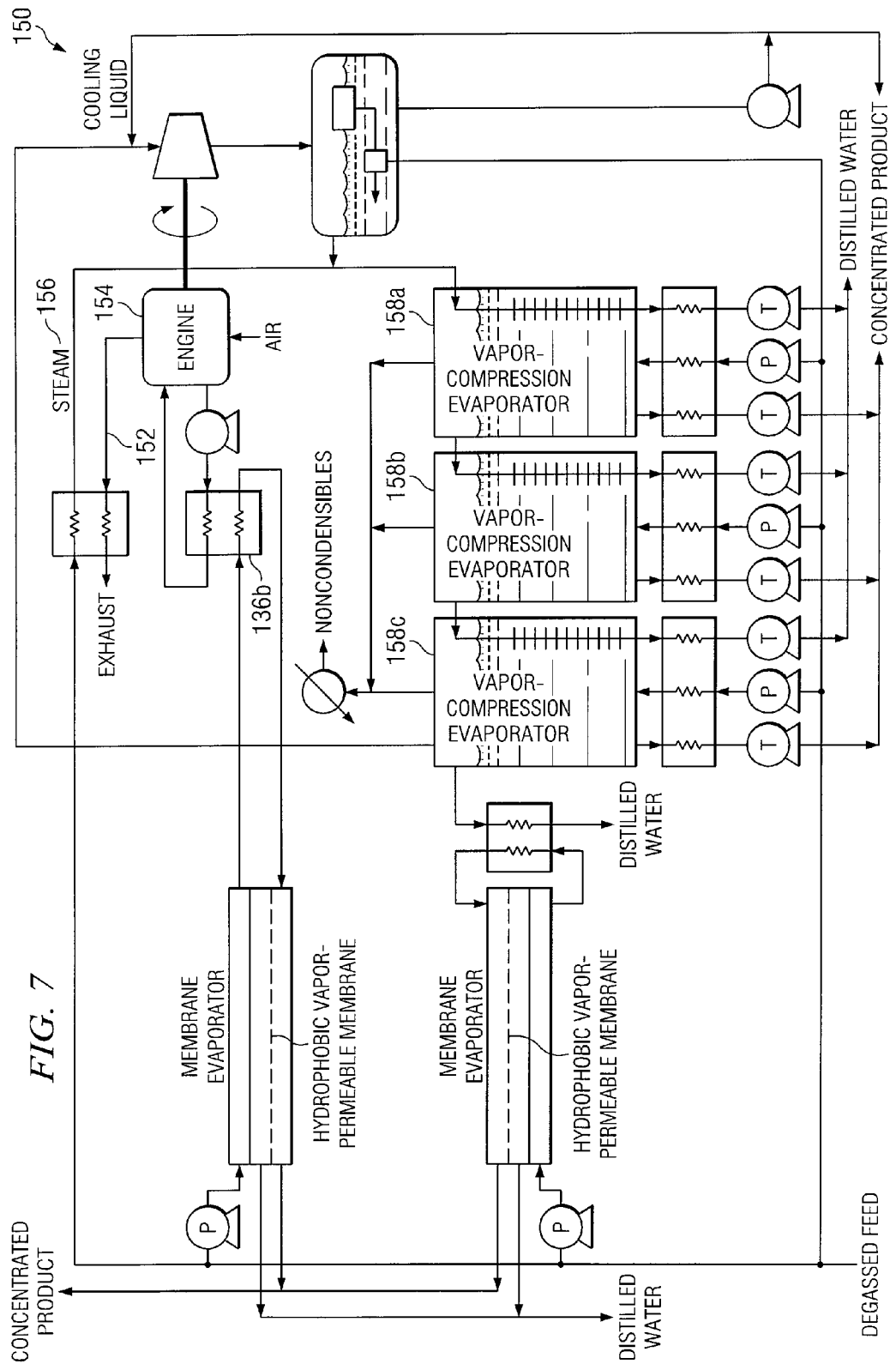

FIG. 7 illustrates a vapor-compression evaporator system 150 according to another embodiment of the invention. System 150 is similar to system 120 above; however, system 150 employs waste heat from a gaseous exhaust 152 of an engine 154 to make steam 156 that is employed in the vapor-compression evaporators 158a-c.

The above systems may use any suitable mechanical compressor types. For example, high-speed shafts from gas or steam turbines are best suited to drive centrifugal or axial vane compressors. Low-speed shafts from Diesel or Otto engines are best suited to drive gerotor, helical screw, sliding vane, or straight-lobe compressors (e.g., Roots blowers). Straight-lobe compressors may be particularly attractive because they are inexpensive; however, straight-lobe compressors are efficient only at low compression ratios.

Figure 8:
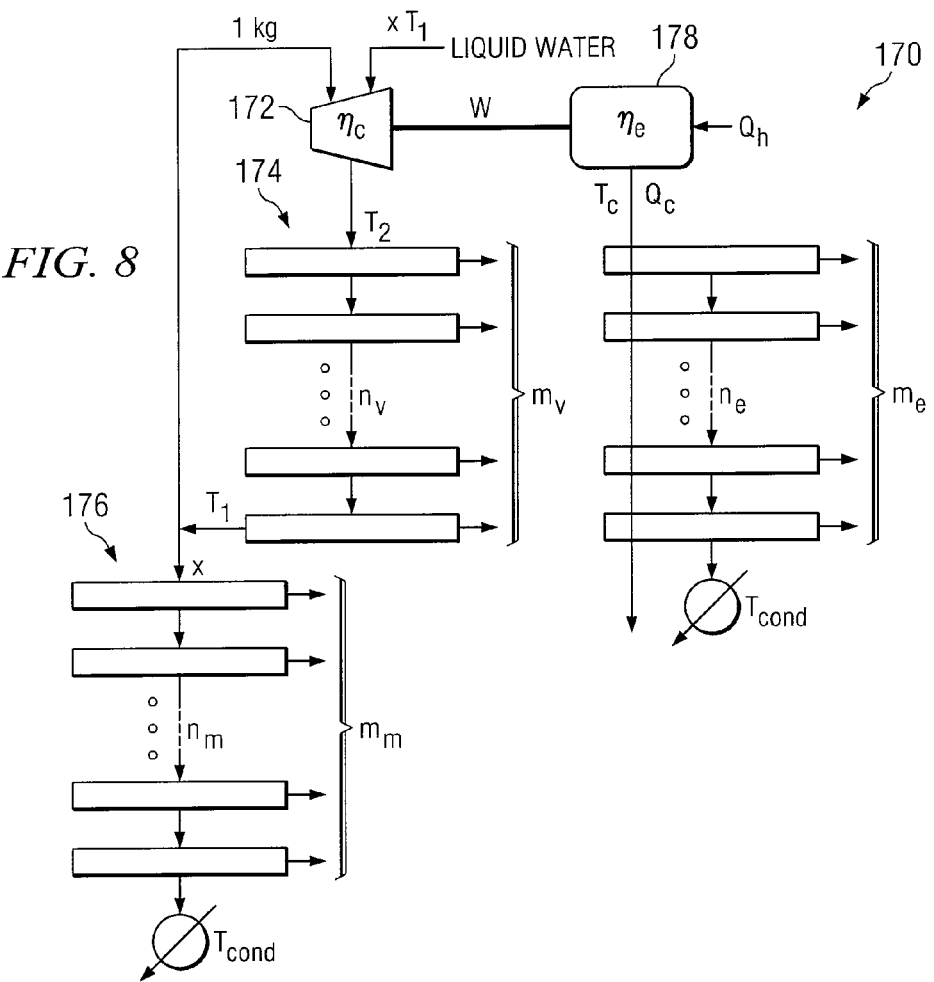

FIG. 8 shows the energy mass balances for an evaporation system 170. The basis of the calculation is 1 kg of saturated water vapor at $T_1$. The work required in a compressor 172 is $$W = \frac{(1+x)\hat{H}_2^{vap} - (\hat{H}_1^{vap} + x\hat{H}_1^{liq})}{\eta_c} \quad (1)$$

The compressor work may be divided into two portions: the ideal work requirements plus the "lost" work that is converted to thermal energy.

$$W = W_{ideal} + W_{lost} \quad (2)$$

$$W = \frac{(1+x)\hat{H}_2^{vap} - (\hat{H}_1^{vap} + x\hat{H}_1^{liq})}{\eta_c}$$

$$= (1+x)\hat{H}_2^{vap} - (\hat{H}_1^{vap} - x\hat{H}_1^{liq}) + W_{lost}$$

$$W_{lost} = \frac{(1+x)\hat{H}_2^{vap} - (\hat{H}_1^{vap} + x\hat{H}_1^{liq})}{\eta_c} - [(1+x)\hat{H}_2^{vap} - (\hat{H}_1^{vap} + x\hat{H}_1^{liq})]$$

-continued $$W_{lost} = \left[\frac{1}{\eta_c} - 1\right][(1+x)\hat{H}_2^{vap} - (\hat{H}_1^{vap} - x\hat{H}_1^{liq})] \quad (3)$$

The following is an entropy accounting around compressor 172:

Accumulation=Input−Output+Generation−Consumption (4)

At steady state, $$0 = (\hat{S}_1^{vap} + x\hat{S}_1^{liq}) - (1+x)\hat{S}_2^{vap} + \frac{W_{lost}}{T_{ave}} - 0 \quad (5)$$

where $T_{ave}$ is the average temperature of compressor 172 and must be expressed as absolute temperature. Substituting Equation 3 for $T_{lost}$ and the arithmetic average for $T_{ave}$:

$$0 = \quad (6)$$

$$(\hat{S}_1^{vap} + x\hat{S}_1^{liq}) - (1+x)\hat{S}_2^{vap} + \frac{\left[\frac{1}{\eta_c} - 1\right][(1+x)\hat{H}_2^{vap} - (\hat{H}_2^{vap} + x\hat{H}_1^{liq})]}{\frac{T_2 + T_1}{2}}$$

The following definition is made:

$$k \equiv \frac{\left[\frac{1}{\eta_c} - 1\right]}{\frac{T_2 + T_1}{2}} = \frac{2\left[\frac{1}{\eta_c} - 1\right]}{T_2 + T_1} \quad (7)$$

which may be substituted into Equation 6:

$$0 = (\hat{S}_1^{vap} + x\hat{S}_1^{liq}) - (1 \times x)\hat{S}_2^{vap} + k[(1+x)\hat{H}_2^{vap} - (\hat{H}_1^{vap} - x\hat{H}_1^{liq})] \quad (8)$$

To solve for x, the amount of injection water that evaporates in compressor 172, Equation 8 may be expanded as follows:

$$0 = \hat{S}_1^{vap} + x\hat{S}_1^{liq} - \hat{S}_2^{vap} - x\hat{S}_2^{vap} + k\hat{H}_2^{vap} + xk\hat{H}_2^{vap} - k\hat{H}_1^{vap} - xk\hat{H}_1^{liq} \quad (9)$$

$$0 = \hat{S}_1^{vap} - \hat{S}_2^{vap} + k\hat{H}_2^{vap} - k\hat{H}_1^{vap} + x\hat{S}_1^{liq} - x\hat{S}_2^{vap} + xk\hat{H}_2^{vap} - xk\hat{H}_1^{liq}$$

$$0 = \hat{S}_1^{vap} - \hat{S}_2^{vap} + k\hat{H}_2^{vap} - k\hat{H}_1^{vap} + x[\hat{S}_1^{liq} - \hat{S}_2^{vap} + k\hat{H}_2^{vap} - k\hat{H}_1^{liq}]$$

$$0 = \hat{S}_1^{vap} - \hat{S}_2^{vap} + k(\hat{H}_2^{vap} - \hat{H}_1^{vap}) + x[\hat{S}_1^{liq} - \hat{S}_2^{vap} + k(\hat{H}_2^{vap} - \hat{H}_1^{liq})]$$

$$-x = [\hat{S}_1^{liq} - \hat{S}_2^{vap} + k(\hat{H}_2^{vap} - \hat{H}_1^{liq})] = \hat{S}_1^{vap} - \hat{S}_2^{vap} + k(\hat{H}_2^{vap} - \hat{H}_1^{vap})$$

$$x = \frac{\hat{S}_1^{vap} - \hat{S}_2^{vap} + k(\hat{H}_2^{vap} - \hat{H}_1^{vap})}{-[\hat{S}_1^{liq} - \hat{S}_2^{vap} + k(\hat{H}_2^{vap} - \hat{H}_1^{liq})]}$$

$$x = \frac{\hat{S}_1^{vap} - \hat{S}_2^{vap} + k(\hat{H}_2^{vap} - \hat{H}_1^{vap})}{\hat{S}_2^{vap} - \hat{S}_1^{liq} + k(\hat{H}_1^{liq} - \hat{H}_2^{vap})}$$

From Equation 7, the definition of k may be substituted into Equation 9:

$$x = \frac{\hat{S}_1^{vap} - \hat{S}_2^{vap} + \frac{2\left[\frac{1}{\eta_c - 1}\right]}{T_2 + T_1}(\hat{H}_2^{vap} - \hat{H}_1^{vap})}{\hat{S}_2^{vap} - \hat{S}_1^{liq} + \frac{2\left[\frac{1}{\eta_c - 1}\right]}{T_2 + T_1}(\hat{H}_1^{liq} - \hat{H}_2^{vap})} \quad (10)$$

The water $m_v$ produced by the vapor-compression evaporator 174 is:

$$m_v = n_v(1 + x) \quad (11)$$

where $n_v$ is the number of stages in the vapor-compression evaporators 174, which may be arbitrarily selected.

The water $m_m$ produced in the multi-effect evaporator section 176 is:

$$m_m = n_m \times \frac{\Delta H_1^{vap}}{\Delta H_{ave}^{vap}} = \left(\frac{T_1 - T_{cond}}{\Delta T}\right) \times \frac{\Delta H_1^{vap}}{\Delta H_{ave}^{vap}} \quad (12)$$

where $\Delta T$ is the temperature difference in each heat exchanger of the multi-effect evaporator 176, $\Delta H_a^{vap}$ is the latent heat of evaporation of the compressor inlet, and $\Delta H_{ave}^{vap}$ is the average latent heat of evaporation in the multi-effect evaporator 176.

The water $m_e$ produced in the multi-effect evaporator 176 that uses waste heat from the engine is:

$$\begin{aligned}
m_e &= n_e \frac{Q_c}{2\Delta\hat{H}^{vap}} \\
&= \left(\frac{T_c - T_{cond}}{\Delta T}\right)\frac{Q_c}{2\Delta\hat{H}^{vap}} \\
&= \left(\frac{T_c - T_{cond}}{\Delta T}\right)\frac{1}{2\Delta\hat{H}^{vap}}\left(\frac{1 - \eta_e}{\eta_e}\right)W \\
&= \left(\frac{T_c - T_{cond}}{\Delta T}\right)\frac{1}{2\Delta\hat{H}^{vap}}\left(\frac{1 - \eta_e}{\eta_e}\right)\frac{(1+x)\hat{H}_2^{vap} - (\hat{H}_1^{vap} + x\hat{H}_1^{liq})}{\eta_c}
\end{aligned} \quad (13)$$

It is assumed that the waste heat is available as sensible heat (e.g., Diesel engine exhaust gas, hot gas from Rankine boiler). The factor of 2 in equation (13) accounts for the fact that the waste heat $Q_c$ is available as sensible heat, not latent heat. Rather than transferring all the waste heat $Q_c$ at $T_c$ to the top evaporator, each evaporator receives $1/n_e Q_c$ in direct heat transfer from the waste gas stream. Effectively, this reduces the output of the multi-effect evaporator by half.

The total water $m_t$ produced is $$m_t = m_v + m_m + m_e \quad (14)$$

The high temperature heat supplied to the engine 178 is:

$$Q_h = \frac{W}{\eta_e} = \frac{(1+x)\hat{H}_2^{vap} - (\hat{H}_1^{vap} + x\hat{H}_1^{liq})}{\eta_e \eta_c} \quad (15)$$

The specific heat requirement is:

$$\text{Specific Heat Requirement is} = \frac{Q_h}{m_t} \quad (16)$$

and the specific work requirement is:

$$\text{Specific Work Requirement is} = \frac{W}{m_t} \quad (17)$$

The specific compressor inlet volume is:

$$\text{Specific Compressor Inlet Volume} = \frac{\hat{V}_1}{m_t} \quad (18)$$

The number of equivalent effects is:

$$\text{Equivalent Effects} = \frac{m_t \Delta \hat{H}^{vap}}{Q_h} \quad (19)$$

Table 1 shows the expected energy efficiency of a desalination system driven by a high-efficiency engine ($\eta_e = 0.6$), such as a combined cycle (e.g., Brayton+Rankine) or a high-efficiency regenerated Brayton cycle. Table 2 shows the expected energy efficiency of a desalination system driven by a medium-efficiency engine ($\eta_e = 0.4$), such as a large Diesel engine. The $\Delta T$ across each evaporator heat exchanger is assumed to be 6° C. Table 3 shows relevant properties of water.

TABLE 1

Properties of combined cycle vapor-compression evaporator (Basis = 1 kg through compressor)

| $\Delta T$ (° C.) | $T_{cond}$ (° C.) | $T_c$ (° C.) | $D_c$ | $D_e$ | $\Delta H^{vap}$ (kJ/kg) |
|---|---|---|---|---|---|
| 6 | 25 | 100 | 0.8 | 0.6 | 2,100 |

| $T_1$ (° C.) | $P_1$ (atm) | $n_v$ | $T_2$ (OC) | $P_2$ (atm) | Comp. Ratio | $x$ | $m_v$ (kg) | $m_m$ (kg) | $m_e$ (kg) | $m_t$ (kg) | $W/m_t$ (kJ/kg) | $Q_h/m_t$ (kJ/kg) | $V_1/m_t$ (m3/kg) | Equiv. Effects |
|---|---|---|---|---|---|---|---|---|---|---|---|---|---|---|
| 100 | 1.00 | 5 | 130 | 2.66 | 2.66 | 0.084 | 5.42 | 1.01 | 0.59 | 7.02 | 42.39 | 70.65 | 0.24 | 29.72 |
|  |  | 10 | 160 | 6.10 | 6.10 | 0.164 | 11.65 | 1.97 | 1.16 | 14.77 | 39.44 | 65.74 | 0.11 | 31.95 |
| 148 | 4.45 | 5 | 178 | 9.44 | 2.12 | 0.077 | 5.39 | 1.46 | 0.49 | 7.34 | 33.71 | 56.18 | 0.055 | 37.38 |
|  |  | 10 | 208 | 18.07 | 4.06 | 0.154 | 11.54 | 2.91 | 0.96 | 15.41 | 31.35 | 52.24 | 0.026 | 40.20 |
| 178 | 9.44 | 5 | 208 | 18.07 | 1.91 | 0.076 | 5.38 | 1.74 | 0.44 | 7.56 | 29.16 | 48.61 | 0.026 | 43.20 |
|  |  | 10 | 238 | 31.87 | 3.38 | 0.154 | 11.54 | 3.52 | 0.85 | 15.91 | 26.97 | 44.95 | 0.012 | 46.71 |

TABLE 1-continued

Properties of combined cycle vapor-compression evaporator (Basis = 1 kg through compressor)

| 220 | 22.87 | 5  | 250 | 39.22 | 1.71 | 0.08  | 5.40  | 2.21 | 0.37 | 7.98  | 23.35 | 38.91 | 0.01   | 53.97 |
|-----|-------|----|-----|-------|------|-------|-------|------|------|-------|-------|-------|--------|-------|
|     |       | 10 | 280 | 63.29 | 2.77 | 0.169 | 11.69 | 4.65 | 0.72 | 17.05 | 21.19 | 35.32 | 0.0048 | 59.46 |
| 256 | 43.35 | 5  | 286 | 69.22 | 1.60 | 0.093 | 5.46  | 2.84 | 0.32 | 8.62  | 18.48 | 30.79 | 0.0048 | 68.20 |

TABLE 2

Properties of Diesel cycle vapor-compression evaporator (Basis = 1 kg through compressor)

| $\Delta T$ (° C.) | $T_{cond}$ (° C.) | $T_c$ (° C.) | $D_c$ | $D_e$ | $\Delta H^{vap}$ (kJ/kg) |
|---|---|---|---|---|---|
| 6 | 25 | 100 | 0.8 | 0.6 | 2,100 |

| $T_1$ (° C.) | $P_1$ (atm) | $n_v$ | $T_2$ (OC) | $P_2$ (atm) | Comp. Ratio | x | $m_v$ (kg) | $m_m$ (kg) | $m_e$ (kg) | $m_t$ (kg) | $W/m_t$ (kJ/kg) | $Q_h/m_t$ (kJ/kg) | $V_1/m_t^3$ (m3/kg) | Equiv. Effects |
|---|---|---|---|---|---|---|---|---|---|---|---|---|---|---|
| 100 | 1.00 | 5 | 130 | 2.66 | 2.66 | 0.084 | 5.42 | 1.01 | 1.33 | 7.76 | 38.36 | 95.90 | 0.21 | 21.90 |
|     |      | 10 | 160 | 6.10 | 6.10 | 0.164 | 11.65 | 1.97 | 2.60 | 16.21 | 35.93 | 89.82 | 0.10 | 23.38 |
| 148 | 4.45 | 5 | 178 | 9.44 | 2.12 | 0.077 | 5.39 | 1.46 | 1.10 | 7.95 | 31.11 | 77.77 | 0.051 | 27.00 |
|     |      | 10 | 208 | 18.07 | 4.06 | 0.154 | 11.54 | 2.91 | 2.16 | 16.60 | 29.09 | 72.71 | 0.025 | 28.88 |
| 178 | 9.44 | 5 | 208 | 18.07 | 1.91 | 0.076 | 5.38 | 1.74 | 0.98 | 8.10 | 27.20 | 67.99 | 0.024 | 30.89 |
|     |      | 10 | 238 | 31.87 | 3.38 | 0.154 | 11.54 | 3.52 | 1.92 | 16.98 | 25.28 | 63.20 | 0.012 | 33.23 |
| 220 | 22.87 | 5 | 250 | 39.22 | 1.71 | 0.08 | 5.40 | 2.21 | 0.83 | 8.44 | 22.07 | 55.17 | 0.01 | 38.06 |
|     |       | 10 | 280 | 63.29 | 2.77 | 0.169 | 11.69 | 4.65 | 1.61 | 17.95 | 20.13 | 50.33 | 0.0048 | 41.72 |
| 256 | 43.35 | 5 | 286 | 69.22 | 1.60 | 0.093 | 5.46 | 2.84 | 0.71 | 9.02 | 17.67 | 44.16 | 0.0048 | 47.55 |

TABLE 3

Thermodynamics of saturated water at 6° C. temperature intervals.

|  | P atm | TC | V m3/kg | H kJ/kg | S kJ/kg-K |
|---|---|---|---|---|---|
| Liquid | .999998 | 100.000 | .10434E-2 | 418.371 | 1.30434 |
| Vapor  | .999998 | 100.000 | 1.67359   | 2674.95 | 7.35172 |
| Liquid | 1.23396 | 106.000 | .10482E-2 | 443.704 | 1.37163 |
| Vapor  | 1.23396 | 106.000 | 1.37482   | 2684.34 | 7.28125 |
| Liquid | 1.51134 | 112.000 | .10533E-2 | 469.090 | 1.43798 |
| Vapor  | 1.51134 | 112.000 | 1.13728   | 2693.51 | 7.21344 |
| Liquid | 1.83798 | 118.000 | .10585E-2 | 494.534 | 1.50344 |
| Vapor  | 1.83798 | 118.000 | .946974   | 2702.44 | 7.14809 |
| Liquid | 2.22025 | 124.000 | .10640E-2 | 520.041 | 1.56805 |
| Vapor  | 2.22025 | 124.000 | .793416   | 2711.11 | 7.08505 |
| Liquid | 2.66494 | 130.000 | .10697E-2 | 545.617 | 1.63185 |
| Vapor  | 2.66494 | 130.000 | .668659   | 2719.52 | 7.02414 |
| Liquid | 3.17935 | 136.000 | .10756E-2 | 571.270 | 1.69487 |
| Vapor  | 3.17935 | 136.000 | .566639   | 2727.63 | 6.96522 |
| Liquid | 3.77124 | 142.000 | .10818E-2 | 597.006 | 1.75716 |
| Vapor  | 3.77124 | 142.000 | .482694   | 2735.43 | 6.90814 |
| Liquid | 4.44882 | 148.000 | .10883E-2 | 622.831 | 1.81874 |
| Vapor  | 4.44882 | 148.000 | .413219   | 2742.91 | 6.85277 |
| Liquid | 5.22080 | 154.000 | .10950E-2 | 648.754 | 1.87966 |
| Vapor  | 5.22080 | 154.000 | .355391   | 2750.04 | 6.79898 |
| Liquid | 6.09633 | 160.000 | .11019E-2 | 674.781 | 1.93994 |
| Vapor  | 6.09633 | 160.000 | .307000   | 2756.81 | 6.74666 |
| Liquid | 7.08503 | 166.000 | .11092E-2 | 700.922 | 1.99962 |
| Vapor  | 7.08503 | 169-.000 | .266300  | 2763.20 | 6.69569 |
| Liquid | 8.19696 | 172.000 | .11168E-2 | 727.184 | 2.05874 |
| Vapor  | 8.19696 | 172.000 | .231901   | 2769.19 | 6.64596 |
| Liquid | 9.44261 | 178.000 | .11246E-2 | 753.577 | 2.11732 |
| Vapor  | 9.44261 | 178.000 | .202692   | 2774.76 | 6.59738 |
| Liquid | 10.8329 | 184.000 | .11328E-2 | 780.111 | 2.17539 |
| Vapor  | 10.8329 | 184.000 | .177779   | 2779.89 | 6.54983 |
| Liquid | 12.3793 | 190.000 | .11414E-2 | 806.796 | 2.23300 |
| Vapor  | 12.3793 | 190.000 | .156440   | 2784.55 | 6.50323 |
| Liquid | 14.0934 | 196.000 | .11503E-2 | 833.644 | 2.29017 |
| Vapor  | 14.0934 | 196.000 | .138087   | 2788.74 | 6.45749 |
| Liquid | 15.9876 | 202.000 | .11596E-2 | 860.667 | 2.34693 |
| Vapor  | 15.9876 | 202.000 | .122240   | 2792.42 | 6.41251 |
| Liquid | 18.0743 | 208.000 | .11693E-2 | 887.877 | 2.40332 |
| Vapor  | 18.0743 | 208.000 | .108505   | 2795.58 | 6.36820 |

TABLE 3-continued

Thermodynamics of saturated water at 6° C. temperature intervals.

|  | P atm | TC | V m3/kg | H kJ/kg | S kJ/kg-K |
|---|---|---|---|---|---|
| Liquid | 20.3667 | 214.000 | .11795E-2 | 915.289 | 2.45938 |
| Vapor  | 20.3667 | 214.000 | .96559E-1 | 2798.17 | 6.32448 |
| Liquid | 22.8781 | 220.000 | .11901E-2 | 942.919 | 2.51514 |
| Vapor  | 22.8781 | 220.000 | .86132E-1 | 2800.19 | 6.28127 |
| Liquid | 25.6223 | 226.000 | .12012E-2 | 970.784 | 2.57063 |
| Vapor  | 25.6223 | 226.000 | .77000E-1 | 2801.58 | 6.23846 |
| Liquid | 28.6136 | 232.000 | .12128E-2 | 998.901 | 2.62589 |
| Vapor  | 28.6136 | 232.000 | .68977E-1 | 2802.33 | 6.19598 |
| Liquid | 31.8667 | 238.000 | .12251E-2 | 1027.29 | 2.68097 |
| Vapor  | 31.8667 | 238.000 | .61905E-1 | 2802.39 | 6.15372 |
| Liquid | 35.3966 | 244.000 | .12380E-2 | 1055.98 | 2.73591 |
| Vapor  | 35.3966 | 244.000 | .55654E-1 | 2801.72 | 6.11160 |
| Liquid | 39.2188 | 250.000 | .12515E-2 | 1084.99 | 2.79075 |
| Vapor  | 39.2188 | 250.000 | .50111E-1 | 2800.27 | 6.06952 |
| Liquid | 43.3494 | 256.000 | .12659E-2 | 1114.34 | 2.84555 |
| Vapor  | 43.3494 | 256.000 | .45183E-1 | 2798.00 | 6.02736 |
| Liquid | 47.8048 | 262.000 | 12810E-2  | 1144.08 | 2.90035 |
| Vapor  | 47.8048 | 262.000 | .40788E-1 | 2794.84 | 5.98502 |
| Liquid | 52.6021 | 268.000 | .12971E-2 | 1174.23 | 2.95521 |
| Vapor  | 52.6021 | 268.000 | .36859E-1 | 2790.73 | 5.94237 |
| Liquid | 57.7588 | 274.000 | .13142E-2 | 1204.84 | 3.01021 |
| Vapor  | 57.7588 | 274.000 | .33337E-1 | 2785.60 | 5.89928 |
| Liquid | 63.2931 | 280.000 | .13324E-2 | 1235.95 | 3.06541 |
| Vapor  | 63.2931 | 280.000 | .30170E-1 | 2779.35 | 5.85561 |
| Liquid | 69.2239 | 286.000 | .13520E-2 | 1267.61 | 3.12089 |
| Vapor  | 69.2239 | 286.000 | .27316E-1 | 2771.89 | 5.81118 |
| Liquid | 75.5709 | 292.000 | .13730E-2 | 1299.89 | 3.17675 |
| Vapor  | 75.5709 | 292.000 | .24737E-1 | 2763.11 | 5.76582 |
| Liquid | 82.3546 | 298.000 | .13957E-2 | 1332.86 | 3.23311 |
| Vapor  | 82.3546 | 298.000 | .22400E-1 | 2752.86 | 5.71931 |
| Liquid | 89.5964 | 304.000 | .14203E-2 | 1366.61 | 3.29008 |
| Vapor  | 89.5964 | 304.000 | .20276E-1 | 2740.99 | 5.67140 |
| Liquid | 97.3190 | 310.000 | .14473E-2 | 1401.24 | 3.34783 |
| Vapor  | 97.3190 | 310.000 | .18341E-1 | 2727.30 | 5.62181 |
| Liquid | 105.546 | 316.000 | .14769E-2 | 1436.88 | 3.40656 |
| Vapor  | 105.546 | 316.000 | .16571E-1 | 2711.57 | 5.57017 |
| Liquid | 114.304 | 322.000 | .15098E-2 | 1473.70 | 3.46651 |
| Vapor  | 114.304 | 322.000 | .14948E-1 | 2693.48 | 5.51605 |

TABLE 3-continued

Thermodynamics of saturated water at 6° C. temperature intervals.

|  | P atm | TC | V m3/kg | H kJ/kg | S kJ/kg-K |
|---|---|---|---|---|---|
| Liquid | 123.619 | 328.000 | .15467E-2 | 1511.92 | 3.52800 |
| Vapor | 123.619 | 328.000 | .13453E-1 | 2672.68 | 5.45889 |
| Liquid | 133.521 | 334.000 | .15888E-2 | 1551.84 | 3.59146 |
| Vapor | 133.521 | 334.000 | .12070E-1 | 2648.67 | 5.39798 |
| Liquid | 144.043 | 340.000 | .16374E-2 | 1593.86 | 3.65750 |
| Vapor | 144.043 | 340.000 | .10783E-1 | 2620.76 | 5.33230 |
| Liquid | 155.221 | 346.000 | .16951E-2 | 1638.59 | 3.72704 |
| Vapor | 155.221 | 346.000 | .95772E-2 | 2587.97 | 5.26040 |
| Liquid | 167.097 | 352.000 | .17657E-2 | 1687.02 | 3.80153 |
| Vapor | 167.097 | 352.000 | .84336E-2 | 2548.74 | 5.17996 |
| Liquid | 179.723 | 358.000 | .18569E-2 | 1740.90 | 3.88361 |
| Vapor | 179.723 | 358.000 | .73286E-2 | 2500.29 | 5.08679 |
| Liquid | 193.166 | 364.000 | .19856E-2 | 1804.09 | 3.97913 |
| Vapor | 193.166 | 364.000 | .62194E-2 | 2436.52 | 4.97172 |
| Liquid | 207.538 | 370.000 | .22134E-2 | 1889.64 | 4.10798 |
| Vapor | 207.538 | 370.000 | .49783E-2 | 2337.17 | 4.80382 |
| Liquid | 217.755 | 373.990 | .31056E-2 | 2087.96 | 4.41107 |
| Vapor | 217.755 | 373.990 | .31056E-2 | 2087.96 | 4.41107 |

In both Tables 1 and 2, the energy efficiency improves at higher $T_1$. This may be explained as follows:

a. At higher temperatures $T_1$, to achieve a given temperature difference across the vapor-compression evaporators, the compression ratio reduces. This factor reflects the underlying thermodynamics of water.

b. At higher temperatures $T_1$, it is possible to have more stages in the multi-effect evaporator.

Another benefit of operating at higher temperatures is that the pressure increases as well, which raises the density of the vapors entering the compressor. This allows the compressor to be smaller, and more economical. The compressor size may be further reduced by increasing the number of stages in the vapor-compression evaporator section. Yet another benefit of operating at higher temperatures is the compression ratio reduces, which allows the use of straight-lobe compressors, which are only energy efficient at low compression ratios. Straight-lobe compressors are particularly desirable because they are inexpensive compared to other compressor types. Also, their speed and performance characteristics are well matched to Diesel engines, which are energy-efficient and low-cost.

Normally, desalination heat exchangers are limited to about 120° C. Above this temperature, calcium and magnesium carbonates and sulfates precipitate and may foul heat exchanger surfaces. This temperature may be too low to fully realize the benefits of high-temperature vapor-compression evaporation.

In some embodiments, non-stick coatings may prevent fouling of heat exchanger surfaces. There are many coating possibilities. A few are listed below, but others are contemplated by the present invention:

a. Teflon coating onto metal. DuPont Silverstone Teflon coatings used for cookware may sustain temperatures of 290° C.

b. Aluminum may be hard anodized followed by PTFE (polytetrafluoroethylene) inclusion.

c. Vacuum aluminization of carbon steel, followed by hard anodizing and PTFE inclusion.

d. Impact coating of aluminum, carbon steel, or naval brass with PPS (polyphenylene sulfide) or PPS/PTFE alloy.

Such coatings may be applied to the side of the heat exchanger that is exposed to the hot saltwater. In one embodiment, the base metal would include a saltwater-resistant material, such as naval or admiralty brass. Using this approach, should the coating fail, the heat exchanger may foul but it would not perforate or leak.

At lower temperatures ($\leq 120°$ C.), the nonstick surface may not be necessary; however, saltwater resistance may be imparted by cathodic-arc vapor deposition of titanium on other metals, such as aluminum or carbon steel. As an alternative to coating the metal surface, it may be possible to bond a thin polymer film, such as PVDF (polyvinylidenedifluoride) or PTFE, using suitable adhesives and/or heat lamination.

In some embodiments where precipitates stick to the coated or filmed surfaces, it may be possible to add inert solid particulates to the circulating salt solution that continuously scour and clean the fouled surfaces. Prior to discharging the salt solution, these inert solid particulates would be recovered and recycled to the incoming salt solution. Alternatively, or additionally, the heat exchanger could be taken out of service temporarily to clean the surfaces with dilute acids or other appropriate cleaners.

The condensing side of the heat exchanger is less demanding. If the base metal resists steam (e.g., naval brass), no additional coatings are needed. However, if a less resistant metal is used, such as carbon steel or aluminum, it may be desirable to treat the condensing surface as follows:

a. Hot-dip galvanizing of carbon steel.

b. Conversion anodizing of aluminum.

c. Vacuum aluminizing of carbon steel, followed by anodizing.

d. Electroless coating of nickel on aluminum or carbon steel.

e. Electroplating of cadmium, nickel, or zinc on aluminum or carbon steel.

f. Dip/spray/roller coating of aluminum or carbon steel with PVDF paint.

All of the above coatings or films, for both the saltwater side and steam side, may be applied by "coil coating." In this method, a large roll of sheet metal is continuously unwound and treated to apply the coating or film. The final product is again rolled into a coil and shipped. This method is well known as an economical method for applying high-quality coatings to metal surfaces.

FIGS. 9 through 48 illustrate various embodiments of heat exchanger assemblies according to various embodiments of the present invention.

Figure 9:
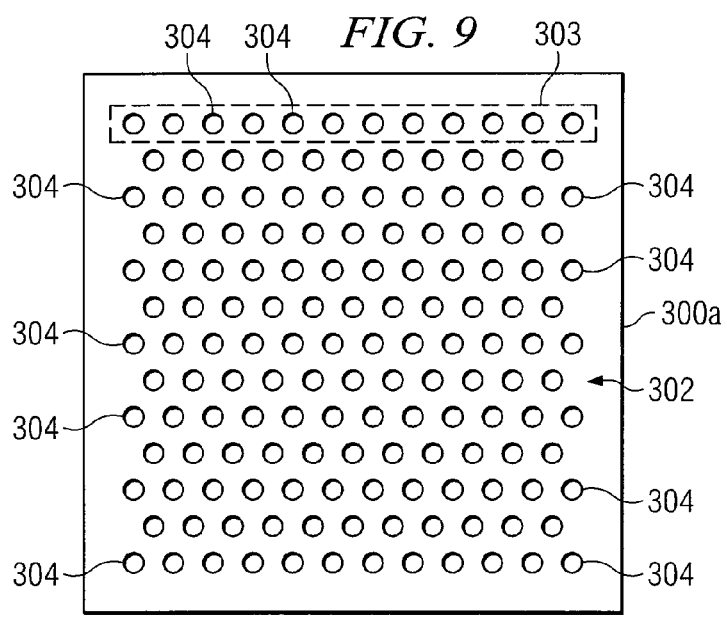

FIG. 9 illustrates an example indented sheet 300a of a sheet assembly for use in a heat exchanger assembly in accordance with one embodiment of the invention. Indented sheet 300a may be used in any suitable heat exchanger, such as any of the embodiments of heat exchanger assembly 500 shown in FIGS. 27-48 discussed below and/or heat exchanger assembly 500 shown in FIGS. 56-57 of U.S. patent application Ser. No. 10/944,374 referenced above, for example.

Indented sheet 300a includes a plurality of dimples 304 formed in an indentation pattern 302. Indentation pattern 302 includes an indentation pattern section 303 repeated multiple times on sheet 300a. In the embodiment shown in FIG. 9, indentation pattern section 303 includes a row of dimples 304. To form indented sheet 300a, indentation pattern section 303 may be stamped into a blank sheet at multiple locations on the sheet 300a. For example, to create indented sheet 300a shown in FIG. 9, the indentation pattern section (i.e., row) 303 may be stamped into a blank sheet at one position, the sheet may be advanced or indexed, the indentation pattern section (i.e., row) 303 may be stamped into the new location, and so on to form the complete array of dimples 304. Using such process allows for a relatively small metal stamp to be used to create the dimples 304, which may save expenses.

Figure 10A:
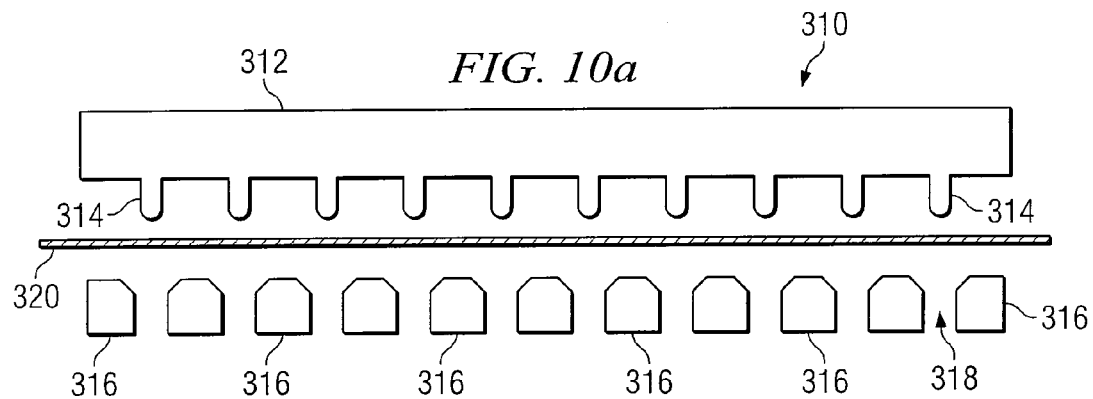
Figure 10B:
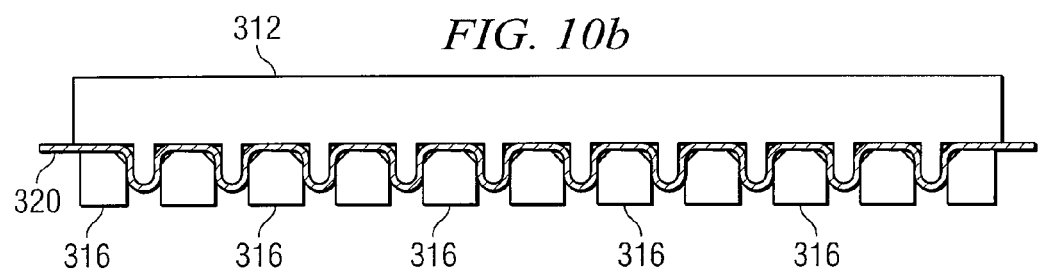
Figure 10C:
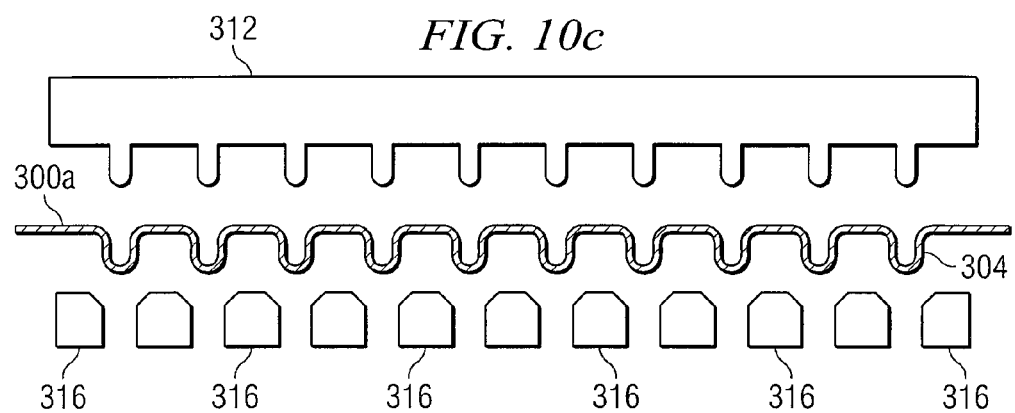

FIG. 10 illustrates an example metal stamping process for forming indented sheet 300a in accordance with one embodiment of the invention. A metal stamping assembly 310 includes a male die 312 having one or more protrusions 314 and a female die 316 having one or more openings 318 configured to receive protrusions 314. At step (a), a blank metal sheet 320 is positioned between male die 312 and female die 316. At step (b), male die 312 and female die 316 come together, causing protrusions 314 to form dimples 304 in blank sheet 320. At step (c), male die 312 and female die 316 are moved apart, allowing the metal sheet to be repositioned between male die 312 and female die 316. This process may be repeated in order to form the complete array of dimples 304 in indented sheet 300a.

FIG. 11 illustrates an example hydroforming process for forming indented sheet 300a in accordance with one embodiment of the invention. A hydroforming assembly 330 includes a male die 332 configured to house a fluid 334 and a female die 336 having one or more openings 338 configured to receive fluid 334. At step (a), a blank metal sheet 320 is positioned between male die 332 and female die 336. At step (b), male die 332 and female die 336 come together and high-pressure fluid 334 is directed into male die 332, causing portions of blank sheet 320 to deform into openings 338 in female die 336, thus forming dimples 304 in blank sheet 320. At step (c), male die 332 and female die 336 are moved apart, allowing the metal sheet to be repositioned between male die 332 and female die 336. This process may be repeated in order to form the complete array of dimples 304 in indented sheet 300a.

FIG. 12 illustrates an example indented sheet 300b of a sheet assembly for use in a heat exchanger assembly in accordance with another embodiment of the invention. Indented sheet 300b includes a first plurality of indented ridges 340 extending along a first direction 342 and a second plurality of indented ridges 344 extending along a second direction 346 generally perpendicular to first direction 342. FIG. 12 also shows cross-sectional views of indented sheet 300b taken along lines A-A and B-B. Indented ridges 340 and 344 prevent (or at least reduce the likelihood of) sheet 300b for warping, thus increasing the durability of sheet 300b and providing easier handling of sheet 300b.

FIG. 13 illustrates an example roller assembly 350 for forming ridges in a metal sheet 320, such as ridges 340 or 344 in indented sheet 300b, for example, in accordance with another embodiment of the invention. Roller assembly 350 includes a male roller 352 and a female roller 354. A blank metal sheet 320 may be positioned between male roller 352 and female roller 354, and one or both of male roller 352 and female roller 354 may rotate, as indicated by arrows 356 and 358, after (or while) being moved toward each other in order to form a series of ridges in the metal sheet 320, such as the series of ridges 340 in indented sheet 300b, for example.

FIG. 14 illustrates a cross-section of sheet assembly 360 including spacers 362 positioned between adjacent sheets 364 in a heat exchanger assembly in accordance with another embodiment of the invention. Such configuration may be used in any suitable heat exchanger assembly, such as any of the embodiments of heat exchanger assembly 500 shown in FIGS. 27-48 discussed below and/or heat exchanger assembly 500 shown in FIGS. 56-57 of U.S. patent application Ser. No. 10/944,374 referenced above, for example.

Sheet assembly 360 includes a plurality of sheets 364 positioned generally parallel to each other, and may define a plurality of relatively low-pressure passageways 366 extending in a first direction alternating with a plurality of relatively high-pressure passageways 368 extending in a second direction perpendicular to the first direction, such as described above with reference to first and second passageways 582 and 586 shown in FIG. 57A of U.S. patent application Ser. No. 10/944,374 referenced above, for example. In this example embodiment, high-pressure passageways 368 extend in a first direction indicated generally by arrows 370, and low-pressure passageways 366 extend in a second direction generally into/out of the page. Sheets 364 may include indentations (such as dimples, ridges or other protrusions) 366, such as discussed above. Indentations 366 may contact each other in the low-pressure passageways 366, thereby ensuring that low-pressure passageways 366 remain open when high pressures are applied within high-pressure passageways 368.

Spacers 362 are positioned between adjacent sheets 364 and operate to provide desired spacing between sheets 364. In some embodiments, spacers 362 include grooves 371 that are filled with a sealer 372, which may include any suitable material and/or device suitable for providing a fluid seal. For example, sealer 372 may comprise an elastic O-ring or other appropriate gasket material. In this embodiment, spacers 362 have an I-beam cross-section. However, other suitable cross-sections may be used. Spacers 362 may be formed in any suitable manner, such as using extrusion techniques, for example. Some spacers 362 may be solid, whereas others may include holes or openings 376 allowing fluid to flow through. For example, in the particular cross-section shown in FIG. 13, spacers 362a located between adjacent sheets 364 that define a low-pressure passageway 366 may be solid, because the fluid flows in the direction into/out of the page, whereas spacers 362b located between adjacent sheets 364 that define a high-pressure passageway 368 may include openings 376, allowing fluid to flow through such passageways 368 generally in the first direction 370.

FIG. 14 also illustrates side views of spacers 362a and spacers 362b, which are shown above the illustration of sheet assembly 360. As discussed above, spacers 362a may be solid, whereas spacers 362b may include openings 376 allowing fluids to pass through. Such openings 376 may be formed after the relevant spacer 362b is formed (e.g., by extrusion).

Figure 15:
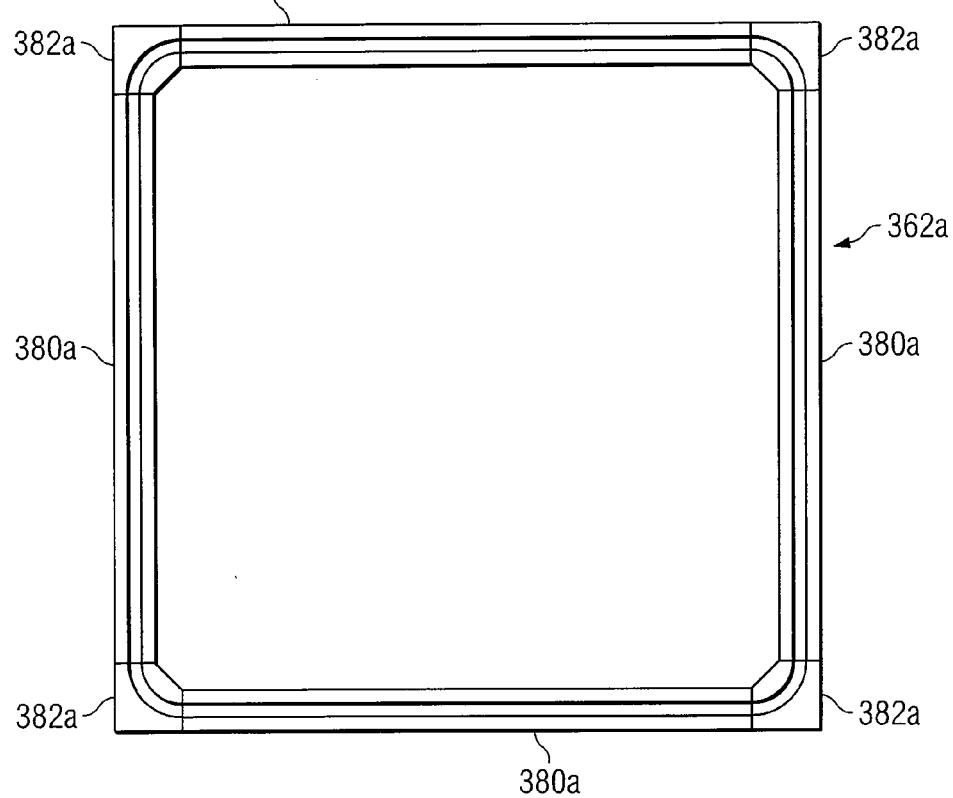
Figure 16:
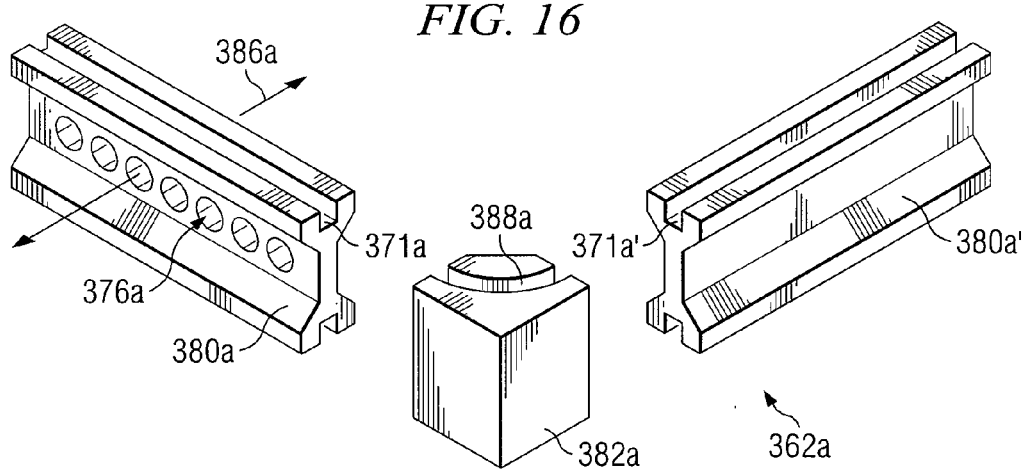

FIGS. 15 and 16 illustrate a configuration of a spacer 362a according to one embodiment of the invention. FIG. 15 illustrates a top view of spacer 362a. Spacer 362a forms a generally rectangular ring including four length members 380a and four corner members 382a. FIG. 16 illustrates an exploded perspective view of a corner region of spacer 362a shown in FIG. 15. In particular, FIG. 16 shows a corner member 382a, and a first length member 380a and a second length member 380a' which connect to corner member 382a. First length member 380a includes openings 376a, whereas second length member 380a' is solid. Such configuration may be used to provide fluid flow in the direction indicated generally by arrow 386a. Corner member 382a includes a groove 388a, which may align with grooves 371a and 371a' formed in length members 380a and 380a' such that grooves 388a, 371a and 371a' may cooperate to accept a gasket or other sealer 372.

Figure 17:
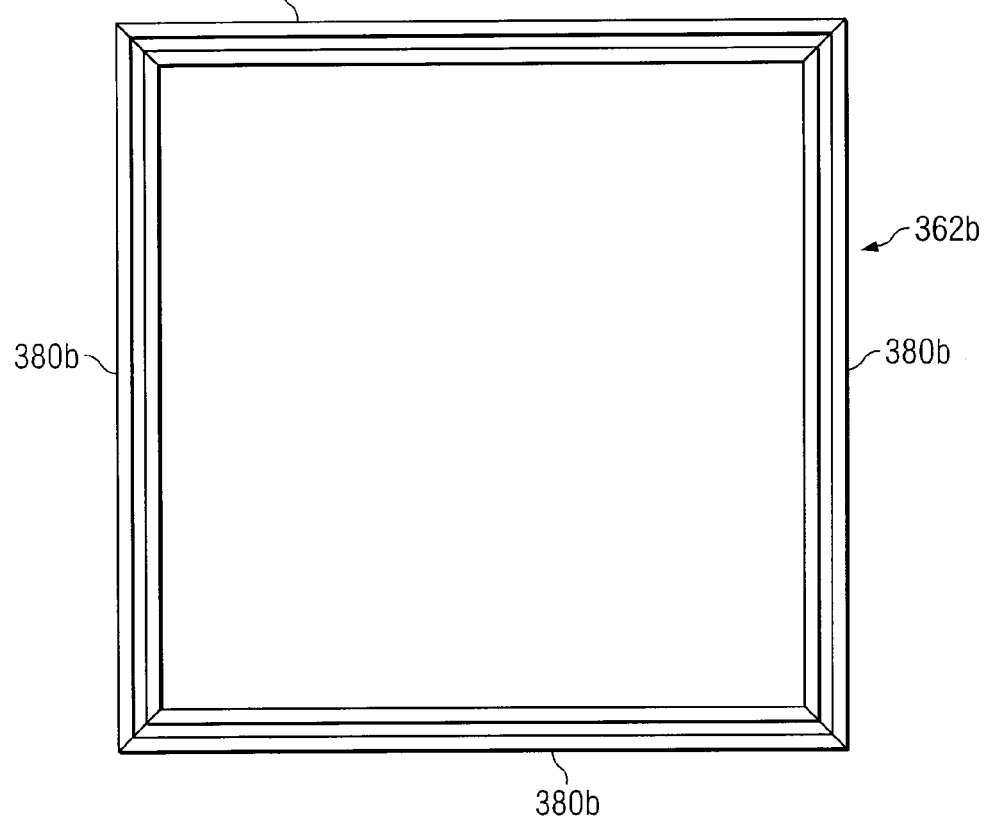
Figure 18:
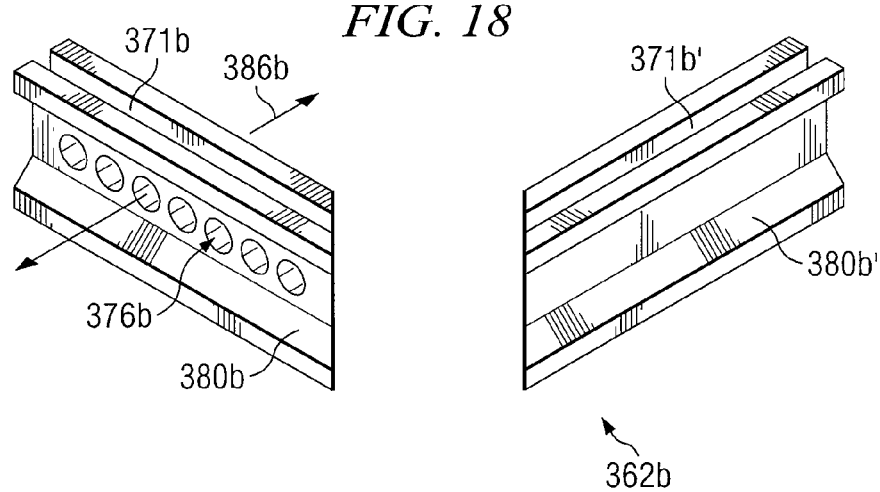

FIGS. 17 and 18 illustrate a configuration of a spacer 362b according to another embodiment of the invention. FIG. 17 illustrates a top view of spacer 362b. Spacer 362b forms a generally rectangular ring including four length members 380b. FIG. 18 illustrates an exploded perspective view of a corner region of spacer 362b shown in FIG. 17. In particular, FIG. 18 shows how two length members 380b meet to form a corner. Each length member 380b may be cut at 45 degrees, thus providing a 90-degree corner between adjacent length members 380b. First length member 380b includes openings 376b, whereas second length member 380b' is solid. Again, such configuration may be used to provide fluid flow in the direction indicated generally by arrow 386b. Grooves 371b and 371b' formed in length members 380b and 380b' may align at the corner and cooperate to accept a gasket or other sealer 372.

Figure 19:
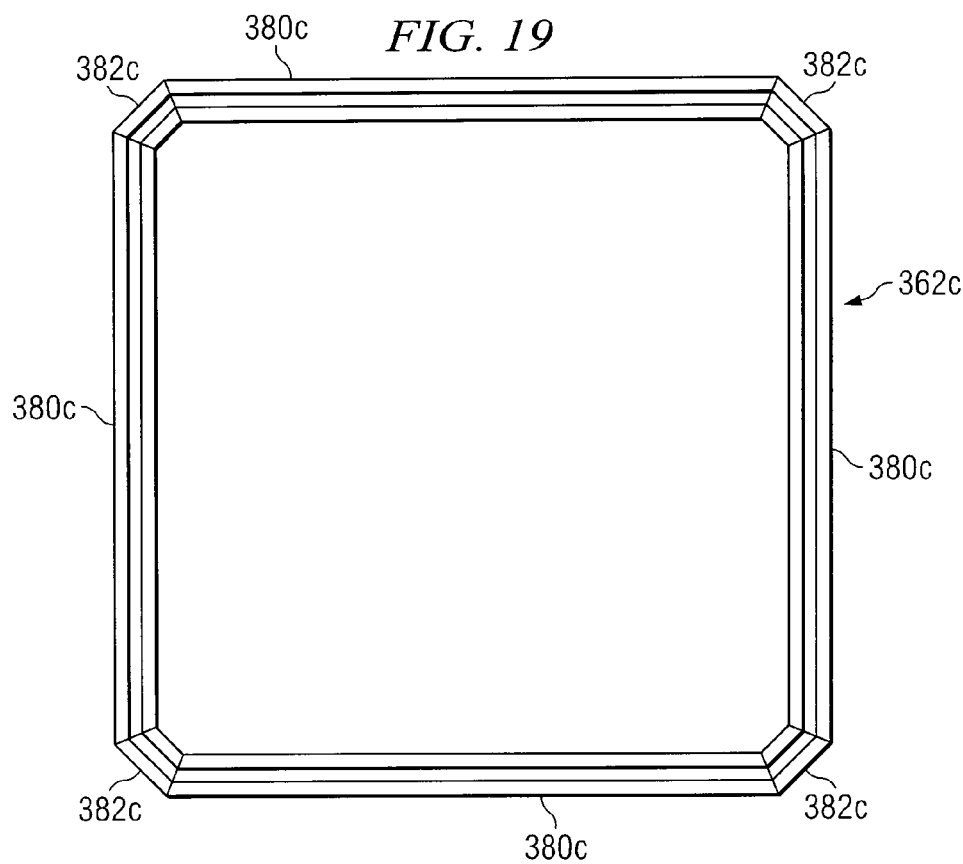
Figure 20:
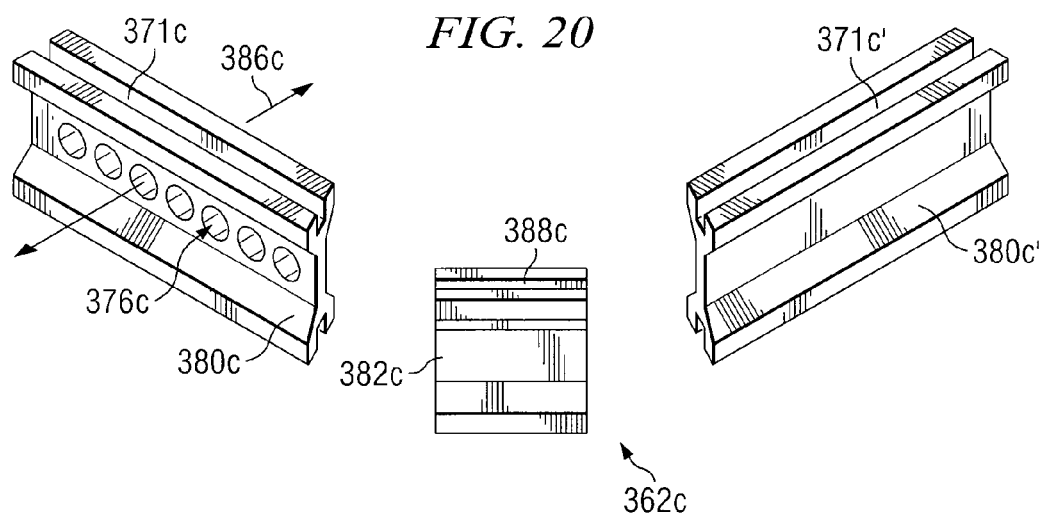

FIGS. 19 and 20 illustrate a configuration of a spacer 362c according to another embodiment of the invention. FIG. 19 illustrates a top view of spacer 362c. Spacer 362c forms a generally rectangular ring including four length members 380c and four corner members 382c. Each length members 380c and each corner member 382c may be cut at an angle at each end such that length members 380c corner member 382c join to form 90-degree corners. For example, each end of each length members 380c and each corner member 382c may be cut at a 22.5 degree angle in order to form 90-degree corners. FIG. 20 illustrates an exploded perspective view of a corner region of spacer 362c shown in FIG. 19. In particular, FIG. 20 shows a corner member 382c, and a first length member 380c and a second length member 380c' which connect to corner member 382c. First length member 380c includes openings 376c, whereas second length member 380c' is solid. Such configuration may be used to provide fluid flow in the direction indicated generally by arrow 386c. Corner member 382c includes a groove 388c, which may align with grooves 371c and 371c' formed in length members 380c and 380c' such that grooves 388c, 371c and 371c' may cooperate to accept a gasket or other sealer 372.

FIGS. 21 and 22 illustrate a configuration of a spacer 362d according to another embodiment of the invention. FIG. 21 illustrates a top view of spacer 362d. Spacer 362d forms a generally rectangular ring including four length members 380d and four corner members 382d. Each length members 380d and each corner member 382d may be cut at an angle at each end such that length members 380d corner member 382d join to form 90-degree corners. For example, each end of each length members 380d and each corner member 382d may be cut at a 22.5 degree angle in order to form 90-degree corners. FIG. 22 illustrates an exploded perspective view of a corner region of spacer 362d shown in FIG. 21. In particular, FIG. 22 shows a corner member 382d, and a first length member 380d and a second length member 380d' which connect to corner member 382d. First length member 380d includes openings 376d, whereas second length member 380d' is solid. Such configuration may be used to provide fluid flow in the direction indicated generally by arrow 386d. Corner member 382d includes a groove 388d, which may align with grooves 371d and 371d' formed in length members 380d and 380d' such that grooves 388d, 371d and 371d' may cooperate to accept a gasket or other sealer 372. Like groove 388a shown in FIG. 15, groove 388d is curved, which may be advantageous for accepting a sealer 372, such as an O-ring or other gasket, for example.

FIG. 23 illustrates a perspective view of an ortho-grid sheet assembly 400a including a plurality of sheets 402a in accordance with one embodiment of the invention. Sheet assembly 400a may be used in any suitable heat exchanger assembly, such as any of the embodiments of heat exchanger assembly 500 shown in FIGS. 27-48 discussed below and/or heat exchanger assembly 500 shown in FIGS. 56-57 of U.S. patent application Ser. No. 10/944,374 referenced above, for example.

Sheet assembly 400a includes a plurality of sheets 402a positioned generally parallel to each other, and may define a plurality of relatively low-pressure passageways 404a extending in a first direction, alternating with a plurality of relatively high-pressure passageways 406a extending in a second direction perpendicular to the first direction. In this example embodiment, low-pressure passageways 404a extend in a first direction indicated generally by arrow 408a, and high-pressure passageways 406a extend in a second direction indicated generally by arrow 410a. Rectangular (e.g., square) tubing 416a is located between, and coupled to, sheets 402a such that passageways 404a and 406a are maintained between sheets 402a. Rectangular tubing 416a may be formed from metal or other suitable material and may be rigidly bonded to sheets 402a by any suitable means, such as by adhesive, braze or weld, for example.

Figure 24:
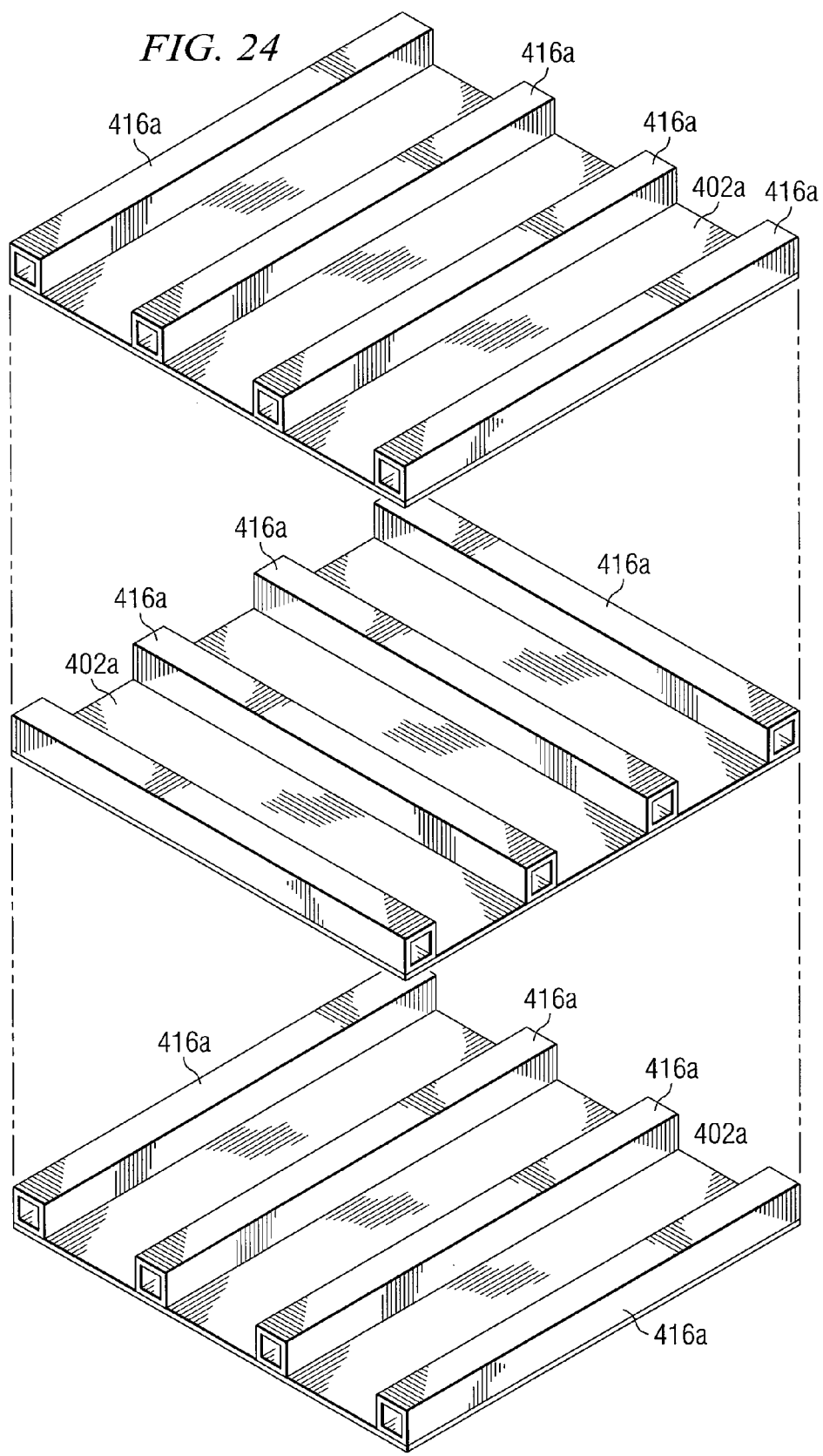

FIG. 24 illustrates an exploded view of a portion of the ortho-grid sheet assembly 400a of FIG. 23. In this embodiment, rectangular tubing 416a is bonded to one side of each sheet 402a of assembly 400a.

Figure 25:
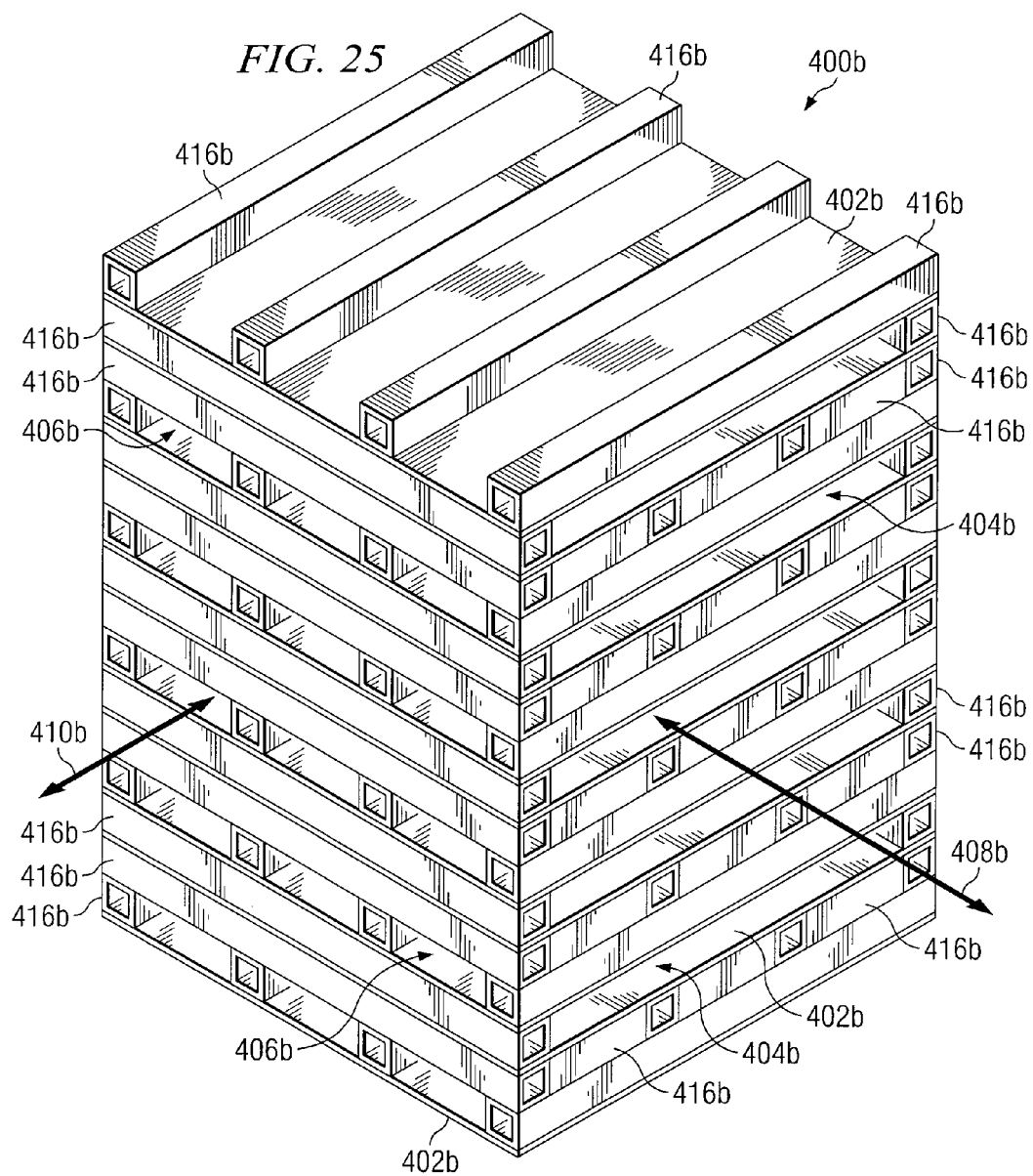

FIG. 25 illustrates a perspective view of an ortho-grid sheet assembly 400b including a plurality of sheets 402b in accordance with another embodiment of the invention. Sheet assembly 400b may be used in any suitable heat exchanger assembly, such as any of the embodiments of heat exchanger assembly 500 shown in FIGS. 27-48 discussed below and/or heat exchanger assembly 500 shown in FIGS. 56-57 of U.S. patent application Ser. No. 10/944,374 referenced above, for example.

Sheet assembly 400b includes a plurality of sheets 402b positioned generally parallel to each other, and may define a plurality of relatively low-pressure passageways 404b extending in a first direction, alternating with a plurality of relatively high-pressure passageways 406b extending in a second direction perpendicular to the first direction, such as described above with reference to first and second passageways 404a and 406a, for example. In this example embodiment, low-pressure passageways 404b extend in a first direction indicated generally by arrow 408b, and high-pressure passageways 406b extend in a second direction indicated generally by arrow 410b. Rectangular (e.g., square) tubing 416b is located between, and coupled to, sheets 402b such that passageways 404b and 406b are maintained between sheets 402b. Rectangular tubing 416b may be formed from metal or other suitable material and may be rigidly bonded to sheets 402b by any suitable means, such as by adhesive, braze or weld, for example. In this embodiment, rectangular tubing 416b is rigidly bonded to the low-pressure side of the relevant sheet 402b. This may provide of maintaining the bond between the rectangular tubing 416b and the sheet 402b in compression (and not in tension). Using such approach, a failure of the bond may not lead to a failure of the heat exchanger.

Figure 26:
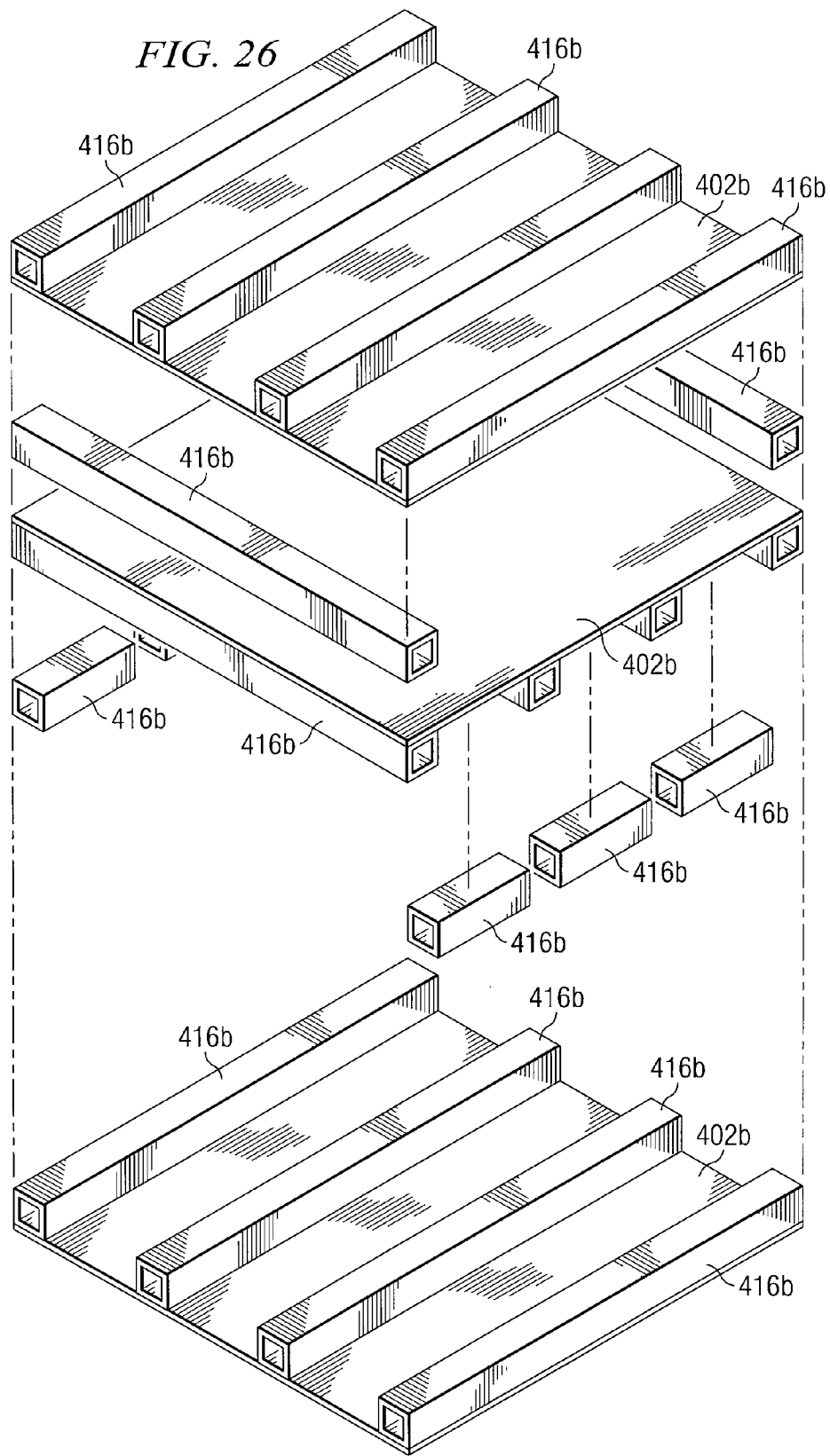

FIG. 26 illustrates an exploded view of a portion of the ortho-grid sheet assembly 400b of FIG. 25. As discussed above, in this embodiment, rectangular tubing 416b is rigidly bonded to the low-pressure side of each sheet 402a of assembly 400a.

Figure 27:
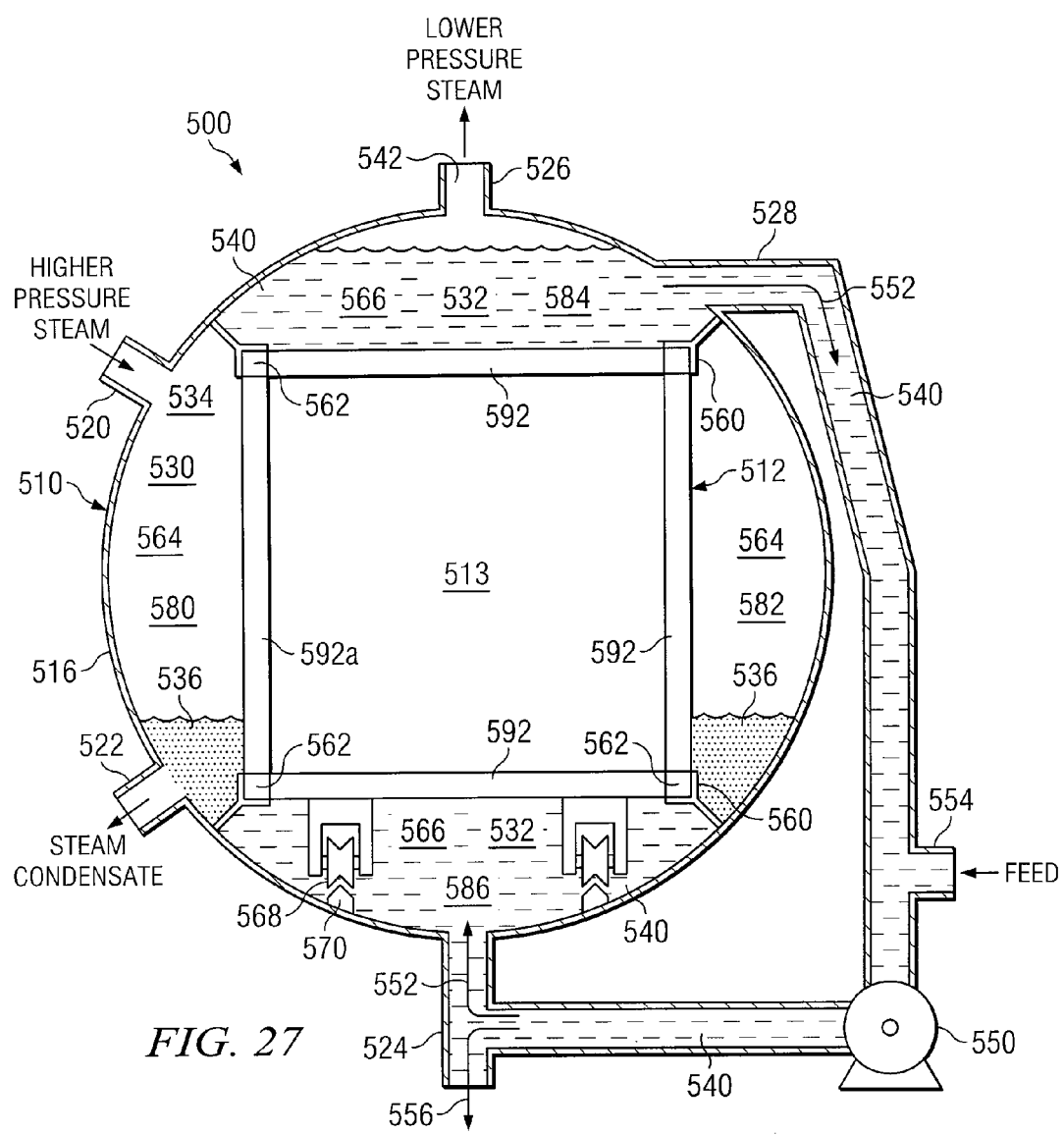

FIG. 27 illustrates a cross-section of an example heat exchanger assembly 500 including a shell 510 and a sheet assembly 512 disposed within shell 510 in accordance with an embodiment of the invention. Shell 510 may comprise any suitable shape and may be formed from any suitable material for housing pressurized gasses and/or liquids. For example, in the embodiment shown in FIG. 27, shell 510 comprises a substantially cylindrical portion 516 and a pair of hemispherical caps 600 (see FIG. 28) coupled to each end of cylindrical portion 516. The cross-section shown in FIG. 27 is taken at a particular point along the length of cylindrical portion 516, which length extends in a direction perpendicular to the page.

In general, heat exchanger assembly 500 is configured to allow at least two fluids (e.g., a relatively low-pressure fluid and a relatively high-pressure fluid) to be communicated into shell 510, through passageways defined by the plurality of sheets 513 forming sheet assembly 512 (such as relatively low-pressure passageways and relatively high-pressure passageways discussed above with regard to various embodiments) such that heat is transferred between the fluids, and out of shell 510. Shell 510 may include any number of inlets and outlets for communicating fluids into and out of shell 510. In the embodiment shown in FIG. 27, shell 510 includes a first inlet 520, a first outlet 522, a second inlet 524, a second outlet 526 and a third outlet 528. First inlet 520 and first outlet 522 are configured to communicate a first fluid (e.g., a relatively high-pressure fluid) 530 into and out of shell 510. Second inlet 524, second outlet 526, and third outlet 528 are configured to communicate a second fluid (e.g., a relatively low-pressure fluid) 532 into and out of shell 510.

Due to the transfer of heat between first fluid 530 and second fluid 532, at least a portion of first fluid 530 and/or second fluid 532 may change state within shell 510 and thus exit shell 510 in a different state than such fluids 530 and/or 532 entered shell 510. For example, in a particular embodiment, relatively high-pressure steam 534 enters shell 510 through first inlet 520, enters one or more first passageways within sheet assembly 512, becomes cooled by a liquid 540 flowing through one or more second passageways adjacent to the one or more first passageways within sheet assembly 512, which causes at least a portion of the steam 534 to condense to form steam condensate 536. The steam condensate 536 flows toward and through first outlet 522. Concurrently, liquid 540 (saltwater, seawater, concentrated fermentation broth, or concentrated brine, for example) enters shell 510 through second inlet 524, enters one or more second passageways within sheet assembly 512, becomes heated by steam 534 flowing through the one or more first passageways adjacent to the one or more second passageways within sheet assembly 512, which causes at least a portion of the liquid 540 to boil to form relatively low-pressure steam 542. The low-pressure steam 542 escapes from shell 510 through second outlet 526, whereas the unboiled remainder of liquid 540 flows toward and through third outlet 528.

In some embodiments, heat exchanger assembly 500 includes one or more pumps 550 operable to pump liquid 540 that has exited shell 510 through third outlet 528 back into shell 510 through second inlet 524, as indicated by arrows 552. Pump 550 may comprise any suitable device or devices for pumping a fluid through one or more fluid passageways. As shown in FIG. 27, liquid 540 may be supplied to the circuit through a feed input 554. In embodiments in which liquid 540 comprises a solution (such as a seawater solution, for example), a relatively dilute form of such solution (as compared with the solution exiting shell 510 through third output 528) may be supplied through feed input 554. In addition, a portion of liquid 540 being pumped toward second inlet 524 of shell 510 may be redirected away from shell 510, as indicated by arrow 556. In embodiments in which liquid 540 comprises a solution (such as a seawater solution, for example), such redirected liquid 540 may comprise a relatively concentrated form of such solution (as compared with the diluted solution supplied through feed input 554). Although inlets 520, 524 and outlets 522, 526 and 528 are described herein as single inlets and outlets, each inlet 520, 524 and each outlet 522, 526 and 528 may actually include any suitable number of inlets or outlets.

In some embodiments, first fluid 530 generally comprises vapor and second fluid 532 generally comprises a liquid, as least when first fluid 530 and second fluid 532 enter shell 510 through inlets 520 and 524, respectively. In particular embodiments, second fluid 532 may comprise saltwater, seawater, fermentation broth, or brine.

Heat exchanger assembly 500 may also include a plurality of mounting devices (or tracks) 560 coupled to shell 510 and operable to mount sheet assembly 512 within shell 510. Each mounting device 560 may be associated with a particular corner of sheet assembly 512. Each mounting device 560 may be coupled to shell 510 in any suitable manner, such as by welding or using fasteners, for example. In the embodiment shown in FIG. 27, each mounting device 560 comprises a 90-degree Y-shaped bracket into which a corner of sheet assembly 512 is mounted. Each mounting device 560 may extend along the length of shell 510, or at least along the length of a portion of shell 510 in which fluids 530 and 532 are communicated, in order to create two volumes within shell 510 that are separated from each other. A first volume 564, which includes first and second chambers 580 and 582 generally to the left and right of sheet assembly 510, as well as one or more first passageways defined by sheet assembly 510, is used to communicate first fluid 530 through heat exchanger assembly 500. A second volume 566, which includes third and fourth chambers 584 and 586 generally above and below sheet assembly 510, as well as one or more second passageways defined by sheet assembly 510, is used to communicate second fluid 532 through heat exchanger assembly 500.

Because first volume 564 is separated from second volume 566 by the configuration of sheet assembly 512 and mounting devices 560, first fluid 530 is kept separate from second fluid 532 within shell 510. In addition, one or more gaskets 562 may be disposed between each Y-shaped bracket 560 and its corresponding corner of sheet assembly 512 to provide a seal between first volume 564 and second volume 566 at each corner of sheet assembly 512. Gaskets 562 may comprise any suitable type of seal or gasket, may have any suitable shape (such as having a square, rectangular or round cross-section, for example) and may be formed from any material suitable for forming a seal or gasket.

Heat exchanger assembly 500 may also include one or more devices for sliding, rolling, or otherwise positioning sheet assembly 512 within shell 510. Such devices may be particularly useful in embodiments in which sheet assembly 512 is relatively heavy or massive, such as where sheet assembly 512 is formed from metal. In the embodiment shown in FIG. 27, heat exchanger assembly 500 includes wheels 568 coupled to sheet assembly 512 that may be used to roll sheet assembly 512 into shell. Wheels 568 may be aligned with, and roll on, wheel tracks 570 coupled to shell 510 in any suitable manner.

Figure 28:
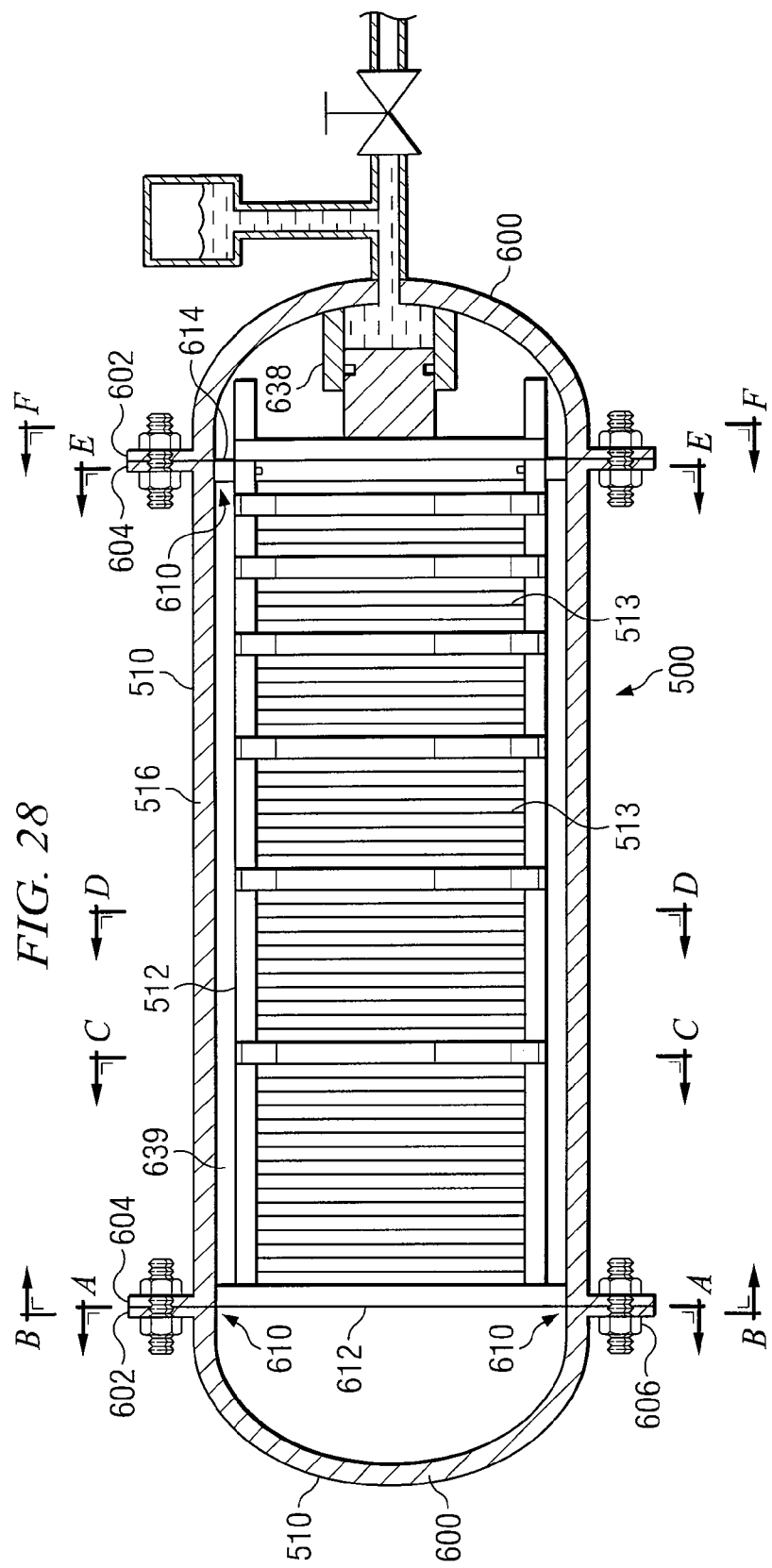

FIG. 28 illustrates an example side view of heat exchanger assembly 500 shown in FIG. 27 in accordance with an embodiment of the invention. As shown in FIG. 28, sheet assembly 512 is disposed within shell 510, which includes substantially cylindrical portion 516 and a pair of hemispherical caps 600 coupled to each end of cylindrical portion 516. Hemispherical caps 600 may include a flange portion 602 coupled to a flange portion 604 of cylindrical portion 516 by one or more coupling devices 606, such bolts, rivets or welds for example. Sheet assembly 512 may include a first end plate 612 and a second end plate 614 welded or otherwise rigidly coupled to an inside surface of shell 510, such as indicated by arrows 610.

Figure 29:
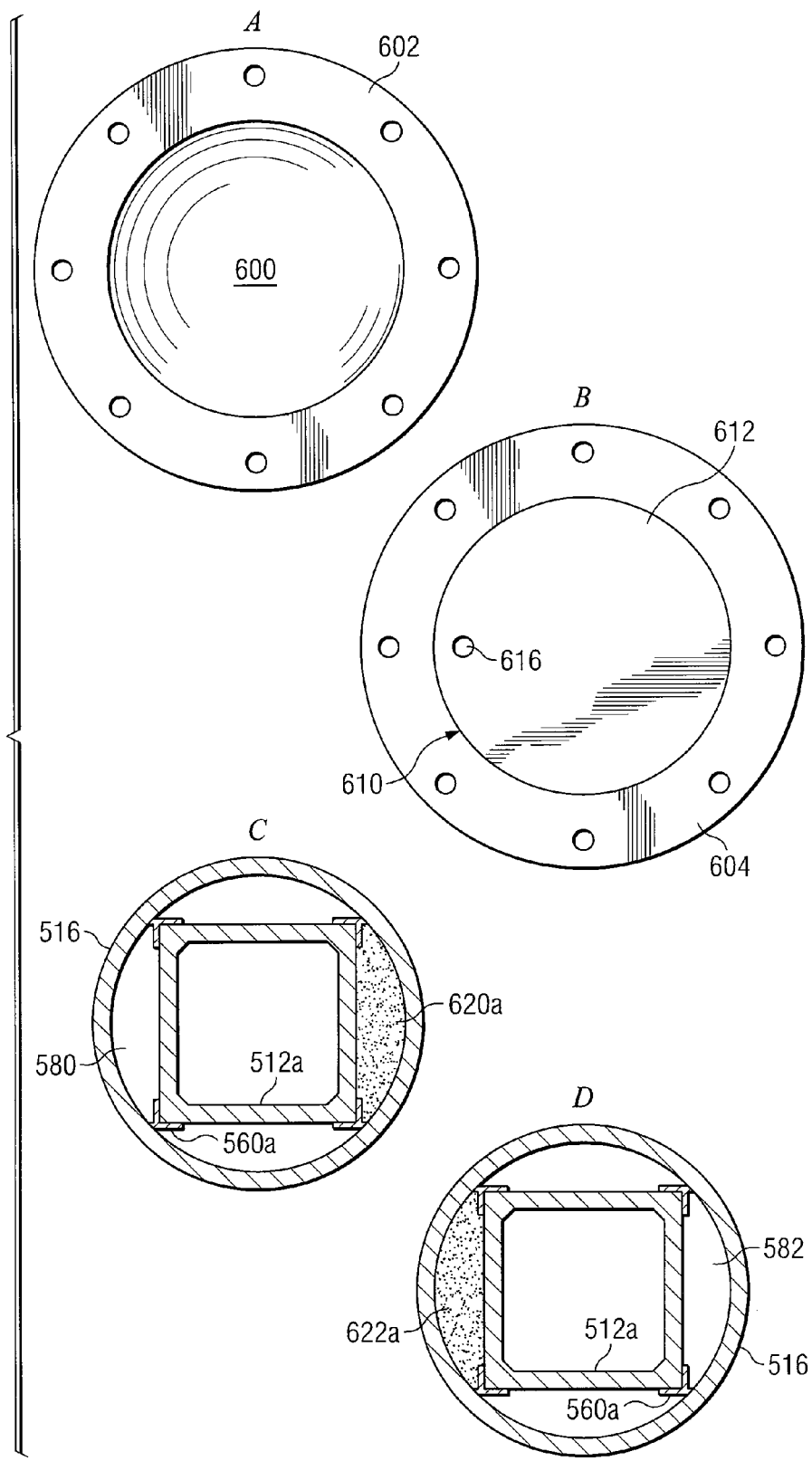
Figure 30:
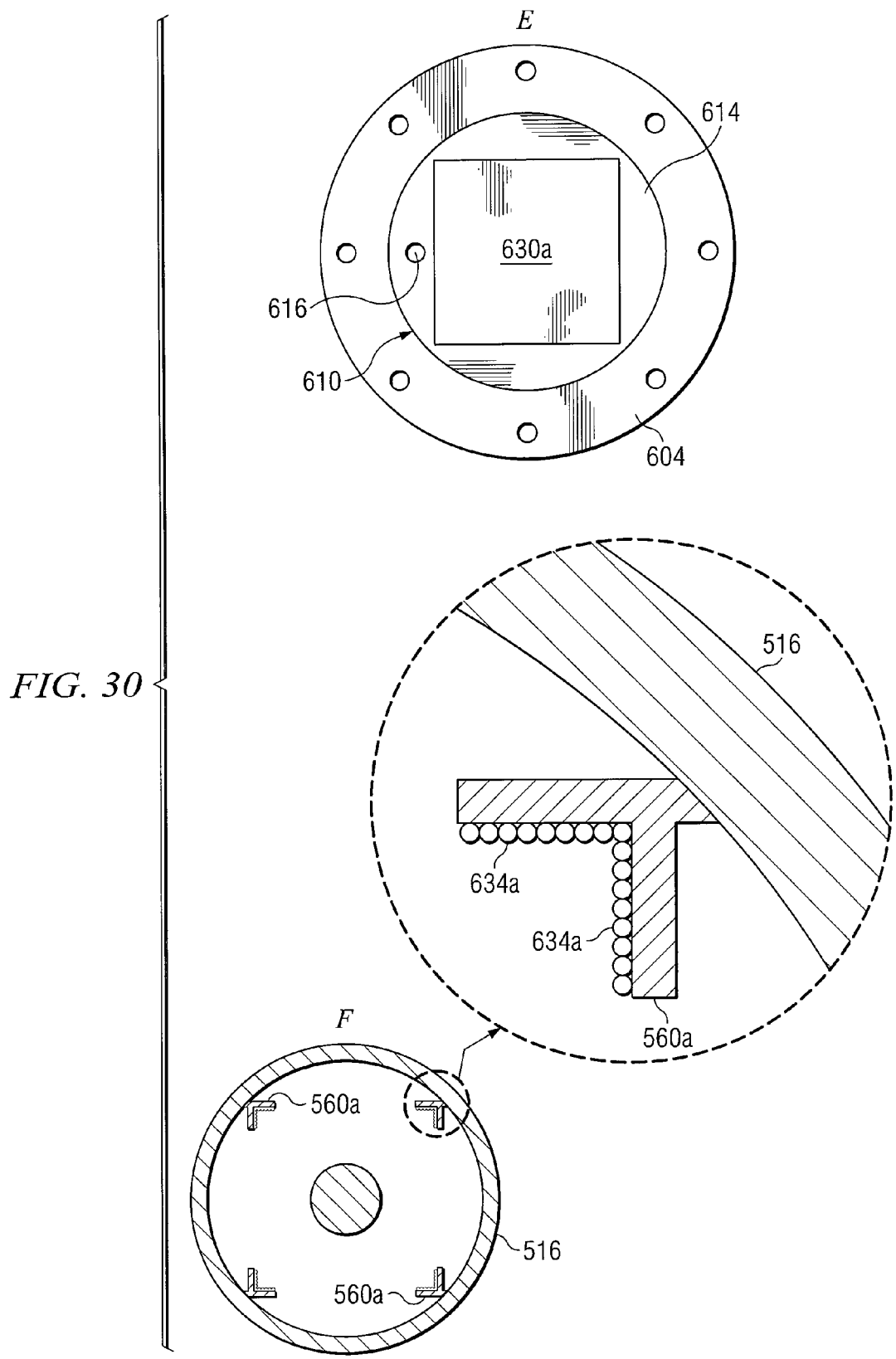

FIGS. 29 and 30 illustrate cross-sectional views A, B, C, D, E and F taken along lines A-A, B-B, C-C, D-D, E-E and F-F respectively, shown in FIG. 28 in accordance with another embodiment of the invention. In this embodiment, mounting devices (or tracks) 560*a* used to hold sheet assembly 512*a* in position within shell 510 comprise 90-degree Y-shaped brackets into which the corners of sheet assembly 512*a* are mounted.

As shown in FIG. 29, view A shows hemispherical cap 600, including flange portion 602. View B shows first end plate 612 and cylindrical portion 516 of shell 510, including flange portion 604. As discussed above, first end plate 612 is welded or otherwise rigidly coupled to an inside surface of shell 510, as indicated by arrows 610. First end plate 612 may include one or more holes 616 operable to allow pressure to equalize across the surfaces of sheets 513 of sheet assembly 512*a*. View C and D show baffles 620*a* and 622*a* located in high-pressure chambers 582 and 580, respectively.

As shown in FIG. 30, view E shows second end plate 614 and cylindrical portion 516 of shell 510, including flange portion 604. As discussed above, first end plate 612 is welded or otherwise rigidly coupled to an inside surface of shell 510, as indicated by arrows 610. Like first end plate 612, second end plate 614 may include one or more holes 616 operable to allow pressure to equalize across the surfaces of sheets 513 of sheet assembly 512*a*. A push plate 630*a* may be located at the center of second end plate 614. Push plate 630*a* may compress the sealers 372 (e.g., O-rings or gaskets) located in spacers 362. Thus, push plate 630*a* may have a similar shape as the cross-sectional shape of sheets 513 (here, a square or rectangle). The outer periphery of pusher plate 630*a* may be sealed to second end plate 614 using an O-ring or other suitable gasket.

Also shown in FIG. 30, view F shows mounting devices (or tracks) 560*a* coupled to shell 510 and used to hold sheet assembly 512*a* in position within shell 510. As discussed above, each mounting track 560*a* may be associated with a particular corner of sheet assembly 512*a*. Also, each mounting track 560*a* may be coupled to shell 510 in any suitable manner, such as by welding or using fasteners, for example. As discussed above, each mounting track 560*a* comprises a 90-degree Y-shaped bracket into which a corner of sheet assembly 512*a* is mounted. Each mounting device 560*a* may extend along the length of cylindrical portion 516 of shell 510, or at least along a portion of the length of cylindrical portion 516. One or more gaskets (or other suitable sealing device) 634*a* may be located adjacent each mounting track 560*a* in order to seal sheet assembly 512*a* to that mounting track 560*a*. In some embodiments, gaskets 634*a* may be hollow and inflated with pressurized liquid or gas to ensure a good seal. As shown in FIG. 28, a hydraulic mechanism 638 may be used to compress the sheets 513 of sheet assembly 512*a* together. Trapped gas in the elevated chamber 639 acts as a spring to allow sheet assembly 512*a* to flex during temperature changes.

Figure 31:
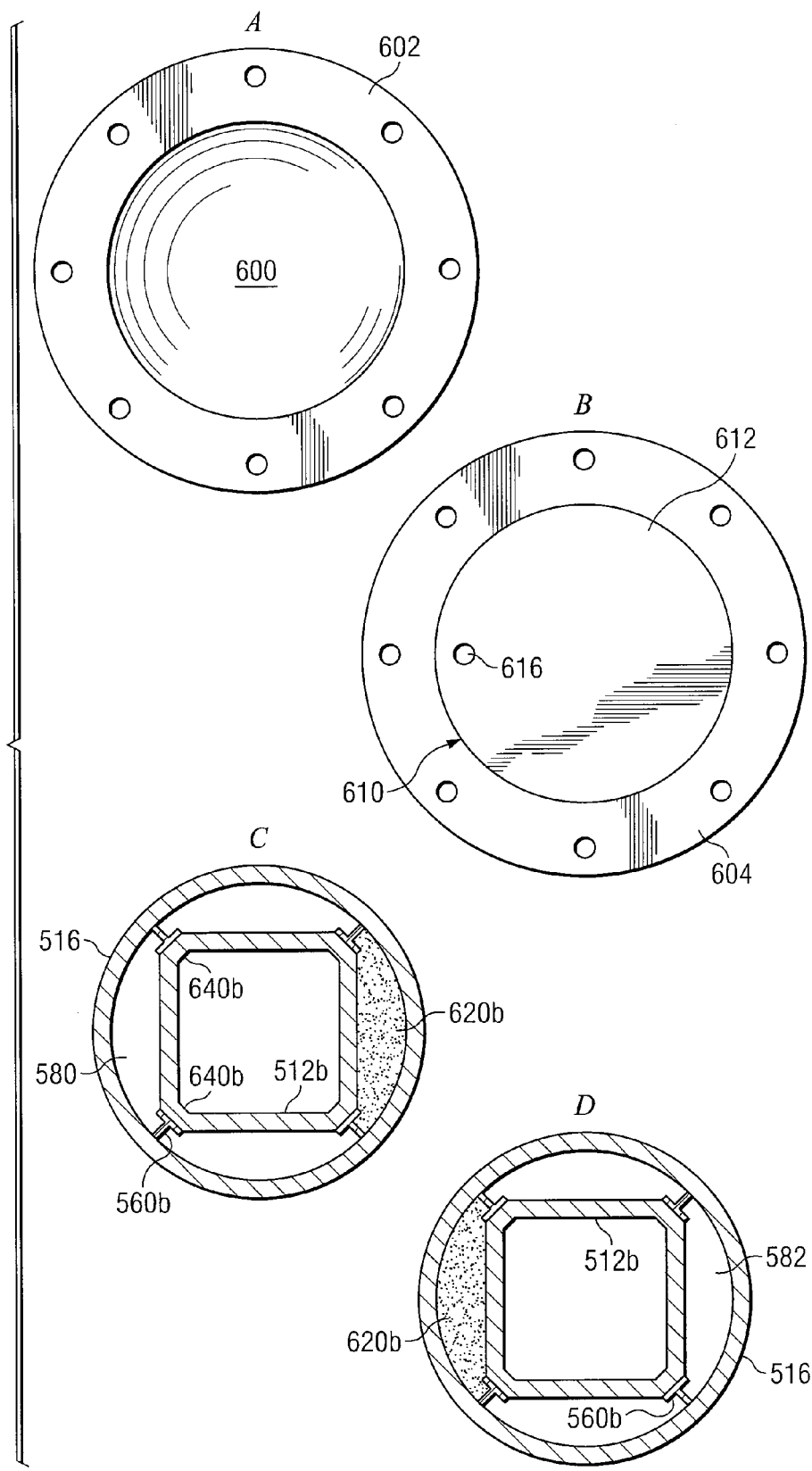
Figure 32:
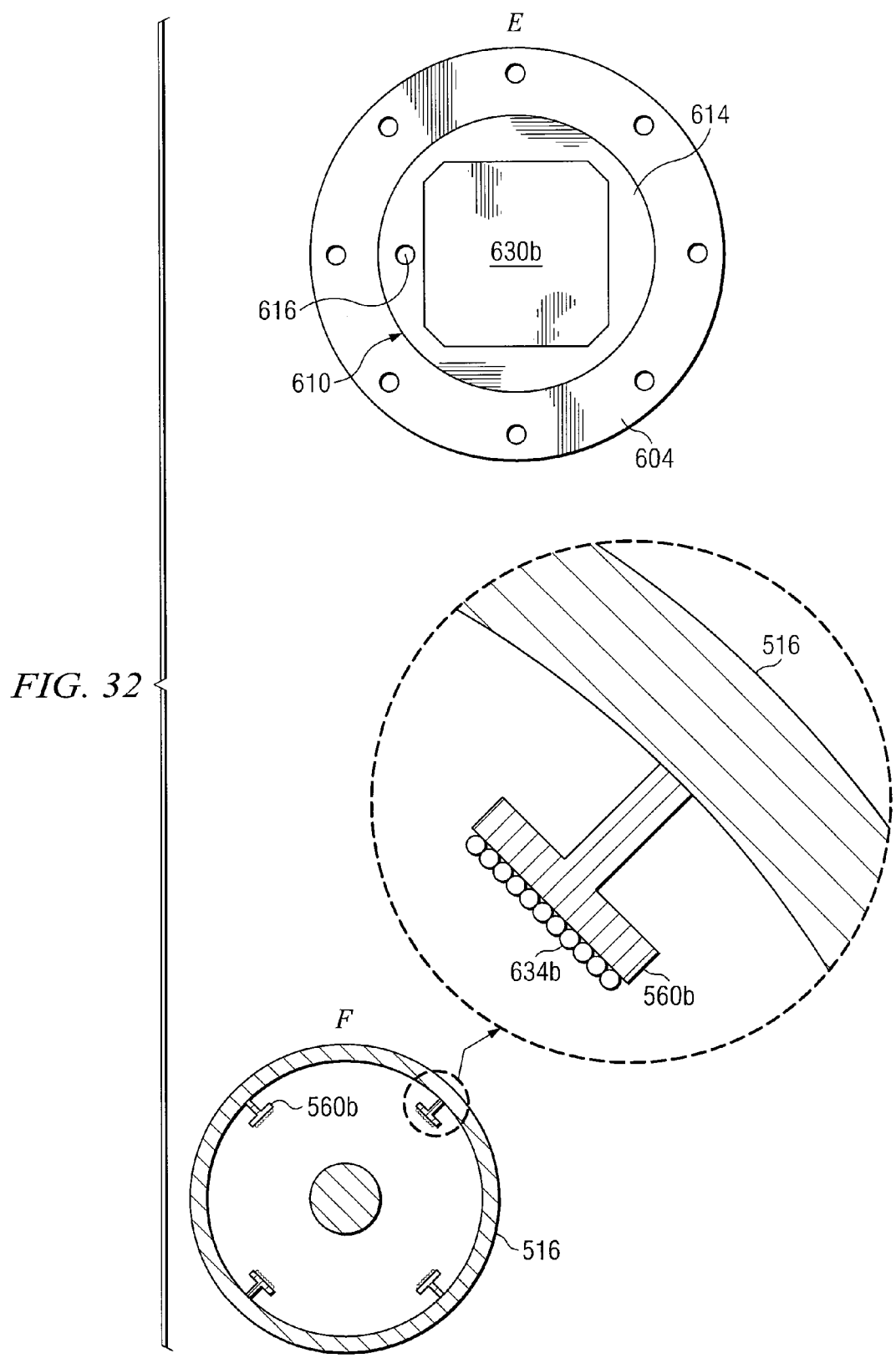

FIGS. 31 and 32 illustrate cross-sectional views A, B, C, D, E and F taken along lines A-A, B-B, C-C, D-D, E-E and F-F respectively, shown in FIG. 28 in accordance with another embodiment of the invention. In this embodiment, mounting devices (or tracks) 560*b* used to hold sheet assembly 512*b* in position within shell 510 comprise 45-degree brackets into which the corners of sheet assembly 512*b* are mounted.

As shown in FIG. 31, view A shows hemispherical cap 600, including flange portion 602. View B shows first end plate 612 and cylindrical portion 516 of shell 510, including flange portion 604. As discussed above, first end plate 612 is welded or otherwise rigidly coupled to an inside surface of shell 510, as indicated by arrows 610. First end plate 612 may include one or more holes 616 operable to allow pressure to equalize across the surfaces of sheets 513 of sheet assembly 512*b*. View C and D show baffles 620*b* and 622*b* located in high-pressure chambers 582 and 580, respectively. As discussed above, mounting tracks 560*b* comprise 45-degree brackets into which the corners of sheet assembly 512*b* are mounted. Thus, each corner of sheet assembly 512*b* may have a 45-degree angled portion, indicated as corners 640*b*.

As shown in FIG. 32, view E shows second end plate 614 and cylindrical portion 516 of shell 510, including flange portion 604. As discussed above, first end plate 612 is welded or otherwise rigidly coupled to an inside surface of shell 510, as indicated by arrows 610. Like first end plate 612, second end plate 614 may include one or more holes 616 operable to allow pressure to equalize across the surfaces of sheets 513 of sheet assembly 512*b*. A push plate 630*b* may be located at the center of second end plate 614. Push plate 630*a* may compress the sealers 372 (e.g., O-rings or gaskets) located in spacers 362. Thus, push plate 630*b* may have a similar shape as the cross-sectional shape of sheets 513 (here, a square or rectangle having 45-degree angled corners). The outer periphery of pusher plate 630*b* may be sealed to second end plate 614 using an O-ring or other suitable gasket.

Also shown in FIG. 32, view F shows mounting devices (or tracks) 560*b* coupled to shell 510 and used to hold sheet assembly 512*b* in position within shell 510. As discussed above, each mounting track 560*b* may be associated with a particular corner of sheet assembly 512*b*. Also, each mounting track 560*b* may be coupled to shell 510 in any suitable manner, such as by welding or using fasteners, for example. Each mounting device 560*b* may extend along the length of cylindrical portion 516 of shell 510, or at least along a portion of the length of cylindrical portion 516. One or more gaskets (or other suitable sealing device) 634*b* may be located adjacent each mounting track 560*b* in order to seal sheet assembly 512*b* to that mounting track 560*b*. In some embodiments, gaskets 634*b* may be hollow and inflated with pressurized liquid or gas to ensure a good seal. As shown in FIG. 28, a hydraulic mechanism 638 may be used to compress the sheets 513 of sheet assembly 512*b* together. Trapped gas in the elevated chamber 639 acts as a spring to allow sheet assembly 512*b* to flex during temperature changes.

Figure 33:
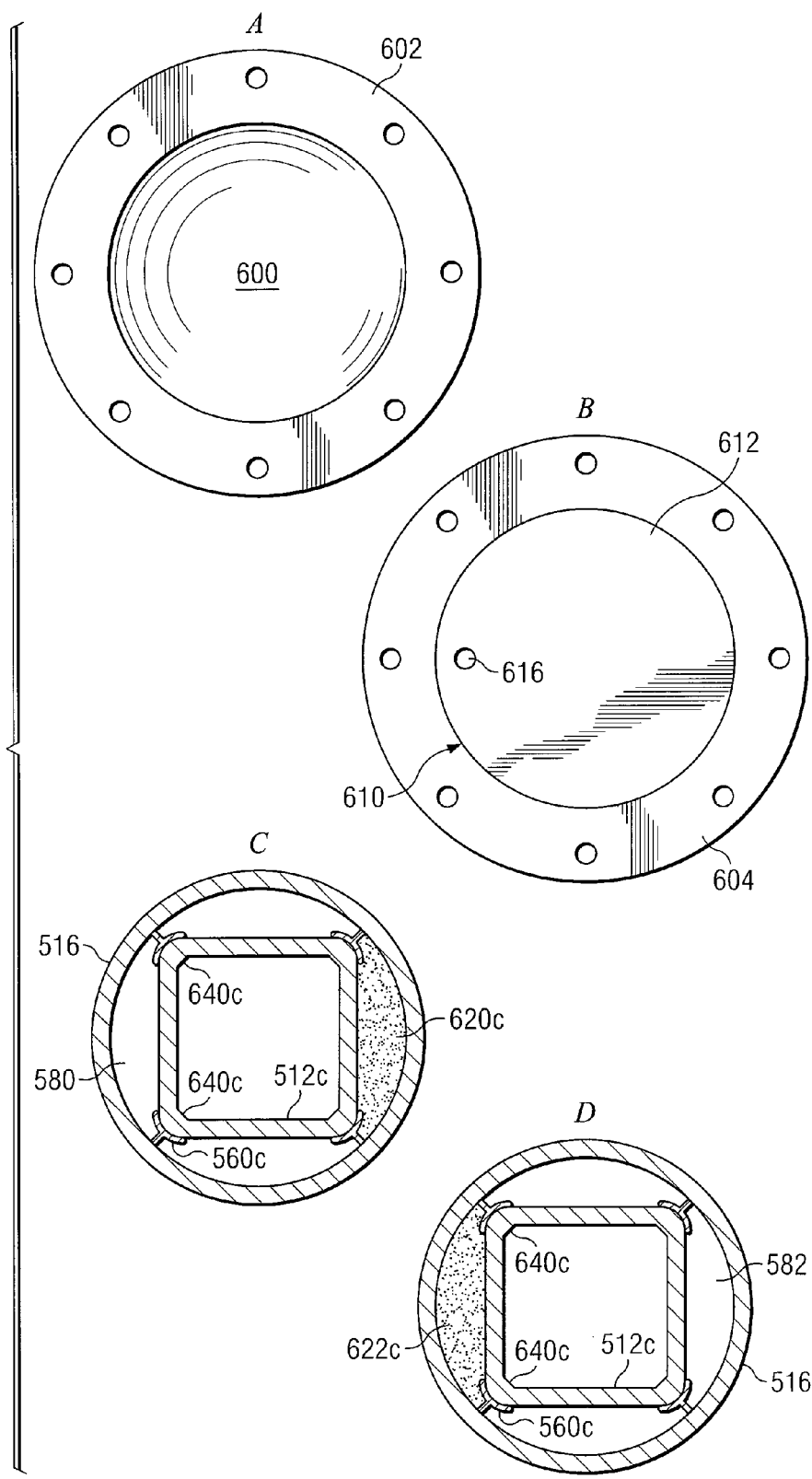
Figure 34:
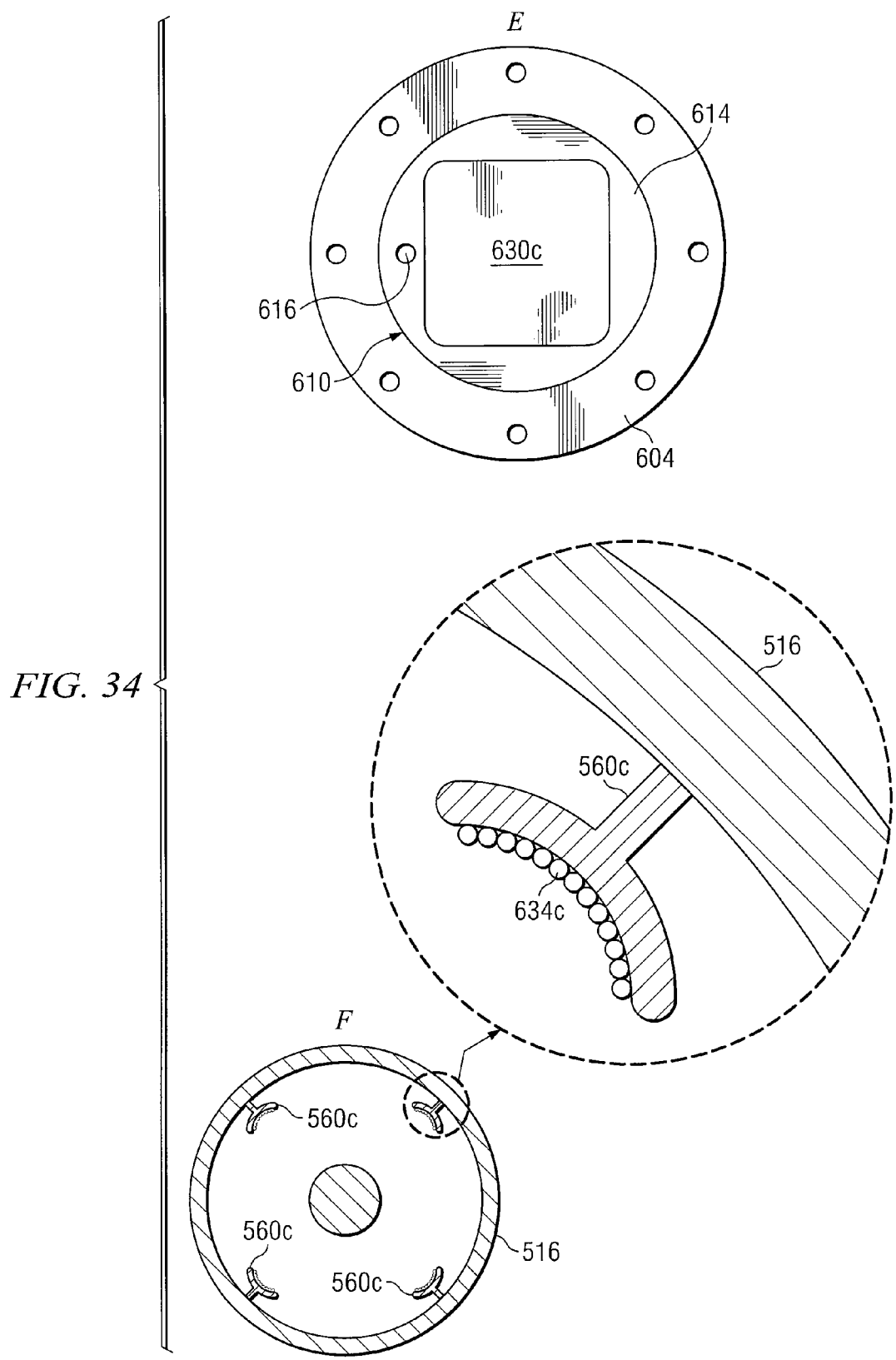

FIGS. 33 and 34 illustrate cross-sectional views A, B, C, D, E and F taken along lines A-A, B-B, C-C, D-D, E-E and F-F respectively, shown in FIG. 28 in accordance with yet another embodiment of the invention. In this embodiment, mounting devices (or tracks) 560*c* used to hold sheet assembly 512*c* in position within shell 510 comprise rounded brackets into which the rounded corners of sheet assembly 512*c* are mounted.

As shown in FIG. 33, view A shows hemispherical cap 600, including flange portion 602. View B shows first end plate 612 and cylindrical portion 516 of shell 510, including flange portion 604. As discussed above, first end plate 612 is welded or otherwise rigidly coupled to an inside surface of shell 510, as indicated by arrows 610. First end plate 612 may include one or more holes 616 operable to allow pressure to equalize across the surfaces of sheets 513 of sheet assembly 512*c*. View C and D show baffles 620*c* and 622*c* located in high-pressure chambers 582 and 580, respectively. As discussed above, mounting tracks 560*c* comprise rounded brackets into which the corners of sheet assembly 512*c* are mounted. Thus, each corner of sheet assembly 512*c* may have a rounded corner portion, indicated as rounded corners 640*c*.

As shown in FIG. 34, view E shows second end plate 614 and cylindrical portion 516 of shell 510, including flange portion 604. As discussed above, first end plate 612 is welded or otherwise rigidly coupled to an inside surface of shell 510, as indicated by arrows 610. Like first end plate 612, second end plate 614 may include one or more holes 616 operable to allow pressure to equalize across the surfaces of sheets 513 of sheet assembly 512*c*. A push plate 630*c* may be located at the center of second end plate 614. Push plate 630*c* may compress the sealers 372 (e.g., O-rings or gaskets) located in spacers 362. Thus, push plate 630*c* may have a similar shape as the cross-sectional shape of sheets 513 (here, a square or rectangle having rounded corners). The outer periphery of pusher plate 630*c* may be sealed to second end plate 614 using an O-ring or other suitable gasket.

Also shown in FIG. 34, view F shows mounting devices (or tracks) 560*c* coupled to shell 510 and used to hold sheet assembly 512*c* in position within shell 510. As discussed above, each mounting track 560*c* may be associated with a particular corner of sheet assembly 512*c*. Also, each mounting track 560*c* may be coupled to shell 510 in any suitable manner, such as by welding or using fasteners, for example. Each mounting device 560*c* may extend along the length of cylindrical portion 516 of shell 510, or at least along a portion of the length of cylindrical portion 516. One or more gaskets (or other suitable sealing device) 634*c* may be located adjacent each mounting track 560*c* in order to seal sheet assembly 512*c* to that mounting track 560*c*. In some embodiments, gaskets 634*c* may be hollow and inflated with pressurized liquid or gas to ensure a good seal. As shown in FIG. 28, a hydraulic mechanism 638 may be used to compress the sheets 513 of sheet assembly 512*c* together. Trapped gas in the elevated chamber 639 acts as a spring to allow sheet assembly 512*c* to flex during temperature changes.

Figure 35:
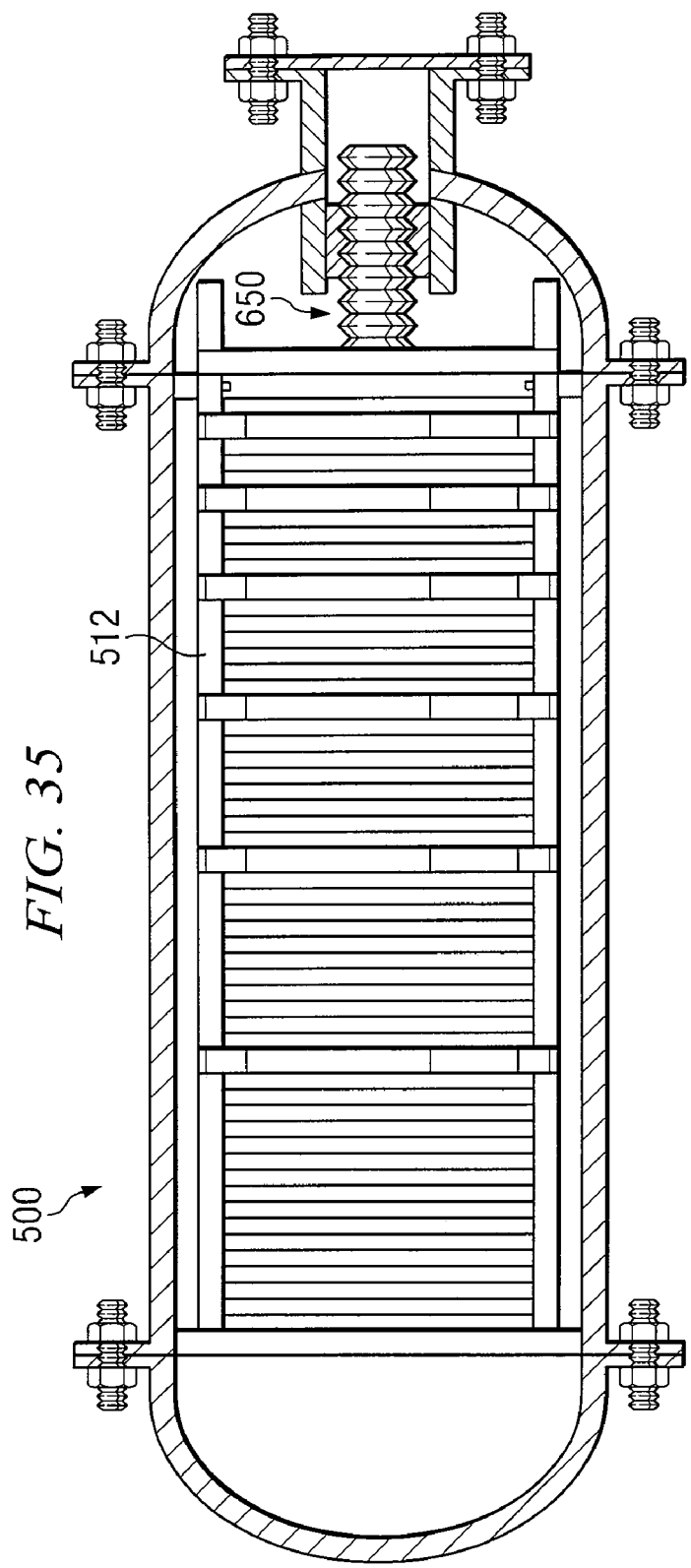

FIG. 35 illustrates an example side view of heat exchanger assembly 500 shown in FIG. 27 in accordance with another embodiment of the invention. The embodiment shown in FIG. 35 is similar to the embodiment shown in FIG. 35, except that a screw mechanism 650, rather than a hydraulic mechanism 638, is used to compress the sheets 513 of sheet assembly 512 together.

Figure 36:
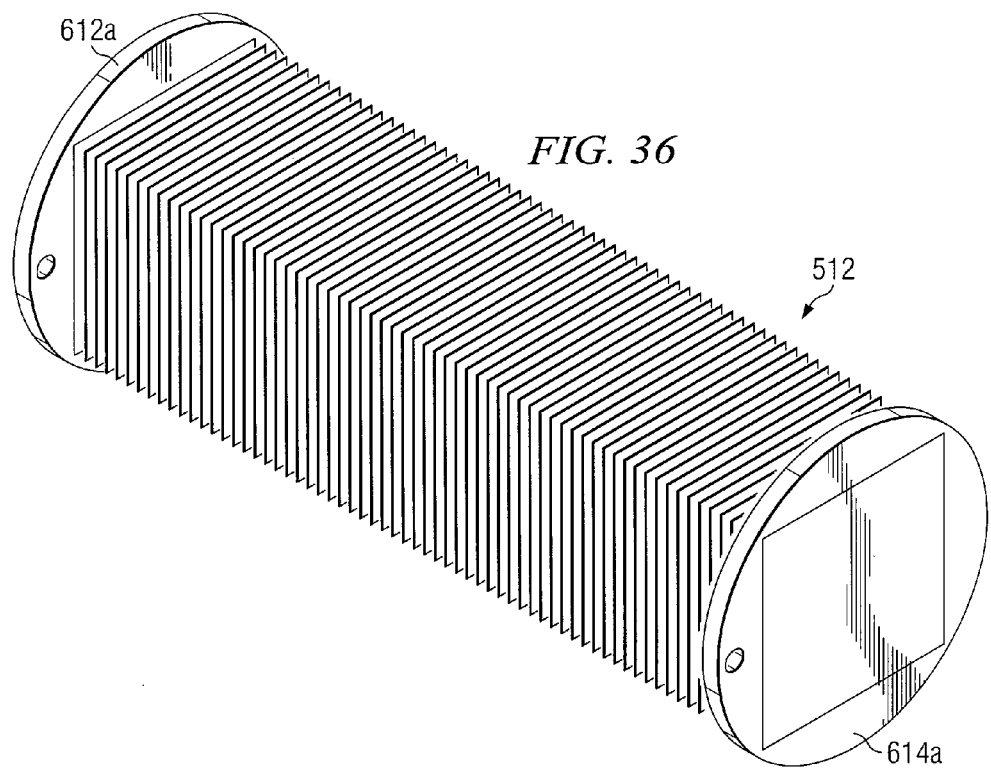

FIG. 36 illustrates a perspective view of sheet assembly 512 having a first end plate, or baffle, 612*a* and a second end plate, or baffle 614*a* in accordance with one embodiment of the invention. End plates 612*a* and 614*a* may operate to seal low-pressure chambers 580 and 582 from high-pressure chambers 584 and 586.

Figure 37B:
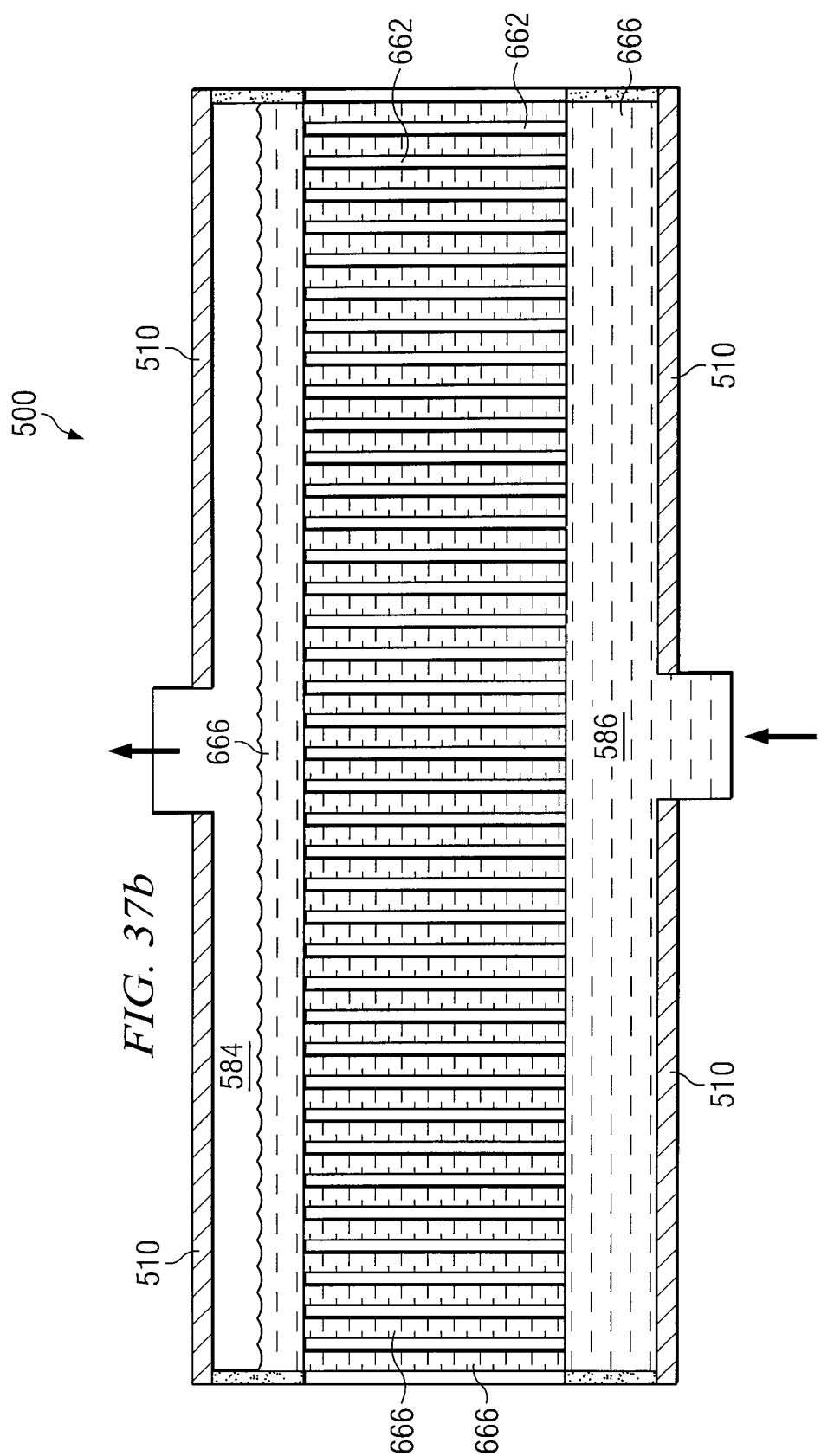

FIG. 37 illustrates a Top View and a Side View of a heat exchanger assembly 500 used to transfer latent heat in accordance with one embodiment of the invention. Heat exchanger assembly 500 includes a plurality of sheets 513 defining a plurality of high-pressure passageways 660 alternating with a plurality of low-pressure passageways 662. The Top View illustrates the flow of a relatively high-pressure fluid through high-pressure passageways 660, as indicated by arrows 664. The Side View illustrates the flow of a relatively low-pressure fluid 666 through low-pressure passageways 662. As shown in the Top View, a number of baffles 668 are positioned within high-pressure chambers 580 and 582 at various locations along the length of assembly 500. Baffles 668 may be coupled to the inside surface of shell 510 and/or to the outer edges of sheet assembly 512 in order to block, and thus redirect, the flow of high-pressure fluids flowing through high-pressure passageways 660. As shown in the Top View, the high-pressure flow area progressively decreases as the high-pressure fluid moves from an inlet 670 to an outlet 672. This allows for the velocity of the fluid through the heat exchanger passageways 662 to remain relatively constant and pushes any non-condensable gases out through outlet 672. In the case of small heat exchanger assembly 500 that may have only a few heat exchanger sheets 513, the relatively constant velocity through the heat exchanger passageways 662 can be achieved using spacers or varying width, in particular using relatively wide spacers near the inlet and relatively narrow spacers near the outlet. In this case, the vapor velocity through each passageway may be relatively constant.

Figure 38A:
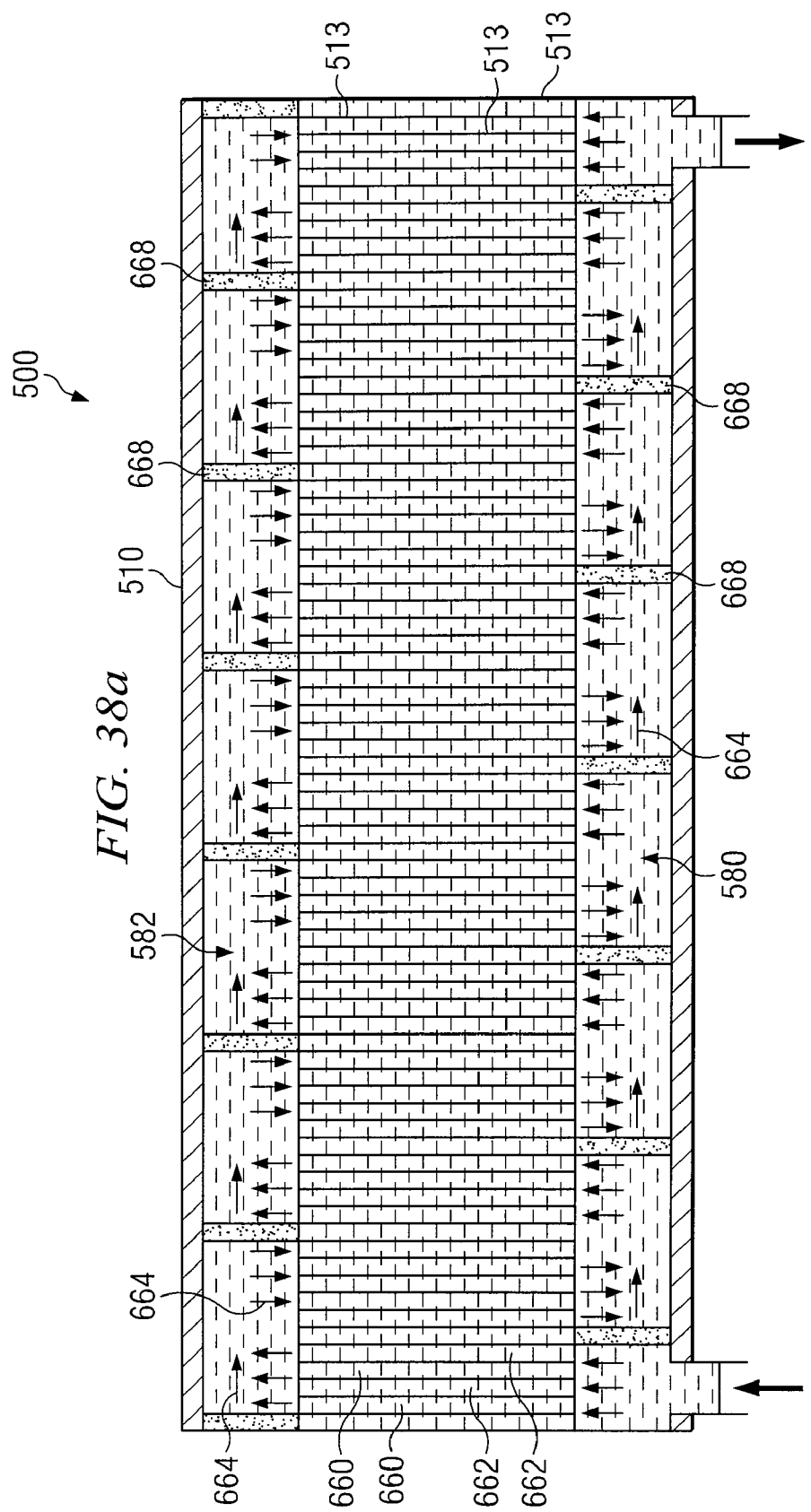
Figure 38B:
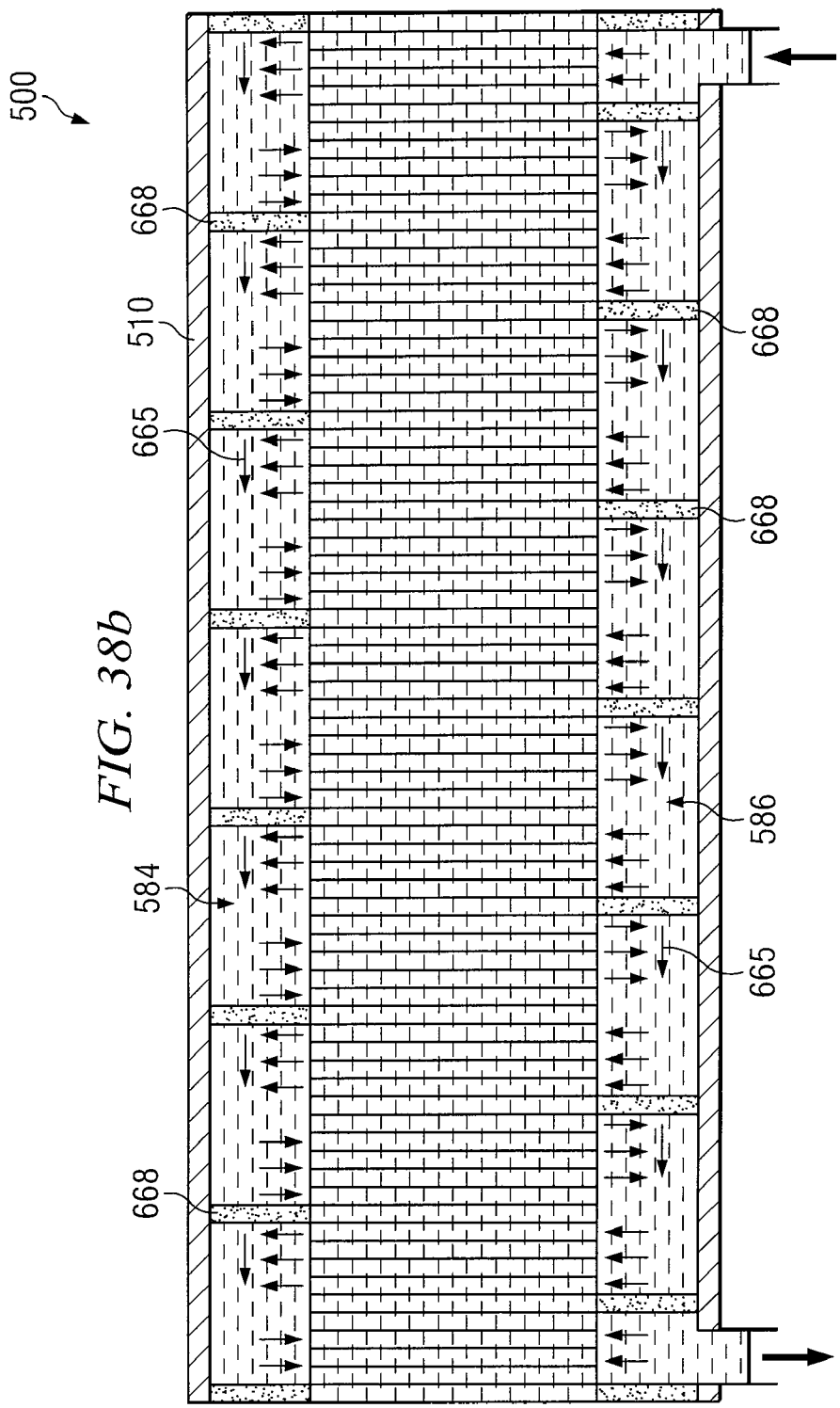

FIG. 38 illustrates a Top View and a Side View of a heat exchanger assembly 500 used to transfer sensible heat in accordance with another embodiment of the invention. Heat exchanger assembly 500 includes a plurality of sheets 513 defining a plurality of high-pressure passageways 660 alternating with a plurality of low-pressure passageways 662. The Top View illustrates the flow of a first fluid through first passageways 660, as indicated by arrows 664. The Side View illustrates the flow of a second fluid through second passageways 662, as indicated by arrows 665. As shown in the Top View, a number of baffles 668 are positioned within chambers 580 and 582 at various locations along the length of assembly 500. As shown in the Side View, a number of baffles 668 are positioned within chambers 584 and 586 at various locations along the length of assembly 500. In this embodiment, baffles 688 are spaced equally, which allows for a constant velocity through the heat exchanger passageways 660 and 662.

Figure 39:
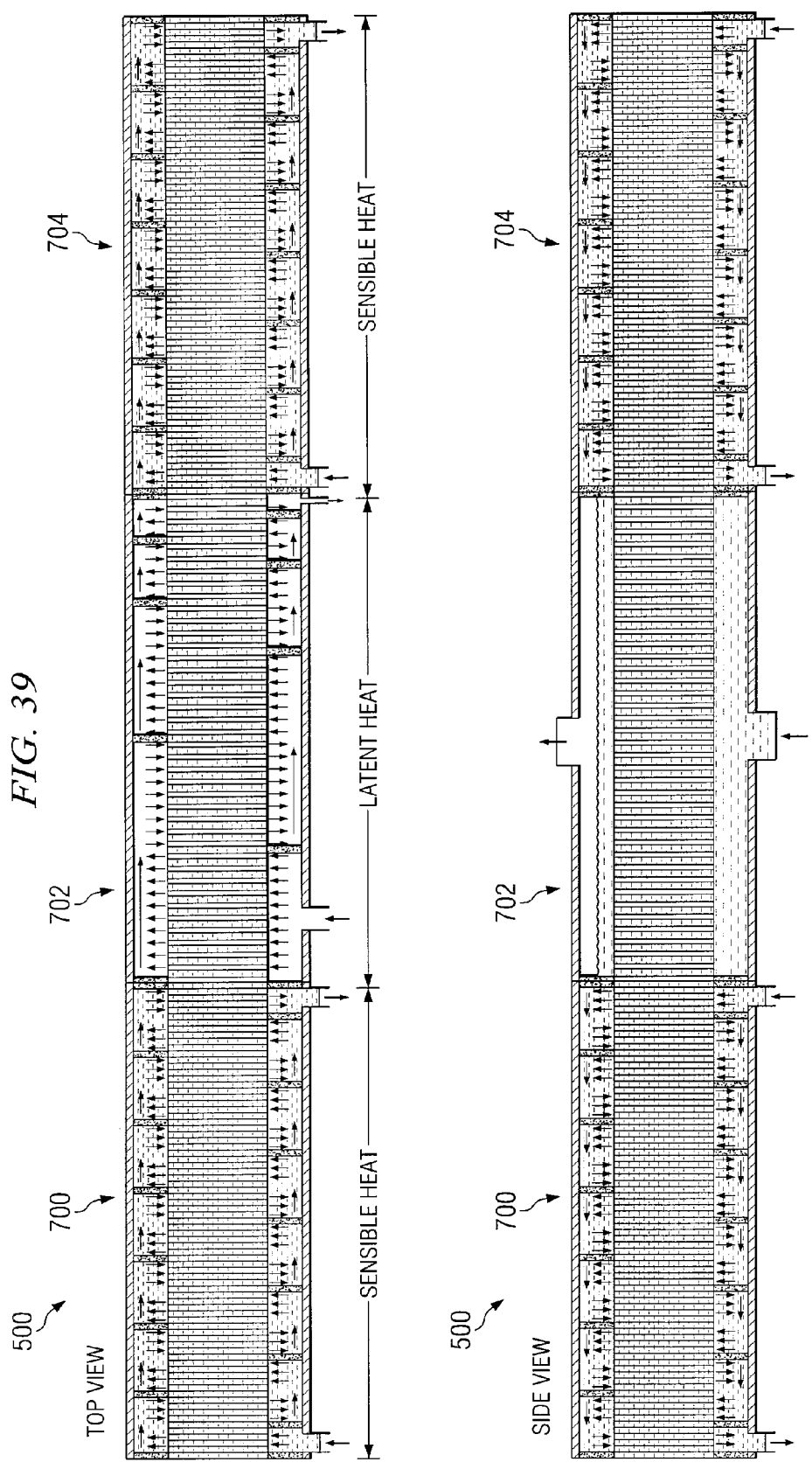

FIG. 39 illustrates a Top View and a Side View of a heat exchanger assembly 500 used to transfer both latent heat and sensible heat within a single shell 510 in accordance with another embodiment of the invention. Thus, heat exchanger assembly 500 shown in FIG. 39 may be essentially a combination of the heat exchanger assemblies 500 shown in FIGS. 37 and 38. In this embodiment, heat exchanger assembly 500 includes a first portion 700 configured to transfer sensible heat, a second portion 702 configured to transfer latent heat, and a third portion 704 configured to transfer sensible heat. First and third portions 700 and 704 may have similar configurations as that shown in FIG. 38 and discussed above. Second portion 702 may have a similar configuration as that shown in FIG. 37 and discussed above.

Figure 41:
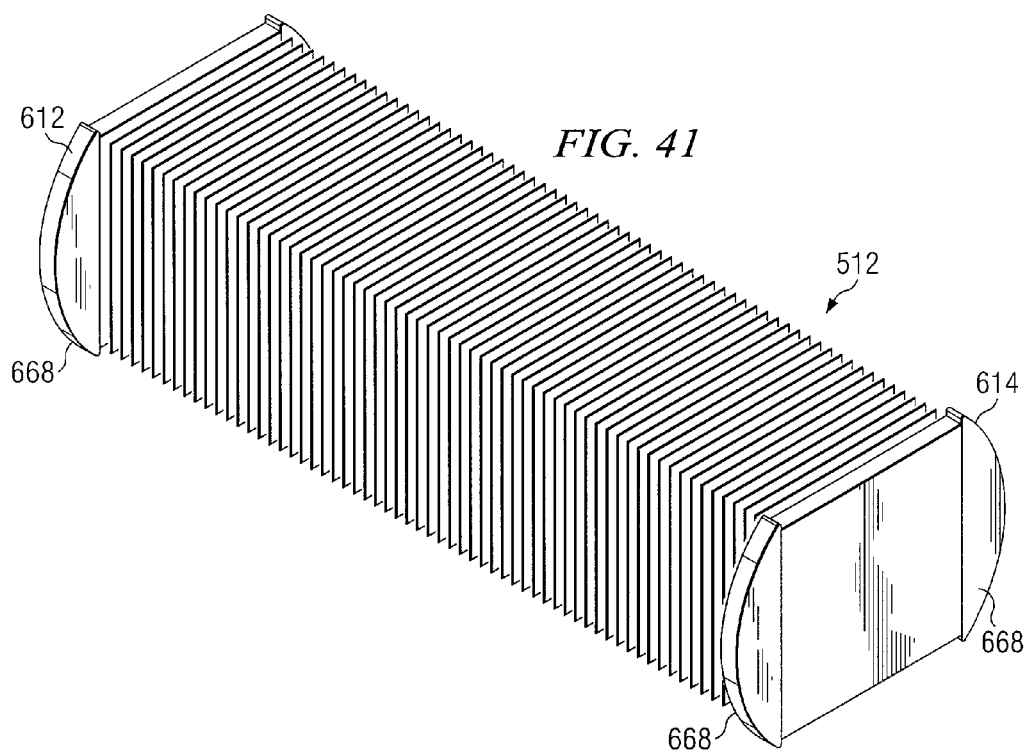
Figure 40A:
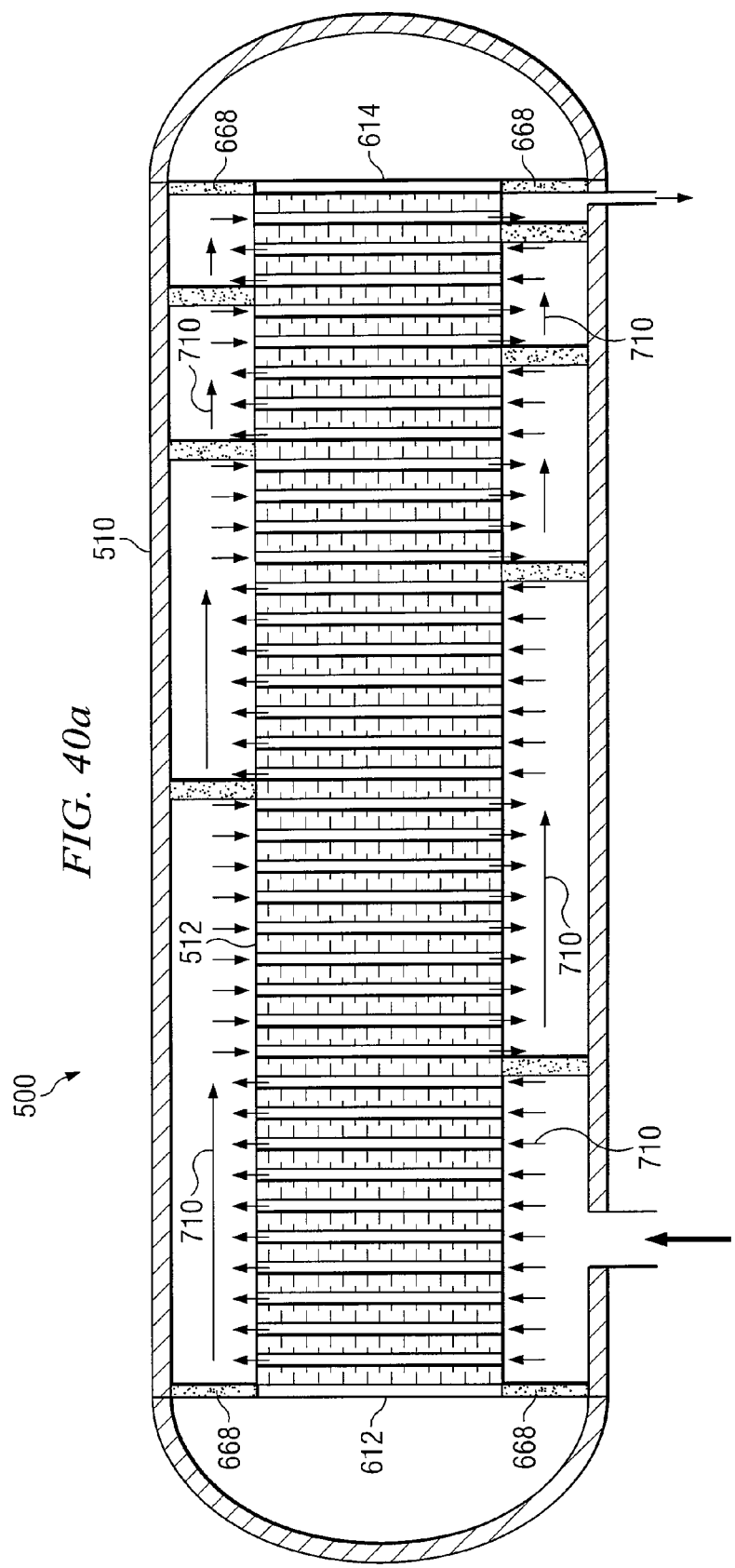
Figure 40B:
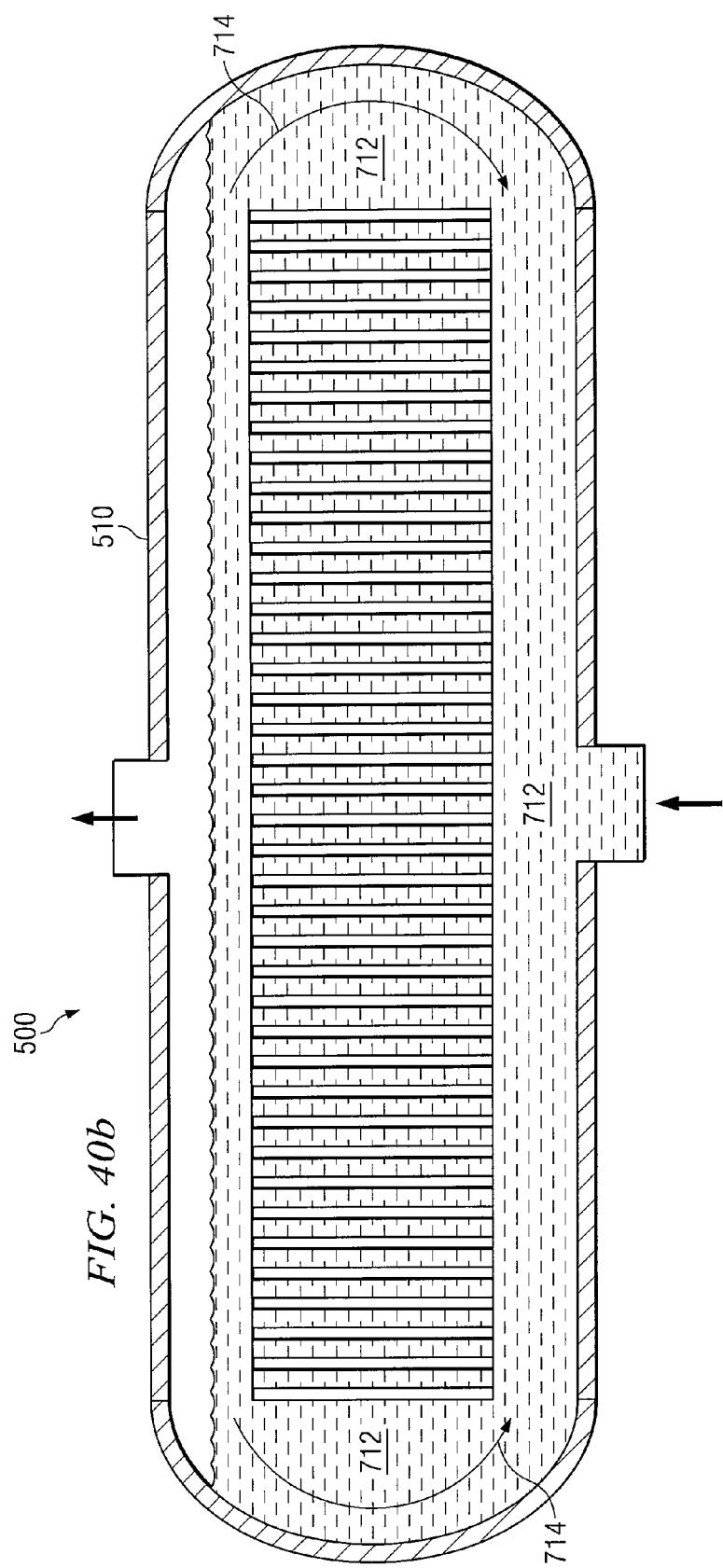

FIGS. 40 and 41 illustrate a heat exchanger assembly 500 having thermosiphoning in accordance with another embodiment of the invention. As shown in FIGS. 40 and 41, heat exchanger assembly 500 includes a first end plate 612 and a second end plate 614 at opposite ends of sheet assembly 512. End plates 612 and 614 include baffles 668 on each side of sheet assembly 512 that prohibit high-pressure fluid, indicated by arrows 710, from flowing beyond the ends of sheet assembly 512. However, end plates 612 and 614 do not have restrictive baffles on the top or bottom of sheet assembly 512, thus allowing low-pressure fluid 712 to flow beyond, and around, the ends of sheet assembly 512, as indicated by arrows 714.

Figure 42:
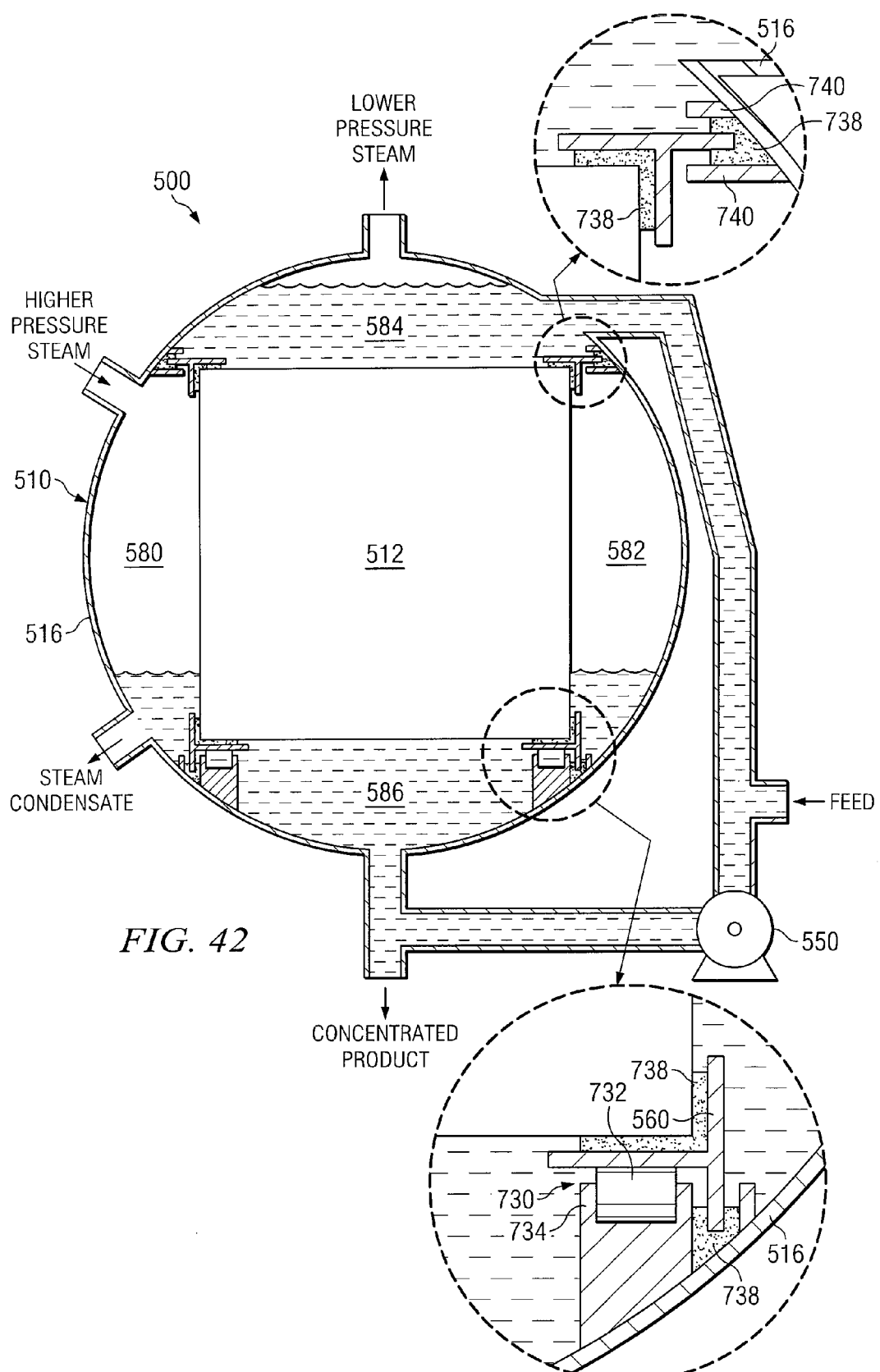

FIG. 42 illustrates a cross-section of an example heat exchanger assembly 500 including a shell 510 and a sheet assembly 512 disposed within shell 510 in accordance with another embodiment of the invention. This embodiment may be similar to that shown in FIGS. 27-28 and discussed above. However, this embodiment may be desirable for assembling sheet assembly 512 outside of shell 510 and inserting and mounting sheet assembly 512 inside shell 510.

Because sheet assembly 512 may be relatively large and/or heavy, sheet assembly 512 may be guided into shell 510 by one or more insertion mechanisms 730 for sliding, rolling, or otherwise positioning sheet assembly 512 within shell 510. In the embodiment shown in FIG. 42, such insertion mechanisms 730 include a number of rollers 732 located within tracks 734. The assembled sheet assembly 512 may be rolled into cylindrical portion 516 of shell 510 using brackets 560 located at and/or rigidly coupled to each corner of sheet assembly 512. Additional guiding members 740 may be coupled to shell 510 in order to guide or align the insertion of sheet assembly 512 into shell 510. A sealant 738, such as silicone or tar, for example, may be inserted (a) between brackets 560 and each corner of sheet assembly 512 and/or (b) between brackets 560 and portions of insertion mechanisms 730 and/or other guiding members 740 associated with shell 510. Sealant 738 may eliminate or reduce leakage between high-pressure chambers 580, 582 and low-pressure chambers 584, 586.

Figure 43:
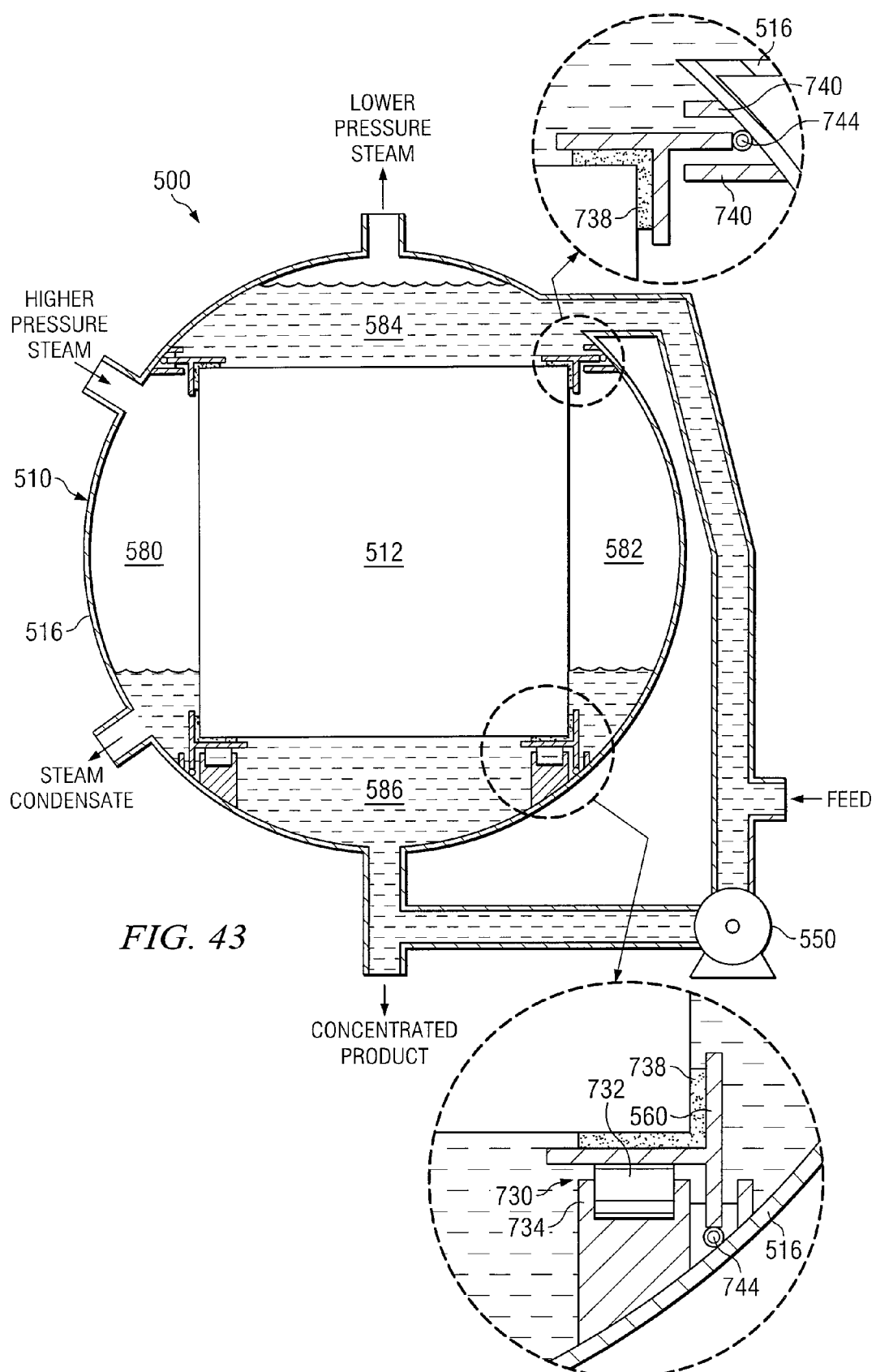

FIG. 43 illustrates a cross-section of an example heat exchanger assembly 500 including a shell 510 and a sheet assembly 512 disposed within shell 510 in accordance with yet another embodiment of the invention. This embodiment may be similar to the embodiment shown in FIG. 42 and discussed above, except using inflatable gaskets 744 instead of sealant 738 between brackets 560 and portions of insertion mechanisms 730 and/or other guiding members 740 associated with shell 510. Inflatable gaskets 744 may be hollow gaskets filled with high-pressure gas or liquid, and may be constructed of elastomeric materials or malleable metal, for example. In this embodiment, sealant 738 may still be used to provide a seal between brackets 560 and each corner of sheet assembly 512.

Figure 44:
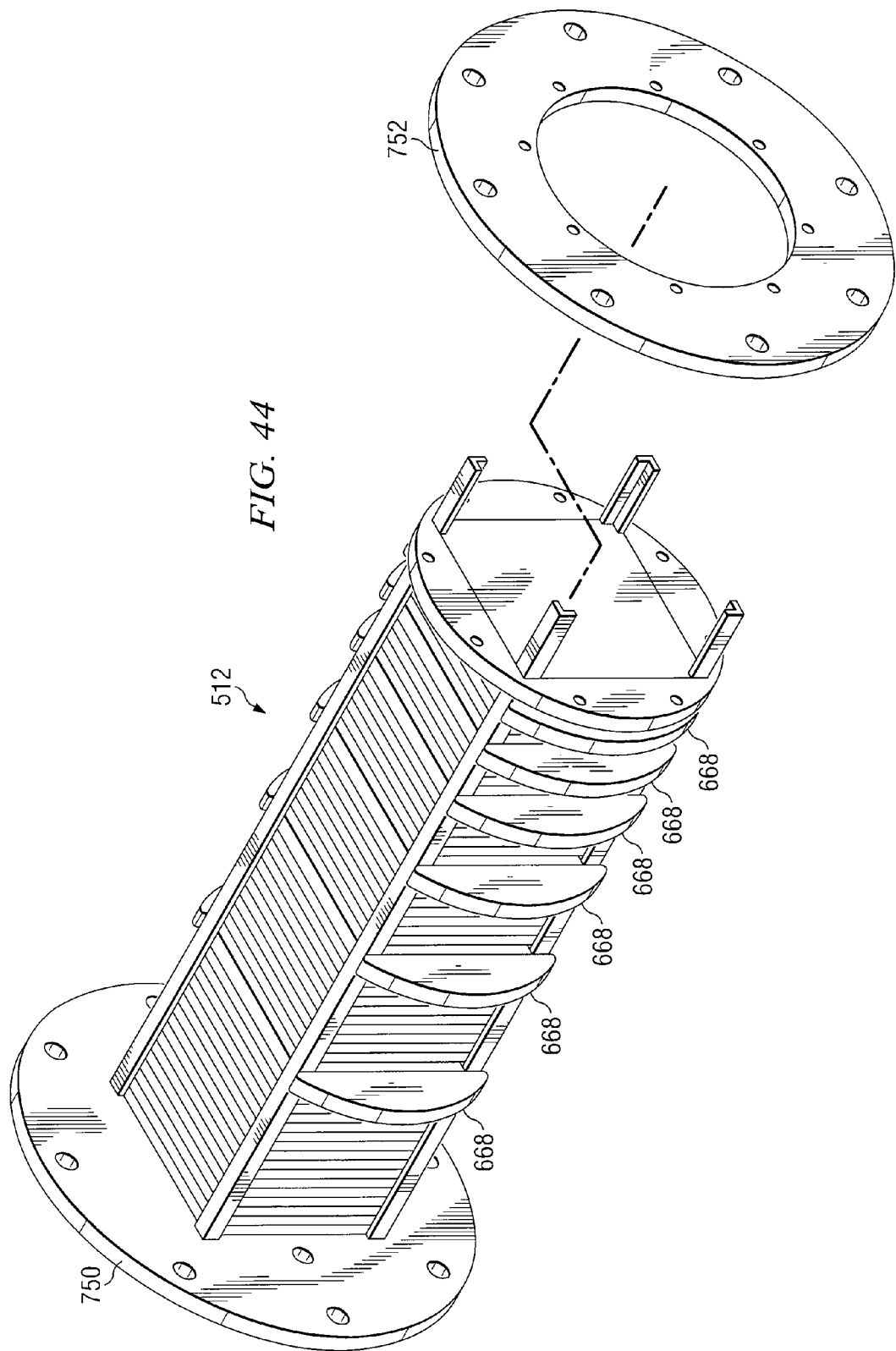

FIG. 44 illustrates a perspective view of an assembled sheet assembly 512 for insertion into shell 510 in accordance with yet another embodiment of the invention. In this embodiment, sheet assembly 512 is configured for transferring latent heat, such as described above with reference to FIG. 37. Thus, sheet assembly 512 includes baffles 668 appropriate for controlling the path of fluids through sheet assembly 512 for providing latent heat transfer. In this embodiment, sheet assembly 512 also includes a first flange 750 and a second flange 752 located at opposite ends of sheet assembly 512. First and second flanges 750 and 752 are used for mounting sheet assembly 512 to flanges 602 and 604 of shell 502, as described below with reference to FIG. 46.

Figure 45:
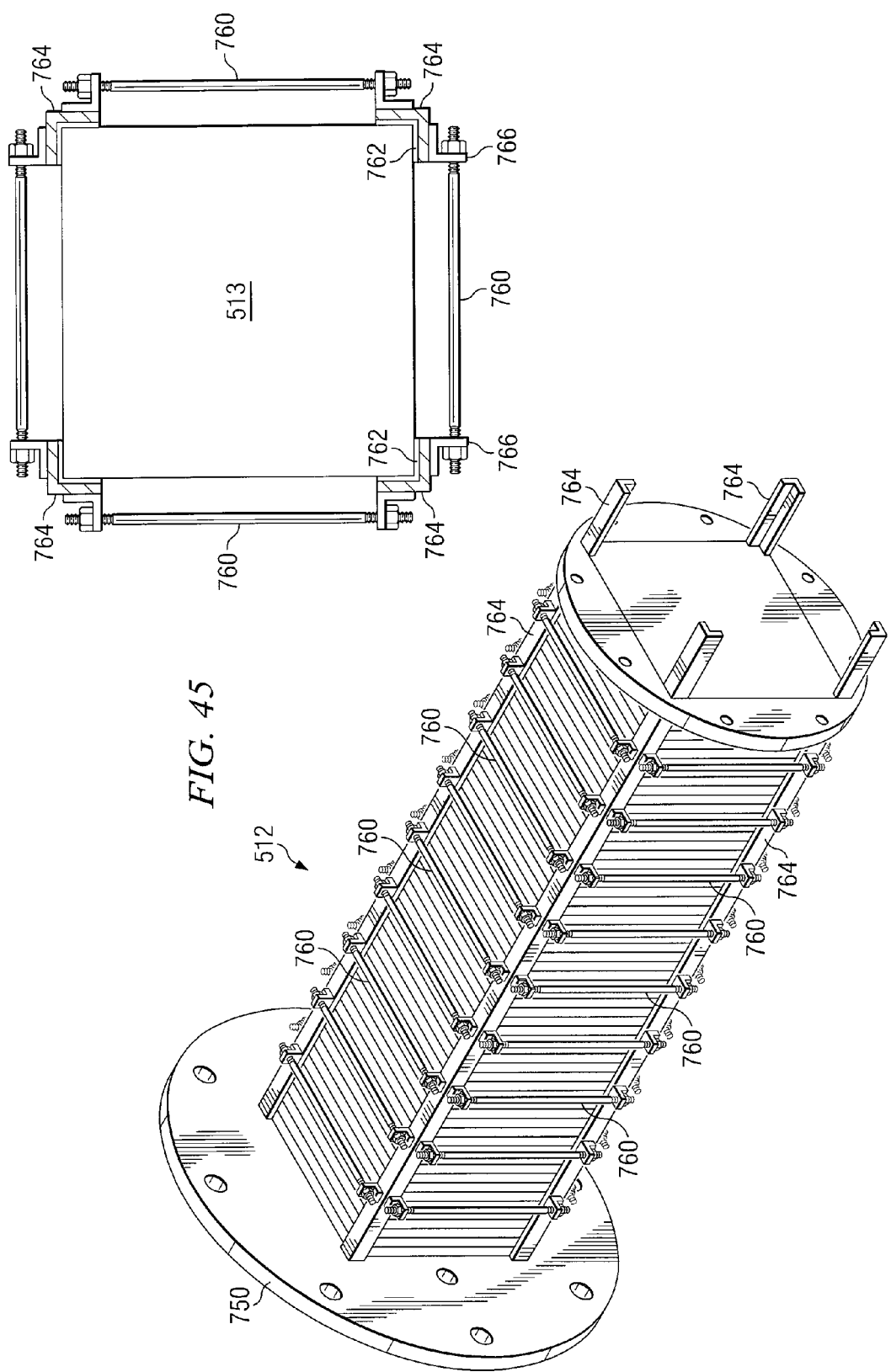

FIG. 45 illustrates another perspective view of the assembled sheet assembly 512 of FIG. 43, showing the location of tension rods 760 that seal gaskets 762 located between angled corner members 764 and sheets 513 of sheet assembly 512. Tension rods 760 may interact with brackets 766 rigidly coupled to corner members 764, such as by adhesive, braze or weld, for example.

Figure 46:
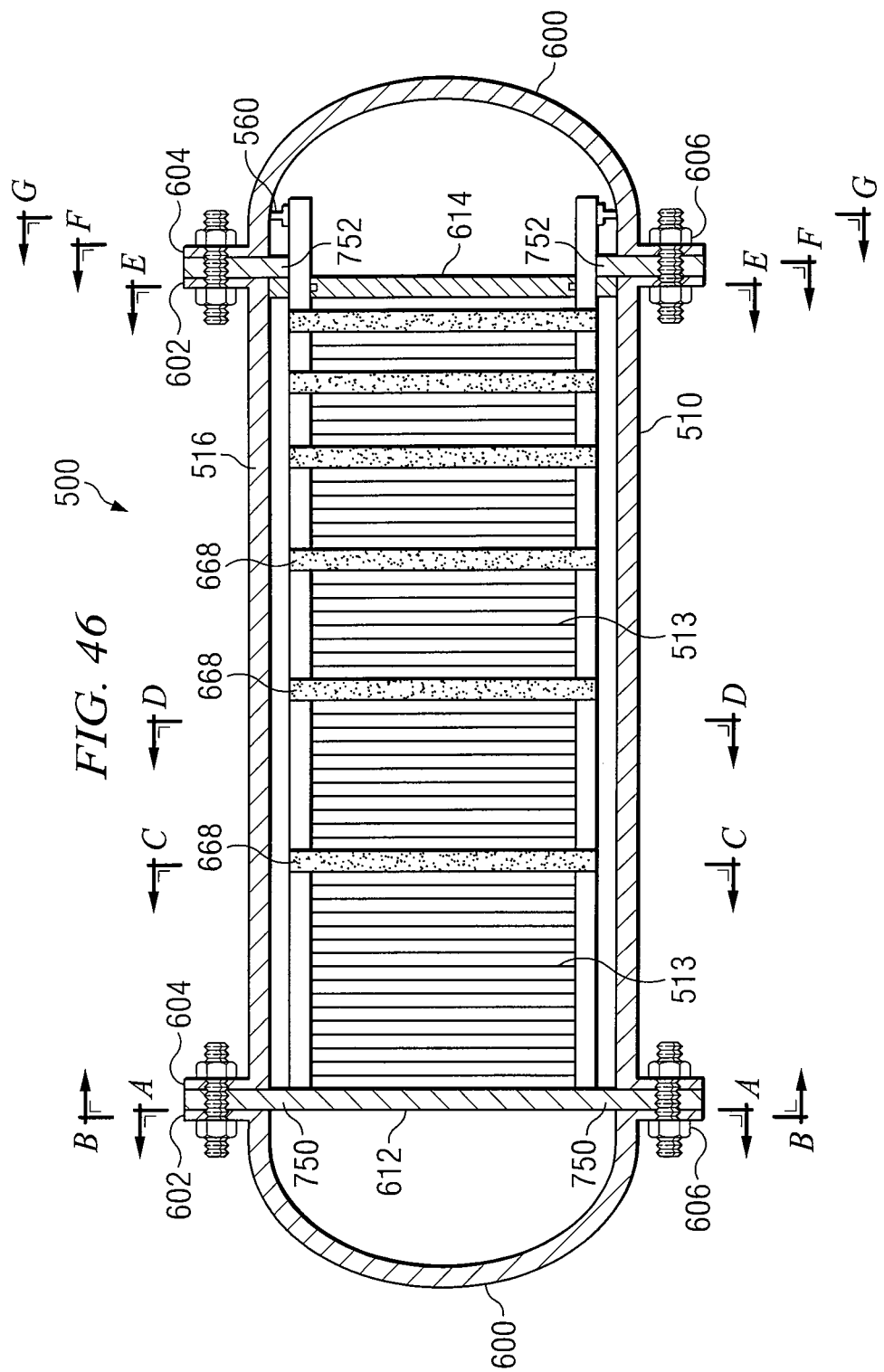

FIG. 46 illustrates a side view of an assembled heat exchanger assembly 500 including the sheet assembly 512 shown in FIGS. 44-45 in accordance with one embodiment of the invention. First flange 750 is an extension of first end plate 612 of sheet assembly 512. First flange 750 mates with, and is coupled between, flanges 602 and 604 of shell 510 by fasteners 606. Second flange 752 is a ring that couples second end plate 614 of sheet assembly 512 to shell 510. In particular, second flange 750 is rigidly coupled to second end plate 614 and mates with, and is coupled between, flanges 602 and 604 of shell 510 by fasteners 606.

Figure 47:
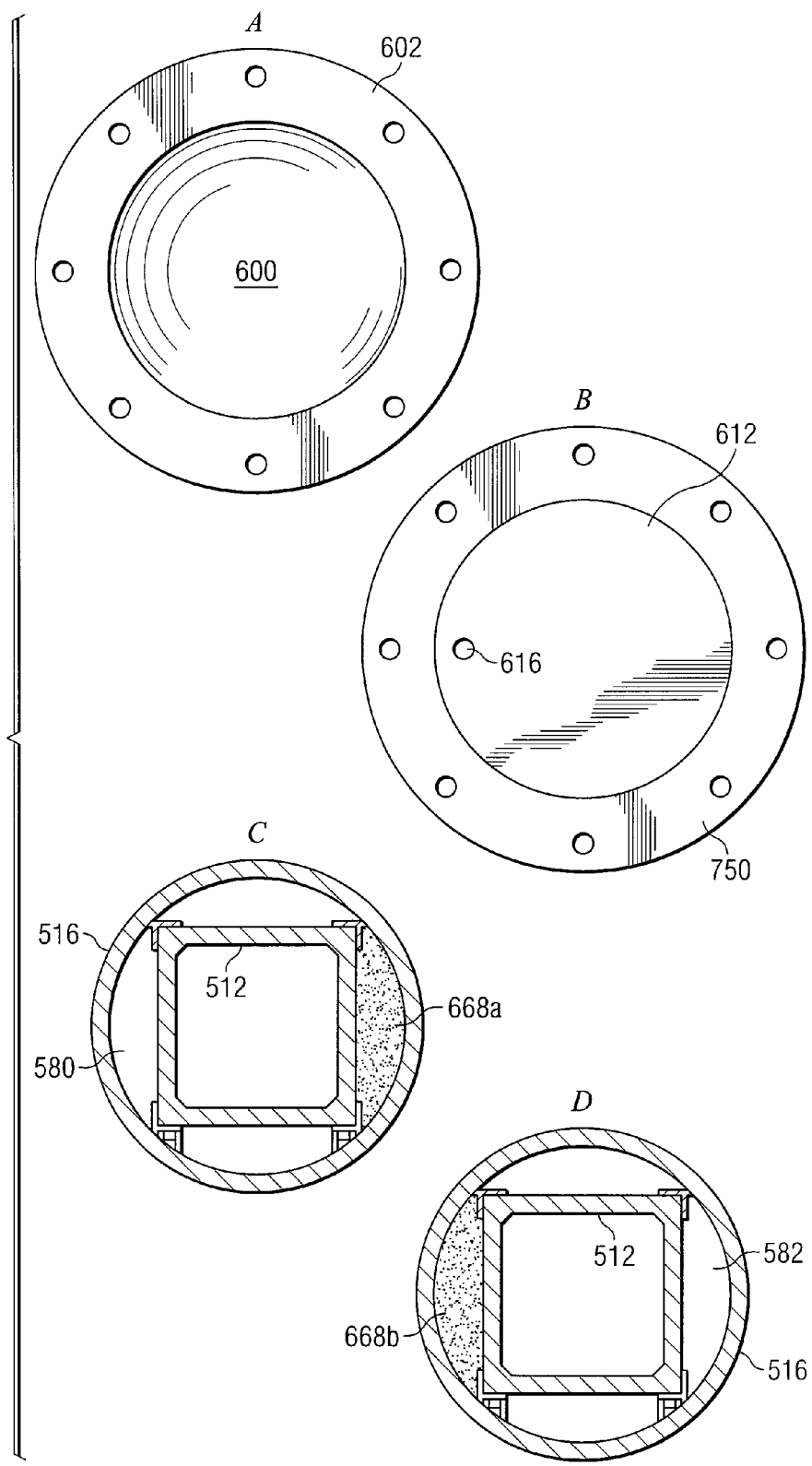
Figure 48:
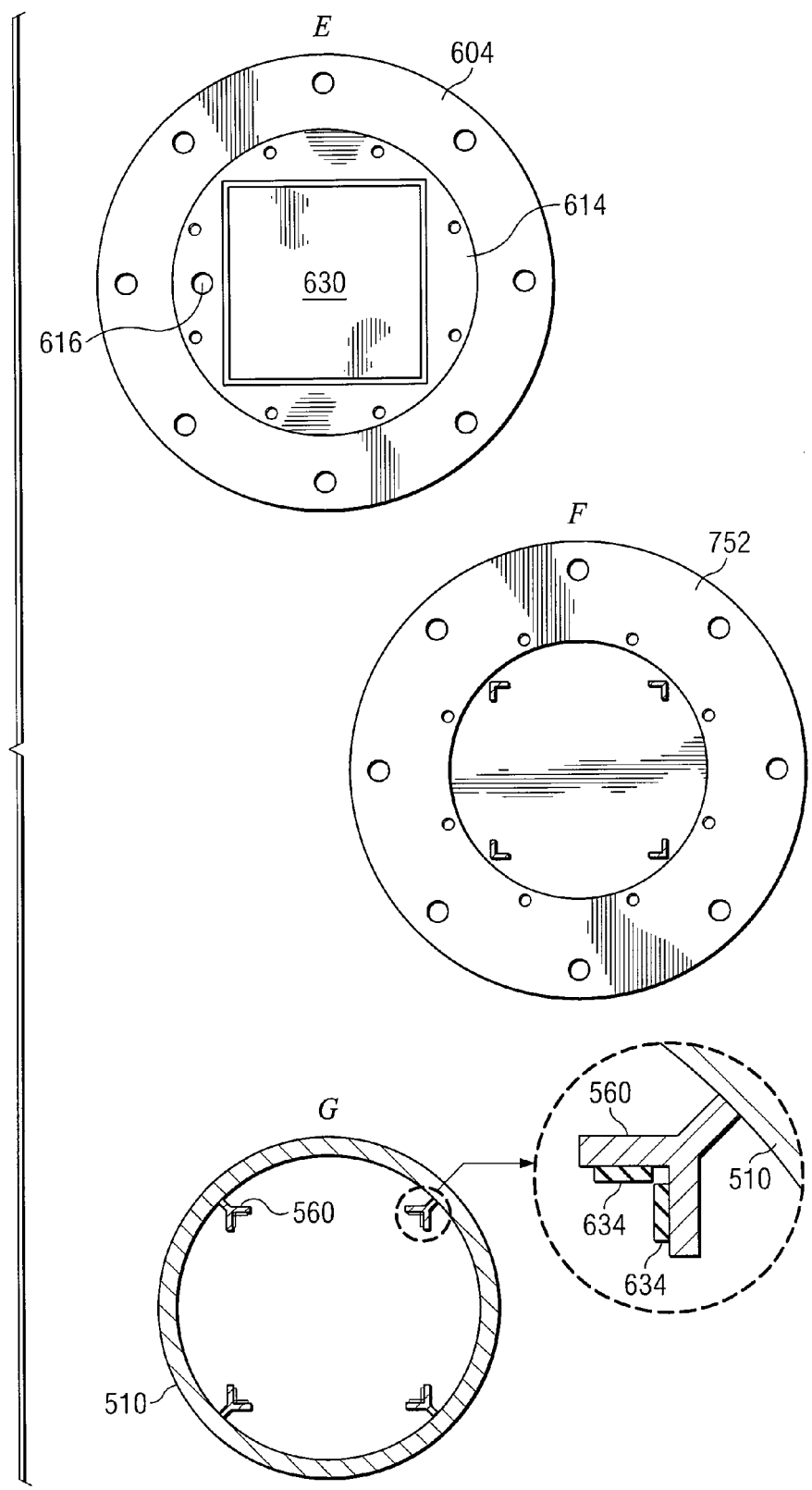

FIGS. 47 and 48 illustrate cross-sectional views A, B, C, D, E, F and G taken along lines A-A, B-B, C-C, D-D, E-E, F-F and G-G, respectively, shown in FIG. 46 in accordance with one embodiment of the invention. As shown in FIG. 47, view A shows hemispherical cap 600, including flange portion 602. View B shows first end plate 612 and first flange 750. As discussed above, first flange 750 of end plate 612 mates with and is coupled to flange portion 602 of cap 600. First end plate 612 may include one or more holes 616 operable to allow pressure to equalize across the surfaces of sheets 513 of sheet assembly 512. View C and D show baffles 668a and 668b located in high-pressure chambers 582 and 580, respectively.

As shown in FIG. 48, view E shows second end plate 614 and cylindrical portion 516 of shell 510, including flange portion 604. Like first end plate 612, second end plate 614 may include one or more holes 616 operable to allow pressure to equalize across the surfaces of sheets 513 of sheet assembly 512. A push plate 630 may be located at the center of second end plate 614. Push plate 630 may compress sealers 372 (e.g., O-rings or gaskets) located in spacers 362 within sheet assembly, such as described above with reference to FIGS. 28-35, for example. View F shows second flange 752, which comprises a ring that couples second end plate 614 of sheet assembly 512 to flange portions 602 and 604 of shell 510, as shown in FIG. 46 and discussed above. Second flange 752 may be flexible to accommodate dimensional changes caused by thermal expansion. View G shows mounting devices (or tracks) 560 coupled to shell 510 and used to hold sheet assembly 512 in position within shell 510. Each mounting track 560 may be coupled to shell 510 in any suitable manner, such as by welding or using fasteners, for example. One or more gaskets (or other suitable sealing device) 634 may be located adjacent each mounting track 560 in order to seal sheet assembly 512 to that mounting track 560.

Although embodiments of the invention and their advantages are described in detail, a person skilled in the art could make various alterations, additions, and omissions without departing from the spirit and scope of the present invention.

What is claimed is:

1. A vapor-compression evaporation system, comprising:
   a plurality of vessels in series each containing a feed having a nonvolatile component, a first set of the plurality of vessels comprising vapor-compression evaporators and a second set of the plurality of vessels comprising multi-effect evaporators;
   a mechanical compressor coupled to the last vessel in the series of vapor-compression evaporators and operable to receive a vapor therefrom;
   a turbine coupled to, and operable to drive, the mechanical compressor;
   a pump operable to deliver a cooling liquid to the mechanical compressor;
   a tank coupled to the mechanical compressor and operable to separate liquid and vapor received from the mechanical compressor;
   a plurality of heat exchangers coupled inside respective ones of the vessels, the heat exchanger in the first vessel in the first set operable to receive the vapor from the tank, at least some of the vapor condensing therein, whereby the heat of condensation provides the heat of evaporation to the first vessel in the first set; and wherein at least some of the vapor inside the first vessel in the first set is delivered to the heat exchanger in the next vessel in the first set, whereby the condensing, evaporating, and delivering steps continue until the last vessel in the second set is reached.

2. The vapor-compression evaporation system of claim 1, wherein the nonvolatile component is selected from the group consisting of salt and sugar.

3. The vapor-compression evaporation system of claim 1, wherein the feed is degassed feed.

4. The vapor-compression evaporation system of claim 1, wherein the turbine comprises a gas turbine.

5. The vapor-compression evaporation system of claim 1, wherein the turbine comprises a gas turbine and a steam turbine.

6. The vapor-compression evaporation system of claim 1, further comprising a condenser coupled to the last vessel in the second set for removing energy from the last vessel in the second set.

7. The vapor-compression evaporation system of claim 1, further comprising a plurality of devices coupled to respective ones of the vessels for removing concentrated feed from respective ones of the vessels.

8. The vapor-compression evaporation system of claim 1, wherein the cooling liquid comprises saltwater or freshwater.

9. The vapor-compression evaporation system of claim 1, wherein the mechanical compressor comprises first and second mechanical compressors in series, the first mechanical compressor driven by one of a steam turbine and a gas turbine, the second mechanical compressor driven by the other of the steam turbine and the gas turbine.

10. The vapor-compression evaporation system of claim 9, further comprising an intercooler coupled between the first and second mechanical compressors, the intercooler operable to receive the cooling liquid from the pump.

11. The vapor-compression evaporation system of claim 8, wherein the intercooler comprises a demister operable to prevent liquid droplets from entering the second mechanical compressor.

12. The vapor-compression evaporation system of claim 1, wherein the mechanical compressor comprises first and second mechanical compressors in parallel, the first mechanical compressor driven by one of a steam turbine and a gas turbine, the second mechanical compressor driven by the other of the steam turbine and the gas turbine.

13. A vapor-compression evaporation system, comprising:
 a plurality of vessels in series each containing a feed having a nonvolatile component, a first set of the plurality of vessels comprising vapor-compression evaporators and a second set of the plurality of vessels comprising multi-effect evaporators;
 a mechanical compressor coupled to the last vessel in the series of vapor-compression evaporators and operable to receive a vapor therefrom;
 an internal combustion engine coupled to the mechanical compressor and operable to drive the mechanical compressor;
 a pump operable to deliver a cooling liquid to the mechanical compressor;
 a tank coupled to the mechanical compressor and operable to separate liquid and vapor received from the mechanical compressor;
 a plurality of heat exchangers coupled inside respective ones of the vessels, the heat exchanger in the first vessel in the first set operable to receive the vapor from the tank, at least some of the vapor condensing therein, whereby the heat of condensation provides the heat of evaporation to the first vessel in the first set; and
 wherein at least some of the vapor inside the first vessel in the first set is delivered to the heat exchanger in the next vessel in the first set, whereby the condensing, evaporating, and delivering steps continue until the last vessel in the second set is reached.

14. The vapor-compression evaporation system of claim 13, wherein the nonvolatile component is selected from the group consisting of salt and sugar.

15. The vapor-compression evaporation system of claim 13, wherein the internal combustion engine comprises a Diesel engine or an Otto cycle engine.

16. The vapor-compression evaporation system of claim 13, further comprising a condenser coupled to the last vessel in the second set for removing energy from the last vessel in the second set.

17. The vapor-compression evaporation system of claim 13, further comprising a plurality of devices coupled to respective ones of the vessels for removing concentrated feed from respective ones of the vessels.

18. The vapor-compression evaporation system of claim 13, wherein the cooling liquid comprises saltwater or freshwater.

19. The vapor-compression evaporation system of claim 13, further comprising a packed column coupled to the internal combustion engine, the packed column operable to receive an exhaust gas from the internal combustion engine.

20. A vapor-compression evaporation system, comprising:
 a plurality of vessels in series each containing a feed having a nonvolatile component, a first set of the plurality of vessels comprising vapor-compression evaporators and a second set of the plurality of vessels comprising membrane evaporators;
 a mechanical compressor coupled to the last vessel in the series of vapor-compression evaporators and operable to receive a vapor therefrom;
 an internal combustion engine coupled to the mechanical compressor and operable to drive the mechanical compressor;
 a pump operable to deliver a cooling liquid to the mechanical compressor;
 a tank coupled to the mechanical compressor and operable to separate liquid and vapor received from the mechanical compressor;
 a plurality of heat exchangers coupled inside respective ones of the vapor-compression evaporators, the heat exchanger in the first vessel in the first set operable to receive the vapor from the tank, at least some of the vapor condensing therein, whereby the heat of condensation provides the heat of evaporation to the first vessel in the first set; and
 wherein at least some of the vapor inside the first vessel in the first set is delivered to the heat exchanger in the next vessel in the first set, whereby the condensing, evaporating, and delivering steps continue until the last vessel in the first set is reached.

21. The vapor-compression evaporation system of claim 20, wherein the nonvolatile component is selected from the group consisting of salt and sugar.

22. The vapor-compression evaporation system of claim 20, wherein the internal combustion engine comprises a Diesel engine or an Otto cycle engine.

23. The vapor-compression evaporation system of claim 20, further comprising a condenser coupled to the last vessel in the second set for removing energy from the last vessel in the second set.

24. The vapor-compression evaporation system of claim 20, further comprising a plurality of devices coupled to respective ones of the vessels for removing concentrated feed from respective ones of the vessels.

25. The vapor-compression evaporation system of claim 20, wherein the cooling liquid comprises saltwater or freshwater.

26. The vapor-compression evaporation system of claim 20, wherein each membrane evaporator comprises an inner chamber and two outer chambers defined by an impermeable membrane and a hydrophobic vapor-permeable membrane.

27. The vapor-compression evaporation system of claim 26, wherein the two outer chambers have saltwater flowing therethrough and the inner chamber has freshwater flowing therethrough.

28. The vapor-compression evaporation system of claim 26, wherein an exhaust gas from the internal combustion engine is operable to create steam that is fed into the heat exchanger in the first vessel in the first set.

29. A vapor-compression evaporation method, comprising:
   delivering a feed having a nonvolatile component to a plurality of vessels in series;
   coupling a mechanical compressor to the last vessel in the series;
   receiving, by the mechanical compressor, a vapor from the last vessel in the series;
   driving the mechanical compressor with a turbine;
   delivering a cooling liquid to the mechanical compressor;
   separating liquid and vapor received from the mechanical compressor;
   receiving, by a heat exchanger coupled to the first vessel in the series, the separated vapor, at least some of the vapor condensing therein, whereby the heat of condensation provides the heat of evaporation to the first vessel in the series; and
   delivering at least some of the vapor inside the first vessel in the series to a heat exchanger coupled to the next vessel in the series, whereby the condensing, evaporating, and delivering steps continue until the last vessel in the series is reached.

30. The vapor-compression evaporation method of claim 29, further comprising degassing the feed.

31. The vapor-compression evaporation method of claim 29, wherein driving the mechanical compressor with a turbine comprises driving the mechanical compressor with a gas turbine.

32. The vapor-compression evaporation method of claim 29, wherein driving the mechanical compressor with a turbine comprises driving the mechanical compressor with a gas turbine and a steam turbine.

33. The vapor-compression evaporation method of claim 29, further comprising removing energy from the last vessel in the series.

34. The vapor-compression evaporation method of claim 29, further comprising removing concentrated feed from respective ones of the vessels.

35. The vapor-compression evaporation method of claim 29, wherein the mechanical compressor comprises first and second mechanical compressors in series, the method further comprising driving the first mechanical compressor by a steam turbine and driving the second mechanical compressor by a gas turbine.

36. The vapor-compression evaporation method of claim 29, further comprising coupling an intercooler between the first and second mechanical compressors, the intercooler operable to receive the cooling liquid from the pump.

37. The vapor-compression evaporation method of claim 29, further comprising preventing liquid droplets from entering the second mechanical compressor.

38. The vapor-compression evaporation method of claim 29, wherein the mechanical compressor comprises first and second mechanical compressors in parallel, the method further comprising driving the first mechanical compressor by a steam turbine and driving the second mechanical compressor by a gas turbine.

* * * * *